TRAFFIC CONTROL SYSTEM
Original Filed April 29, 1944 20 Sheets-Sheet 1
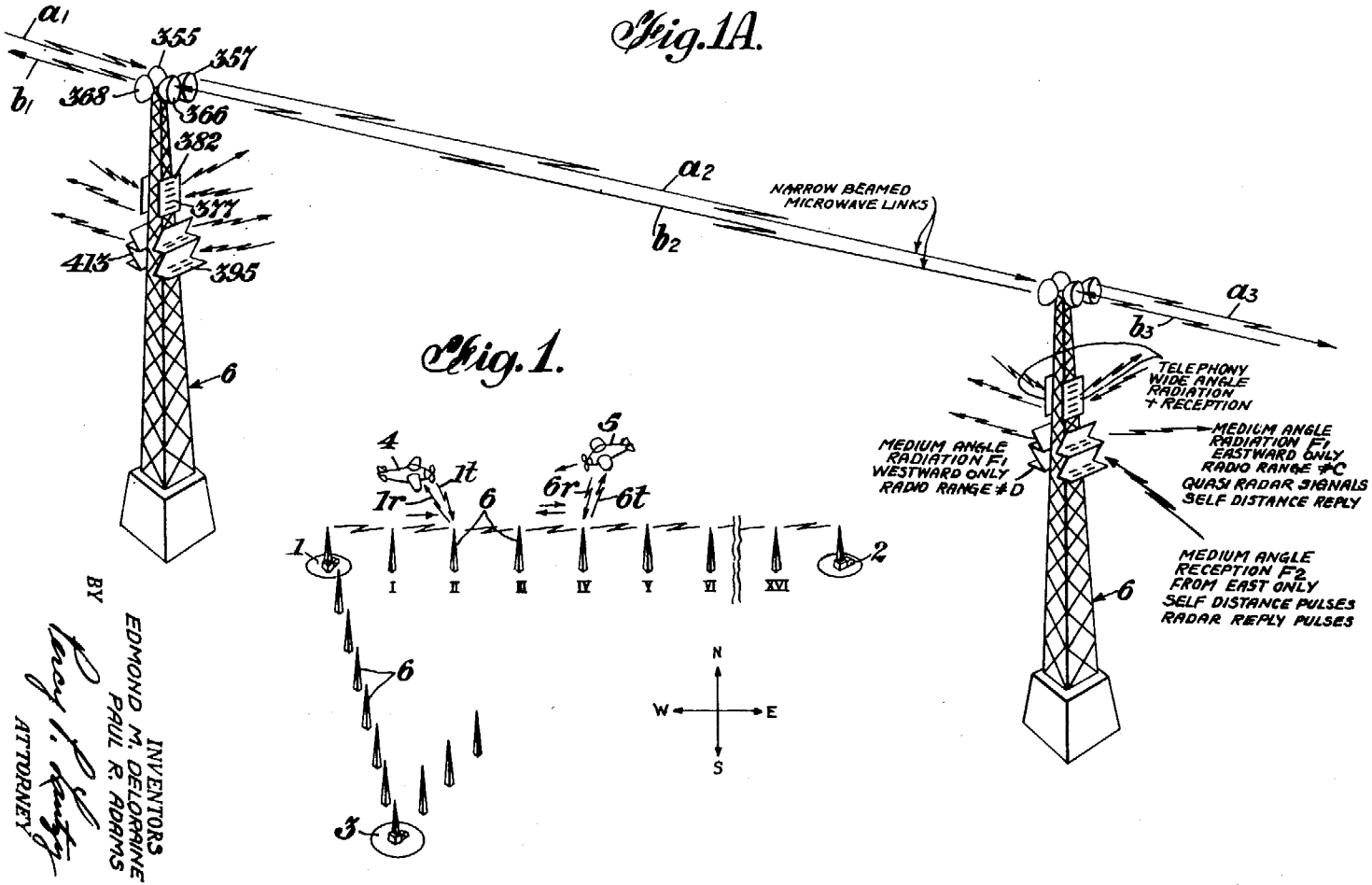
INVENTORS
EDMOND M. DELORAINE
PAUL R. ADAMS
BY Percy P. Lantzy
ATTORNEY

TRAFFIC CONTROL SYSTEM

Original Filed April 29, 1944 20 Sheets-Sheet 2

INVENTOR.
EDMOND M. DELORAINE
PAUL R. ADAMS
BY Lucy P. Lantzy
ATTORNEY

TRAFFIC CONTROL SYSTEM

Original Filed April 29, 1944 20 Sheets-Sheet 3

INVENTORS
EDMOND M. DELORAINE
PAUL R. ADAMS

BY Percy P. Lantzy
ATTORNEY

INVENTORS
EDMOND M. DELORAINE
PAUL R. ADAMS
BY Percy P. Lantzy
ATTORNEY

INVENTORS
EDMOND M. DELORAINE
PAUL R. ADAMS
BY Percy P. Lantzy
ATTORNEY

TRAFFIC CONTROL SYSTEM

Original Filed April 29, 1944 20 Sheets-Sheet 6

INVENTORS
EDMOND M. DELORAINE
PAUL R. ADAMS
BY
Percy P. Lantzy
ATTORNEY

TRAFFIC CONTROL SYSTEM

Original Filed April 29, 1944 20 Sheets-Sheet 7

INVENTORS
EDMOND M. DELORAINE
PAUL R. ADAMS
BY Percy P. Lantzy
ATTORNEY

TRAFFIC CONTROL SYSTEM

Original Filed April 29, 1944 20 Sheets-Sheet 8

INVENTORS
EDMOND M. DELORAINE
PAUL R. ADAMS
BY
Percy P. Lantzy
ATTORNEY

TRAFFIC CONTROL SYSTEM

Original Filed April 29, 1944 20 Sheets-Sheet 9

INVENTORS
EDMOND M. DELORAINE
PAUL R. ADAMS

BY Percy P. Lantzy
ATTORNEY

TRAFFIC CONTROL SYSTEM

Original Filed April 29, 1944 20 Sheets-Sheet 10

INVENTORS
EDMOND M. DELORAINE
PAUL R. ADAMS
BY Percy P. Lantzy
ATTORNEY

TRAFFIC CONTROL SYSTEM
Original Filed April 29, 1944 20 Sheets-Sheet 11
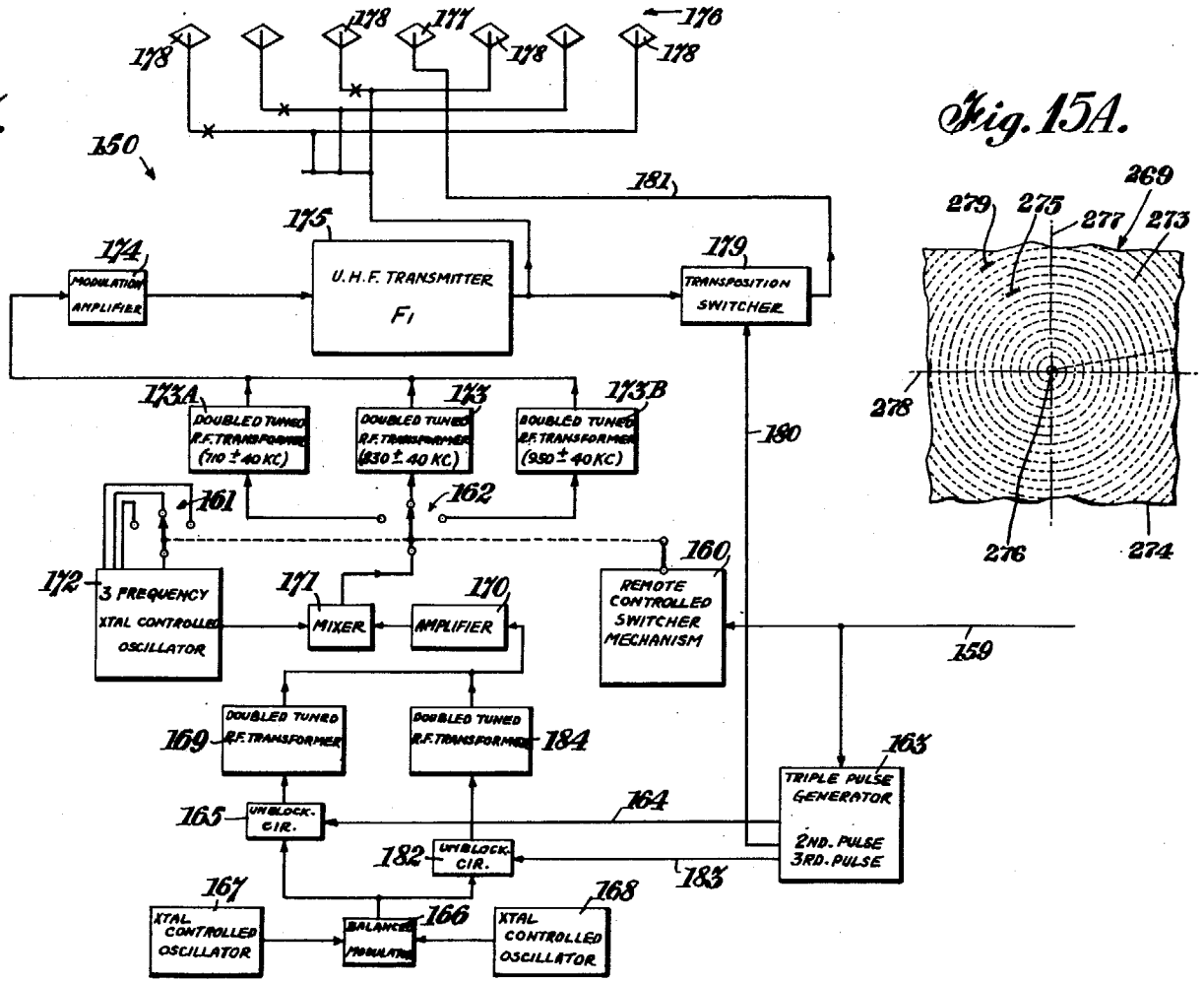
INVENTORS
EDMOND M. DELORAINE
PAUL R. ADAMS
BY Percy P. Lantzy
ATTORNEY

TRAFFIC CONTROL SYSTEM

Original Filed April 29, 1944 20 Sheets-Sheet 12

INVENTORS
EDMOND M. DELORAINE
PAUL R. ADAMS
BY Percy P. Lantzy
ATTORNEY

TRAFFIC CONTROL SYSTEM
Original Filed April 29, 1944 20 Sheets-Sheet 13
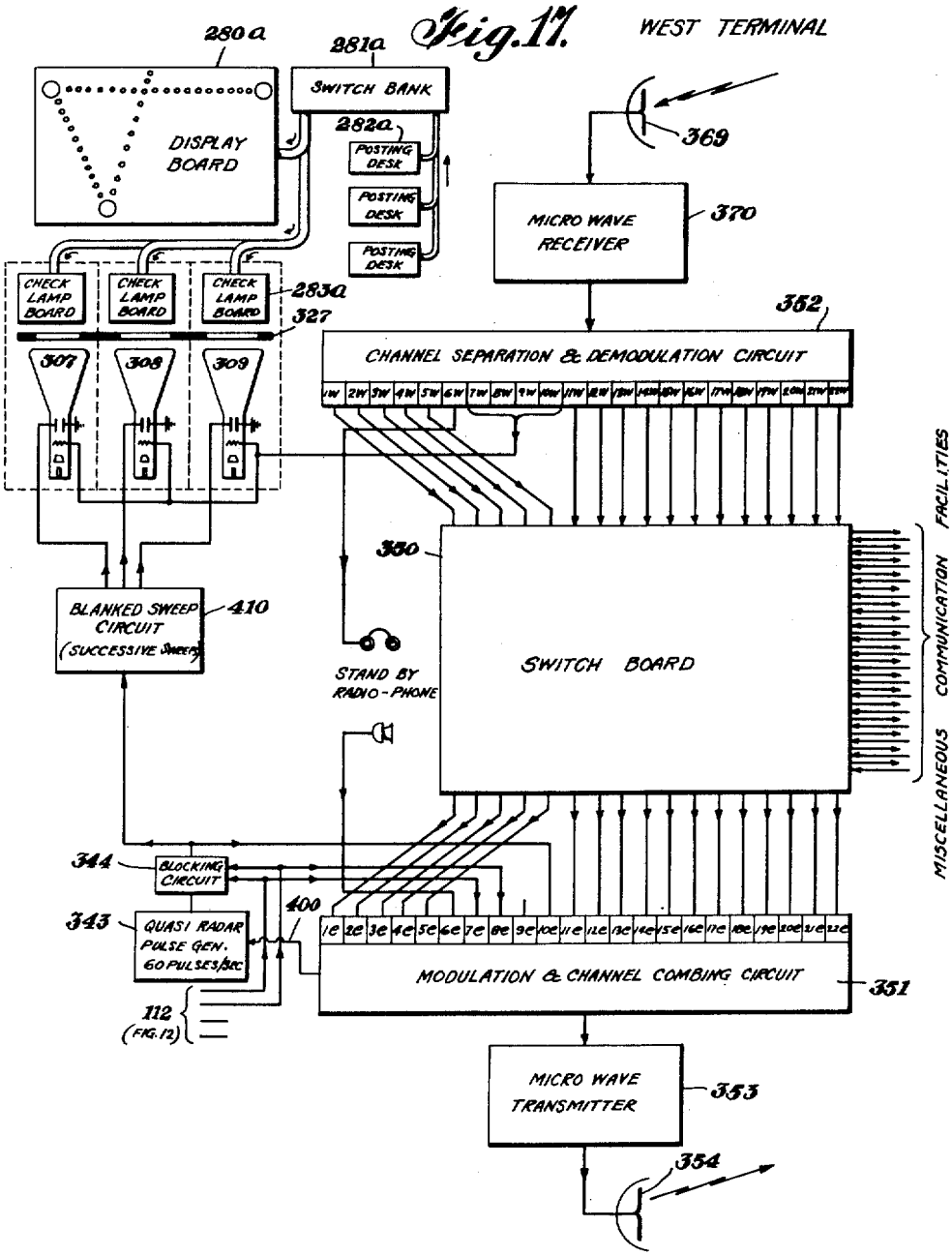
INVENTORS
EDMOND M. DELORAINE
PAUL R. ADAMS
BY
Lucy P. Lentz
ATTORNEY

TRAFFIC CONTROL SYSTEM

Original Filed April 29, 1944 20 Sheets-Sheet 14

INVENTORS
EDMOND M. DELORAINE
PAUL R. ADAMS
BY Percy P. Lantzy
ATTORNEY

TRAFFIC CONTROL SYSTEM

Original Filed April 29, 1944 20 Sheets-Sheet 15

INVENTORS
EDMOND M. DELORAINE
PAUL R. ADAMS
BY Percy P. Lantzy
ATTORNEY

TRAFFIC CONTROL SYSTEM

Original Filed April 29, 1944 20 Sheets-Sheet 16

INVENTORS
EDMOND M. DELORAINE
PAUL R. ADAMS
BY
Percy P. Lantzy
ATTORNEY

INVENTORS
EDMOND M. DELORAINE
PAUL R. ADAMS
BY Percy P. Lantzy
ATTORNEY

TRAFFIC CONTROL SYSTEM

Original Filed April 29, 1944 20 Sheets-Sheet 18

INVENTORS
EDMOND M. DELORAINE
PAUL R. ADAMS
BY Percy P. Lantzy
ATTORNEY

TRAFFIC CONTROL SYSTEM

Original Filed April 29, 1944 20 Sheets-Sheet 19

EAST TERMINAL

INVENTORS
EDMOND M. DELORAINE
PAUL R. ADAMS
BY Percy P. Lantzy
ATTORNEY

TRAFFIC CONTROL SYSTEM

Original Filed April 29, 1944 20 Sheets-Sheet 20

INVENTORS
EDMOND M. DELORAINE
PAUL R. ADAMS

BY Percy P. Lantzy
ATTORNEY

Reissued Apr. 14, 1953 Re. 23,643

UNITED STATES PATENT OFFICE 23,643

TRAFFIC CONTROL SYSTEM

Edmond M. Deloraine, Paris, France, and Paul R. Adams, Cranford, N. J., assignors to Federal Telephone and Radio Corporation, New York, N. Y., a corporation of Delaware Original No. 2,521,697, dated September 12, 1950, Serial No. 533,322, April 29, 1944. Application for reissue March 30, 1951, Serial No. 218,328

25 Claims. (Cl. 343—6)

Matter enclosed in heavy brackets [ ] appears in the original patent but forms no part of this reissue specification; matter printed in italics indicates the additions made by reissue.

This invention relates to airplane guiding and traffic control systems and pertains more particularly to radio systems for guiding airplanes along established routes and in approaching, landing and taking off from airfields.

One of the objects of our invention is to provide a system of aids to navigation and traffic control for use in extended operation of aircraft so as to permit regular operation by a standardized procedure under all weather conditions. Certain other objects of the invention involved in this system include the provision of methods and means to meet the following requirements:

a. The use of a minimum amount of radio equipment on the airplane.

b. The use of a minimum number of frequency channels.

c. Simplicity of operation and indication.

d. An operating procedure remaining substantially the same in all weather conditions.

e. The use of speech communication to give basic instructions from the ground to the airplane, and the provision of instruments on the airplane suitable for carrying out these instructions.

f. The provision of information on the ground sufficient to supervise all planes' movements, to check that they are correct or to issue supplementary instructions.

g. The possibility of gradual introduction of parts of the system.

The growth of military or civil aviation as a transportation service has been marked so far by a number of progressive steps in the solution of a number of individual problems as the full importance of each became apparent.

While step-by-step progress in the minimization of natural and artificial limitations had the advantage of presenting the problems successively, it resulted in a decided disadvantage in that these individual solutions of problems have resulted in the development of equipments that are largely unrelated and independent, each requiring its own frequency and antenna and in total adding considerably to the airplane load and drag thus involving a cost and maintenance problem of some importance.

In order to obviate many of the difficulties of prior systems and to simplify the apparatus required on the airplane, while at the same time offering other advantages, a further object of our invention is to provide a "universal system" involving the following principles:

a. Several guiding and other functions are combined with a corresponding saving in equipment and frequencies.

b. Several functions are carried out successively in time in order to share the time among a number of successive functions with a corresponding saving in equipment and frequencies.

The general problems of air navigation can be divided into three main groups as follows:

1. Approaching, landing and taking-off on and from a given airfield or the Airport problem.

2. Flying along established air routes over continents or the Airway problem.

3. Flying without following established air routes, either over continents or over oceans or the General Navigation problem.

The present invention relates mainly to the first and second cases.

As the problems increase rapidly in difficulty and complexity as the number of airplanes involved increases, it will be assumed in the description that follows that large numbers of planes are involved, some simplification being obviously possible for smaller densities of air traffic.

The landing and taking off on and from a given airfield involves the problem of controlling airplane movement near the airfield in a manner suitable for the landing and taking off of a number of airplanes simultaneously on separate runways, and to repeat this process at short intervals; the interference of poor weather being kept to a minimum. The system can be adapted to all types of airports. For high density traffic the tangential type of airport layout is most suitable and accordingly this type of airport has been taken as an example for illustration of our invention. On the other hand, the system is equally applicable to a functional three runway airport and reference has been made to an airport of that type, likewise to illustrate the flexibility of the system.

In accordance with the present invention, airport traffic control of planes prior to landing is effected by giving the airplanes such information that they can follow circular paths centered on the airport. The radio ranges which define the airways leading to the airport are connected with the circles by tangential paths or branches which are used for arrival and departure of the airplanes. The circles are characterized by specific radii and altitudes and any number of such circles may readily be provided. Ordinarily only one circle for a given altitude will be required but more than one circle could be provided if desired. Means is provided for advising the airplanes following these circles of their angular position with respect to the center or what is equivalent, their position along the circular path in which they are supposed to be flying.

The information required on the ground at the airport traffic control station is essentially the following:

a. Knowledge of the position, altitude and identification of all planes following the air route determined by the radio ranges.

b. Knowledge of the position, altitude and identification of all planes following the circular paths around the airport (before entering a runway localizer beam for landing or after leaving a take-off runway).

c. Ability to check all movements of planes.

For safe guidance and control of aircraft along airways, the following radio information and facilities are required by each airplane:

a. An indication of left-right location i. e., whether right or left of the airway (generally known as the radio range facility).

b. An indication of left-right attitude i. e., whether headed left or right of the next station ahead on the airway (generally known as the homing facility).

c. A knowledge of altitude above ground (generally known as the terrain clearance facility).

d. A knowledge of position along the airway (hereafter called the self-distance facility).

e. A knowledge of nearby aircraft (generally known as the anti-collision facility).

f. One or more channels for short range two-way telephone communication with airplanes nearby.

g. A larger number of channels for longer range two-way telephone communication with the distant air-bases from any point on the airway.

The airways control center such as a terminal airport requires the following information facilities:

g'. A suitable number of channels for two-way telephone communication with all planes along the route for giving traffic control instructions and weather information. (This is the same as the above listed service g, considered from the opposite viewpoint.)

h. A knowledge of the identities, altitudes and positions of all planes along the airway.

i. A number of telephone, telegraph and facsimile circuits between airports for exchanging traffic information, weather maps and all other messages as required.

The number of radio frequency bands needed for providing even the present 200 commercial civilian airlines with present existing facilities would be substantially greater than the number of bands now allocated for all civilian aeronautical uses; and with increasing numbers of aircraft as expected the shortage of bands will become rapidly more acute. The difficulty of obtaining new allocations of frequencies, moreover, can be expected to be extremely great if the bands requested lie in the LF (low frequency), MF (medium frequency) or HF (high frequency) regions hereafter referred to as the "longer range" wavelengths, such difficulty being substantially less if the bands requested lie in the VHF (very high frequency), UHF (ultra high frequency) or SHF (super high frequency) regions hereafter referred to as the "optical range" wavelengths. It is, therefore, necessary at the outset to consider how many of the desired facilities can be satisfactorily taken care of by optical range radiations and how many really require the longer range wavelengths.

It is at once apparent that the terrain clearance, self-distance and anti-collision facilities above listed as c, d and e would normally be performed with the optical range wavelengths. It is also fairly clear that the plane-to-plane telephone communication above listed as f could be taken care of by optical range radiations. In addition the radio range and homing facilities above listed as a and b can be performed with "optical range" wavelengths if one is willing to increase the number of range stations by a factor of about two to one.

The equipments required on the ground are approximately as follows:

1. A number of radio range transmitters suitably spaced to maintain optical line of sight with any airplane flying along the airway.

2. A number of responders or similar equipments for giving self-distance indications to every plane flying along the airway.

3. A number of optical frequency two-way radio-telephone ground stations suitably spaced to maintain optical line of sight with any airplane flying along any of the airways.

4. A sufficient number of communication channels to interconnect all the radio-telephone stations mentioned in 3 above, with the flight control centers.

5. A number of radar equipments spaced along the airway at suitable intervals to maintain almost optical line of sight with any airplane flying along the airway.

6. A sufficient number of communication channels to interconnect the radar equipments mentioned in 5 above, with the flight control center.

7. A number of base-to-base telephone, telegraph and facsimile circuits between the airbases at the ends of the airway.

In the system of the present proposal, it is further contemplated that the combination stations at which all the required communication and navigation facilities are to be concentrated should be spaced somewhat closer than in the past (which permits the use of smaller power not only at these stations but also in the airplane transmitters) and should each be provided with a tower of moderate height. By such arrangement, it is possible to provide an optical line of sight between each tower and the next one; and the proposed system takes advantage of this fact to provide the required group of communication channels between airports by means of a series of multi-channel UHF or SHF radio links between successive towers. A wide-band repeater equipment is provided in each tower, so that the successive radio links are joined together into a chain which forms an artery of communication, extending between airports and capable of carrying a number of communication channels.

The relay stations along the airway must be at such distances apart that there is an optical path between the tops of the successive towers installed at these stations. In order to limit the towers to less than 100 feet, the spacing will be 20 miles approximately in flat country and usually larger in regions of irregular level.

Each tower carries four antennas for radiating and receiving narrow beamed micro-wave links in both directions and also a two-way UHF broad band repeater to join these links into a continuous chain. Such chain handles a multi-channel communication system between the distant airbases. Such communication system carries all the base-to-base traffic including facsimile transmission service.

This multi-channel system may, in addition, have "outbranching channel" equipment for branching a few communication channels out from the artery at each tower or relay station and also "inbranching channel" equipment.

For example, a chain of towers extends east and west between two airbases. This western airbase may be referred to as the master base which primarily controls the facilities. Three channels from the eastbound artery from the master base may be branched out at each tower and five channels may be branched in from each tower into the westbound artery for reception at the master base. Of these three outbranching channels, two will be the same channels at all towers, while four of the five inbranching channels will likewise be the same channels at all towers, these being used to handle a quasi-radar service and synchronize the transmissions of the radio range facilities as more fully explained hereinafter.

The remaining channel which is branched out at each tower as well as the remaining channel which is branched into the artery at each tower may be connected respectively to speech modulate a fixed-tuned low power VHF radio-telephone transmitter and to receive speech from a fixed-tuned VHF radio-telephone receiver for communication with airplanes near such tower. The two channels which are thus branched in and out at any given tower for two-way plane-to-base telephony will be different channels from those similarly used at the adjacent towers, in order that a number of different pairs of channels will be available along the airway for simultaneous speech between the western base and a number of different airplanes. The channels used for such plane-to-base telephony may be repeated every few towers, however, so as to require only six to twelve eastbound and six to twelve westbound channels even for a long air route having twenty to thirty towers. The VHF radio frequencies used to carry the communications between the towers and the airplanes may also be repeated every few towers so that the airplanes' VHF radio-telephone equipments need only be capable of selecting five or six different pairs of frequencies while yet permitting six to twelve simultaneous conversations depending on the number of channels. Many different allocations of channels and frequencies may be made in accordance with operating requirements, one or two typical arrangements being given by way of example in the more detailed description which follows.

As many channels as required can thus be provided for plane-to-ground use over long distances without requiring any frequencies other than five or six VHF speech bands used in the airplane radio-telephone equipment and the two wide bands used for the chain of tower-to-tower links. It is especially to be noted that long range plane-to-base telephone is thereby accomplished without the use of a single one of the scarce long range wavelengths below 30 mc.

One channel of the airplane VHF equipment can be reserved for direct communication with airplanes nearby. If communication is desired between planes too far apart for direct interworking, such communication can be carried on through the chain of towers in the same manner as a plane-to-base communication.

Heretofore desired information, whether required directly at the airport or for relaying along the airways or on the aircraft, as the case may be, could be obtained or given only by a combination of known methods involving a number of different frequencies and several independent or only semi-correlated radio antennae, transmitters and receivers. In the system of the present invention an essential feature is the giving of all required services and information with a minimum number of frequencies and a minimum amount of equipment and antennae on the airplane.

In accordance with our invention, the desired advantage of reduction in the number, weight and complexity of equipments and antennae and the reduction in the number of frequencies required is brought about by means of pulse modulation utilizing pulses of various types and characteristics. In order to combine the advantages of pulse operation with the benefits of conventional continuous wave (C. W.) operation some of the signals may be short pulse modulated carriers of ½ microsecond duration, more or less, which would be handled in accordance with pulse technique, while certain other signals could be much longer, and, in fact, may actually comprise brief signal trains of carrier waves modulated with tone modulations which may be separated by the conventional heterodyning and filtering techniques used for C. W. transmission.

While the use of short duration pulses results in a wider frequency band than ordinary C. W. transmission, if the number of channels required is taken into consideration, as well as the selectivity and frequency stability attainable in practice, the total frequency band required with the new system of our invention is much less than would result from the use of C. W. methods.

Since the control of transmission is effected from the ground at the airport, it is possible to synchronize the various transmissions in such a way that the pulses and short trains of signals corresponding to the various services will be sent in sequence, and to leave in between pulses and signal trains enough time interval to take care of the effects of the different locations of equipments, and the different locations of incoming and outgoing airplanes with respect to the same.

All of the pulses and signalling trains which are radiated from the various transmitters on the ground may be, in accordance with our invention, received by one antenna and one broad band receiver equipped with one or two antennas on each plane. The various types of signals used for different services are separated by pulse separation techniques and by tone separation techniques, such separation being performed after the signals have been received and detected in the common receiver to yield the pulses or trains of tones.

Some transmission must take place from the airplane, for example, to determine the distance of the plane from the ground or from a repeater. In this case, it is not possible readily to synchronize the pulses sent by one plane with respect to the pulses sent by other planes. In the following description an explanation is given of how three sets of pulses may be sent from each airplane, one of these sets uses pulses of, for example, ½ microsecond duration transmitted at sufficiently long intervals so that their transmission times occupy only ½ of one per cent of a given time interval. The other two sets of pulses transmitted from the planes are transmitted at still lower rates so as to occupy, for example, less than 1/20 of one per cent of said given time interval, thus the percentage of pulses which overlap each other is small enough to avoid difficulties.

In the case of certain services, e. g. determination in an airplane of its own distance from the ground or from a repeater, it is necessary to distinguish between the reflected or repeated pulses originated by the given airplane and other similar reflected or repeated pulses originated by other airplanes. By using widely spaced pulses and permitting their repetition rates to vary in random manner within certain limits, it is readily possible to recognize the desired received pulses by the fact that their timing corresponds exactly to the timing of the pulses previously transmitted by the given plane.

From the foregoing introductory description and the following detailed description, it will be clear that our invention shows how to handle, at a given airport on a time basis and on one single "ground" frequency, the following services:

1. A number of Radio Ranges in the same area converging toward the same airport.
2. A number of localizers simultaneously in use at the same airport.
3. A corresponding number of Glide Paths simultaneously in use at the same airport.
4. A high speed rotary beacon radiating special azimuth signals successively in different directions so as to enable any airplane to determine its azimuth in respect to the center of the airport.
5. Range transmitters or beacons spaced at desired intervals along the airways.
6. A forward scanning radio compass on the plane receiving the signals from any selected one of the localizer or range transmitters on the ground.

Assume, for example, with regard to items 1, 2 and 3 above, that there are four ranges, three localizers and three glide paths in use at once around one airport. Each of these determines an equi-signal path by means of two tone modulated carrier waves substantially as in the existing types of equipment. The two modulation "tones" used for any one of the equipments will be of the order of hundreds of kilocycles, however, instead of ninety and one hundred and fifty cycles (so as to reduce the weight of the receiver filter) and will be different from the "tones" used in the other equipments. Thus, for ten equipments simultaneously in use twenty different modulating "tones" would be used. The radiations, moreover, are intermittent and are timed so as not to overlap, thus avoiding interferences.

With regard to item 4 above, the beacon is generally similar to known types of "omnidirectional" beacons, but rotates at high speed so as to give substantially continuous indications. The rotating beam of this beacon is characterized by a null-and-maximum type of pattern essentially similar to an equi-signal pattern but produced by transmitting two kinds of pulses in immediate succession, one kind of pulse being transmitted with a pattern which has a null along the axis of desired reception while the other pulse is transmitted according to a pattern which has a maximum along this axis. Thus, reception of the second type of signal without the first indicates that the airplane in question is aligned with the axis.

One can also transmit on one single "airplane" frequency (preferably higher than the ground frequency) a series of pulses generated on each airplane which will be used as follows:

1. To measure the terrain clearance by measuring the time between the transmission of these pulses and the reception of the same pulses reflected from the earth.
2. To determine the distance of the airplane from the center of the airport and/or from towers along the airway by measuring on each airplane the time interval between the transmitted pulses and the pulses retransmitted from a repeater at the airport or tower, as the case may be. This repeater will receive pulses at the airplane frequency, but will retransmit them at the ground frequency.
3. To show directly the position of the airplane with relation to a map of an airport and surrounding territory by combining the distance indication and azimuth indication above mentioned in a suitable polar coordinate indicator. Such an arrangement provides an accurate control of the flight patterns between the radio ranges and the localizer paths, the desired flight patterns being merely printed on the map upon which the position of the airplane is projected.
4. The same method enables the airplane to determine its distance from the end of the runway on following the localizer, thus replacing the markers now used for this purpose.
5. An anti-collision function is obtained by using a second series of pulses at the same "airplane" frequency together with a form of direction finder giving the approximate directions of any nearby airplanes. The latter transmission is modulated so as to indicate the altitude to nearby airplanes and likewise obtain the altitude indications of the nearby airplanes.
6. By means of a third series of pulses sent out at the same higher frequency from each airplane in reply to the signals from the rotary beacon, a quasi-radar service is provided on the ground which indicates the positions of all airplanes in respect to azimuth and distance more conveniently than is possible with ordinary radar equipment.
7. By modulating and keying this third series of pulses, the altitude and identity of each airplane is continuously indicated on the same screen used for the quasi-radar indications. This automatic reporting thus provides continuously the information which is now obtained at intervals by oral communications from the pilots. Since these indications of altitude and identity are directly shown on the quasi-radar screen, there is no difficulty in associating the altitudes and identities with the positions of the corresponding planes.

In accordance with the present invention, a radio system is provided in which all indications above listed may be given by means of a number of ground equipments employing only two major high frequencies, one for transmitting and one for receiving, and so synchronized that only one main UHF receiver, one auxiliary UHF receiver and one single UHF transmitter is required on the airplane.

The above and other objects and features of our invention and the manner of attaining them are more fully explained in the following detailed description taken in conjunction with the accompanying drawings, in which:

Fig. 1 is a diagrammatic view in perspective of three airports with associated airways; and Fig. 1A is an enlarged view of a part of the airway;

Figure 13A:
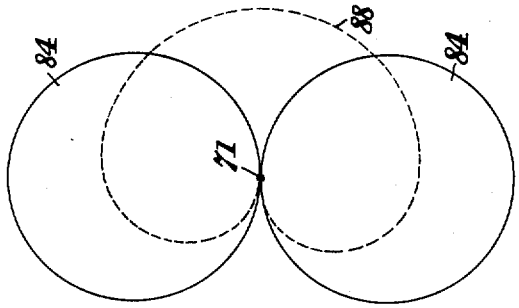
Figure 14:
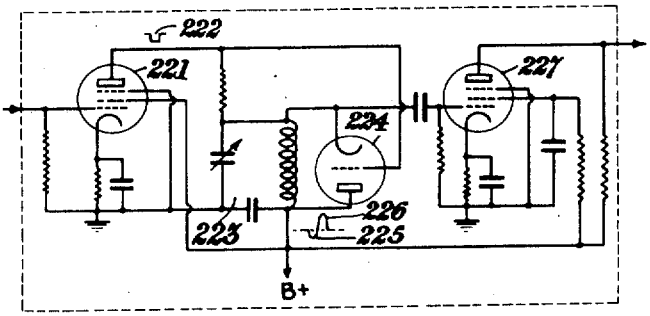
Figure 9:
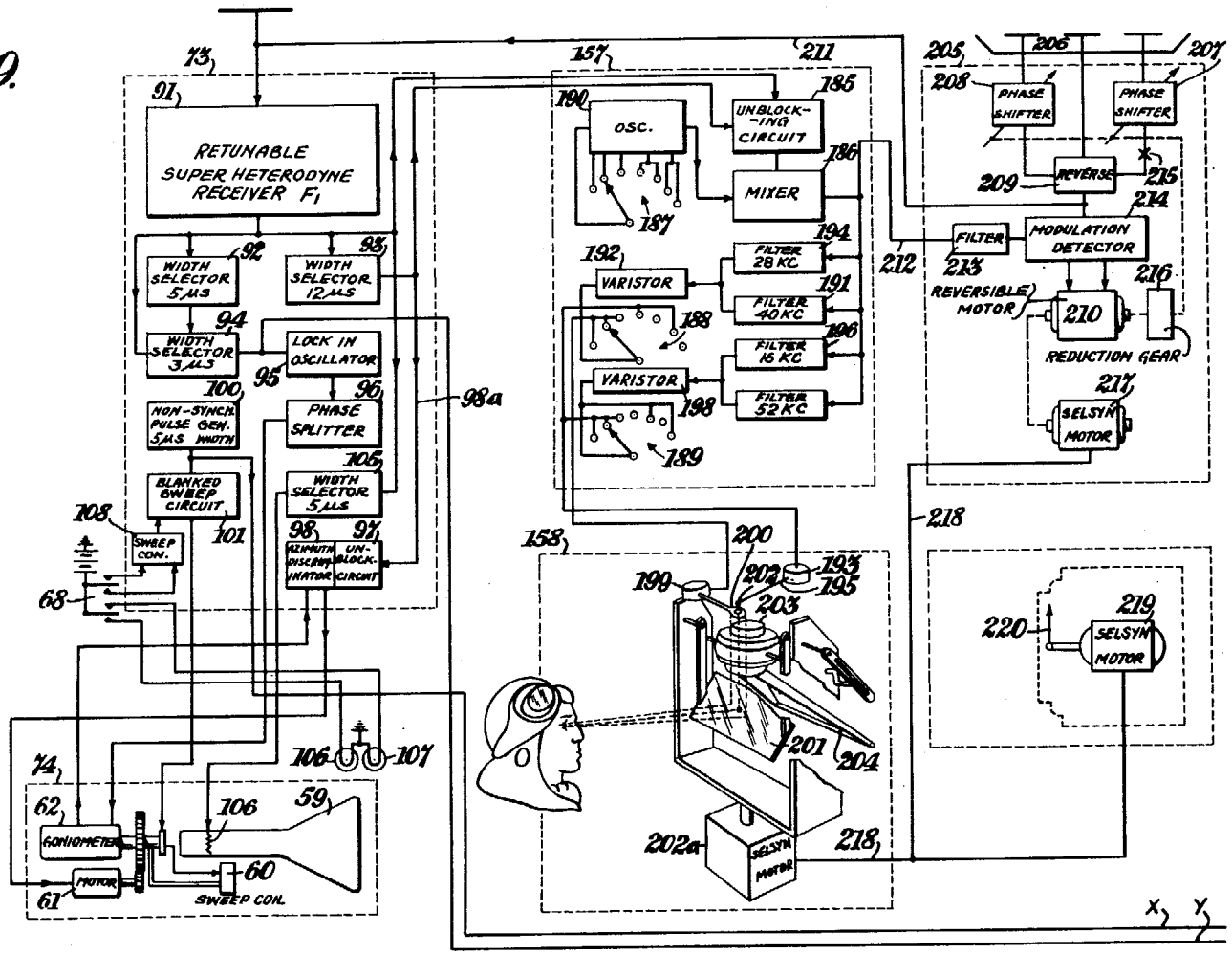
Figure 10:
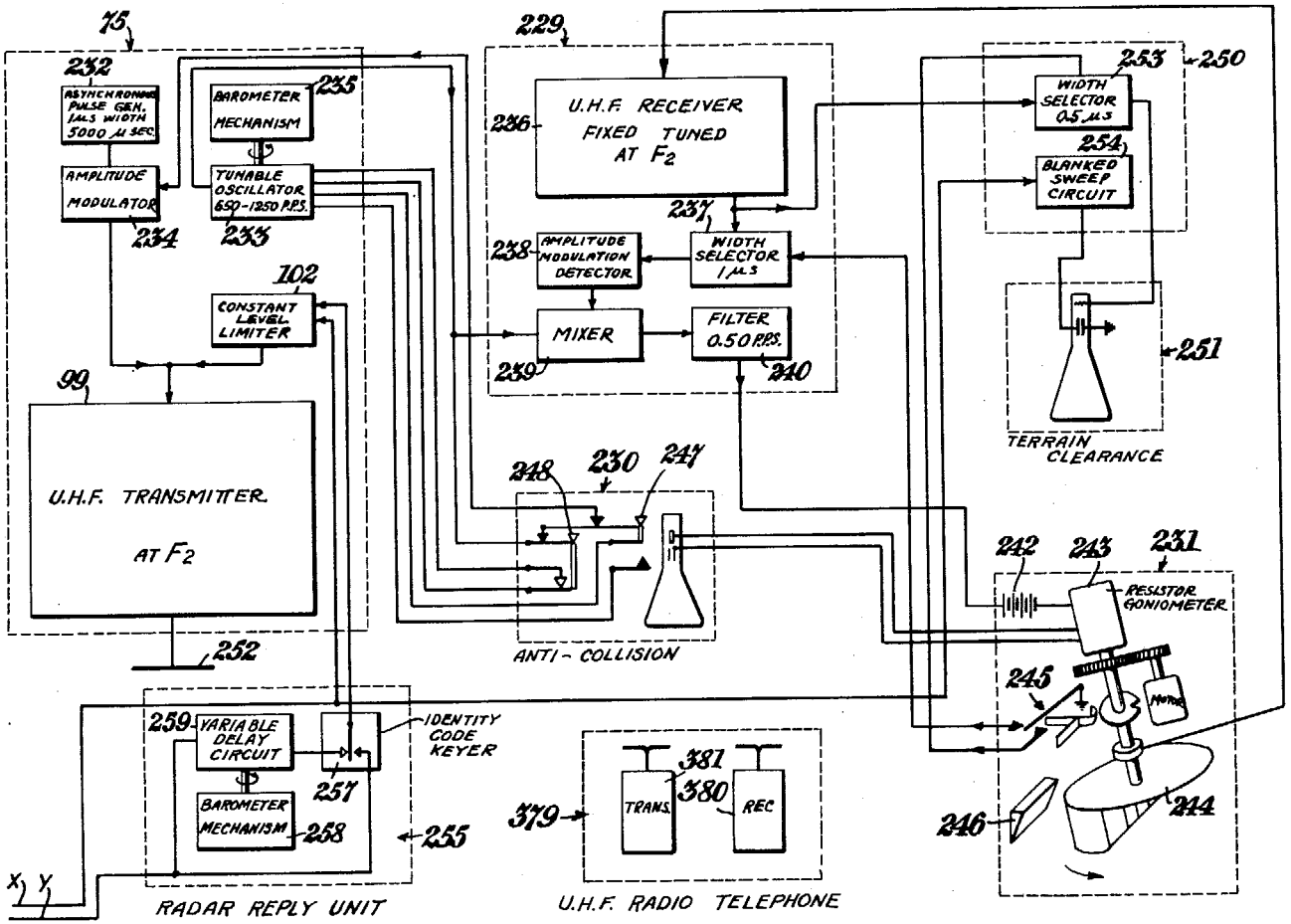
Figure 11:
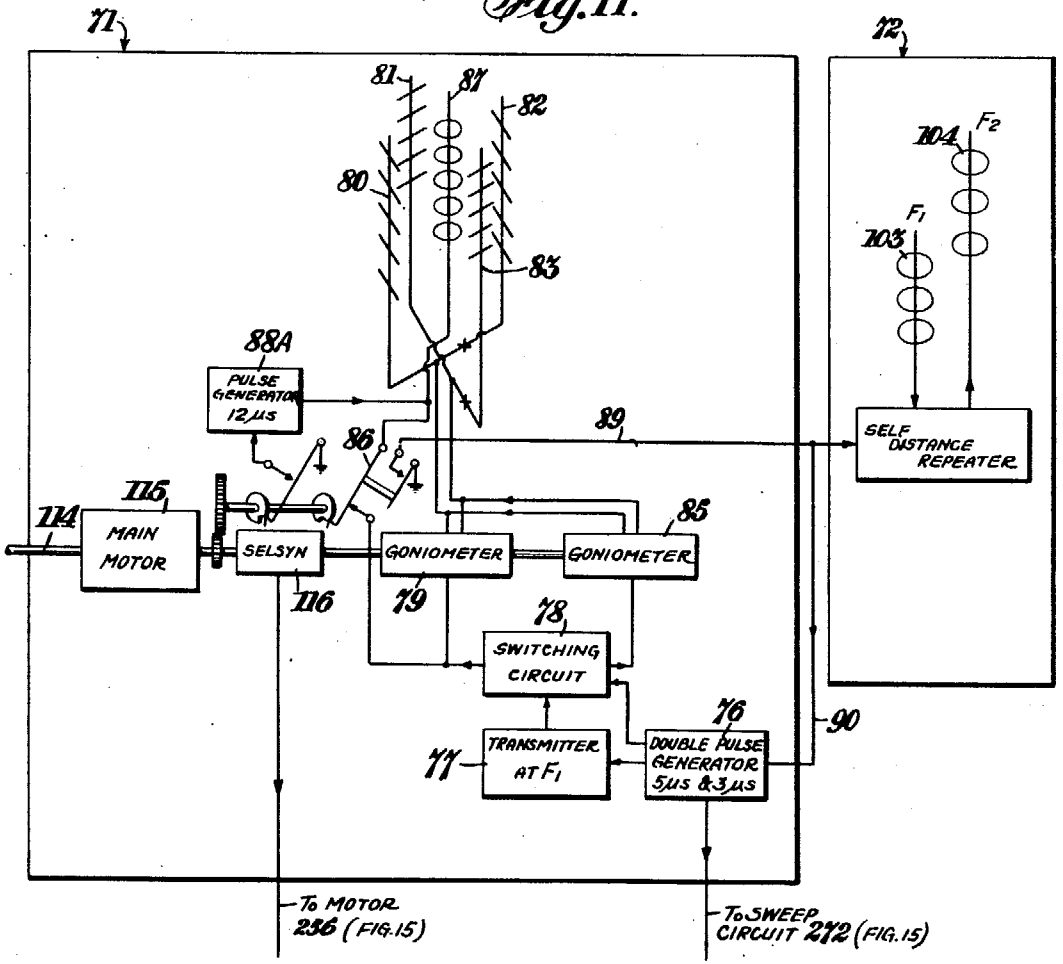
Figure 12:
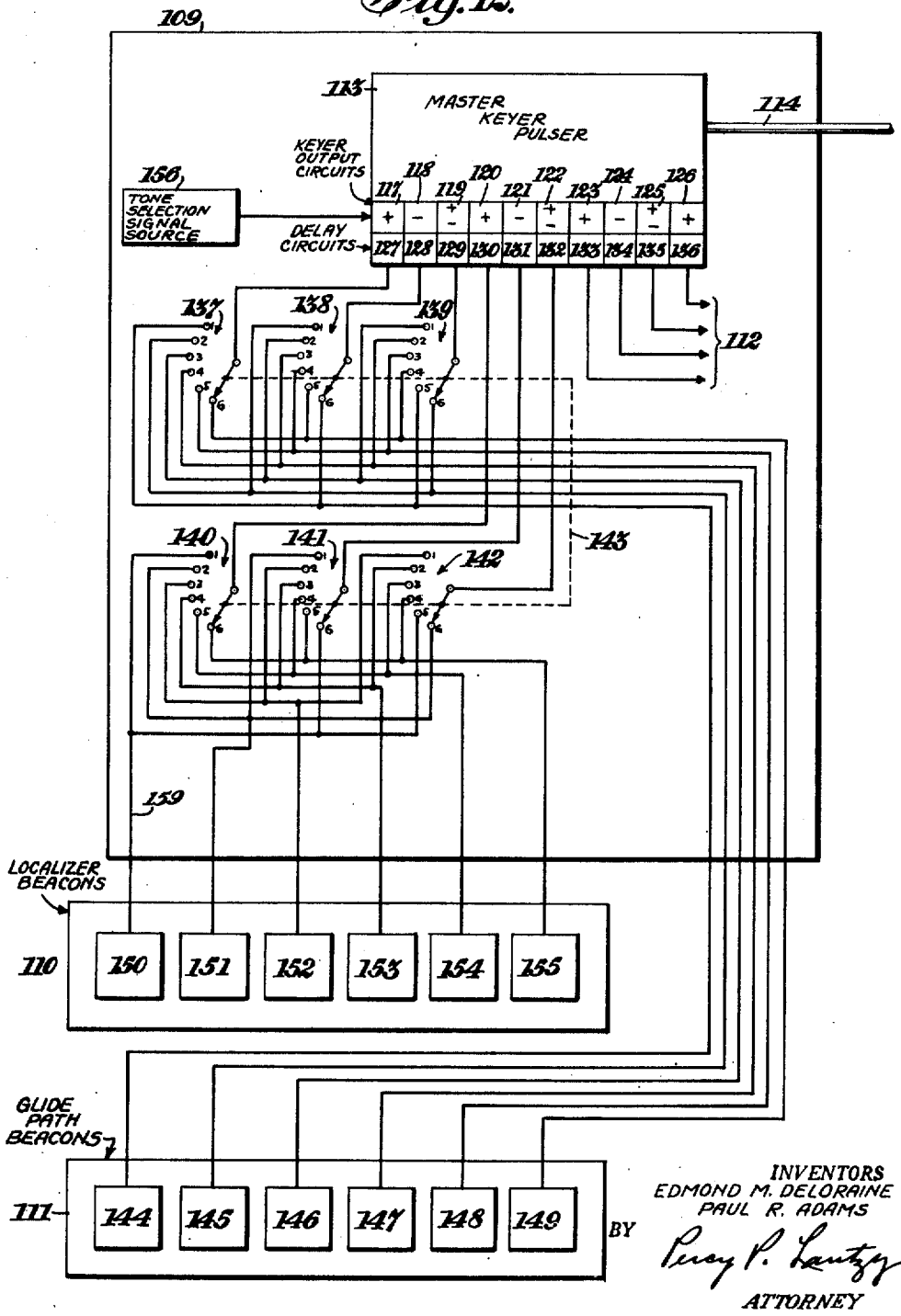
Figure 15:
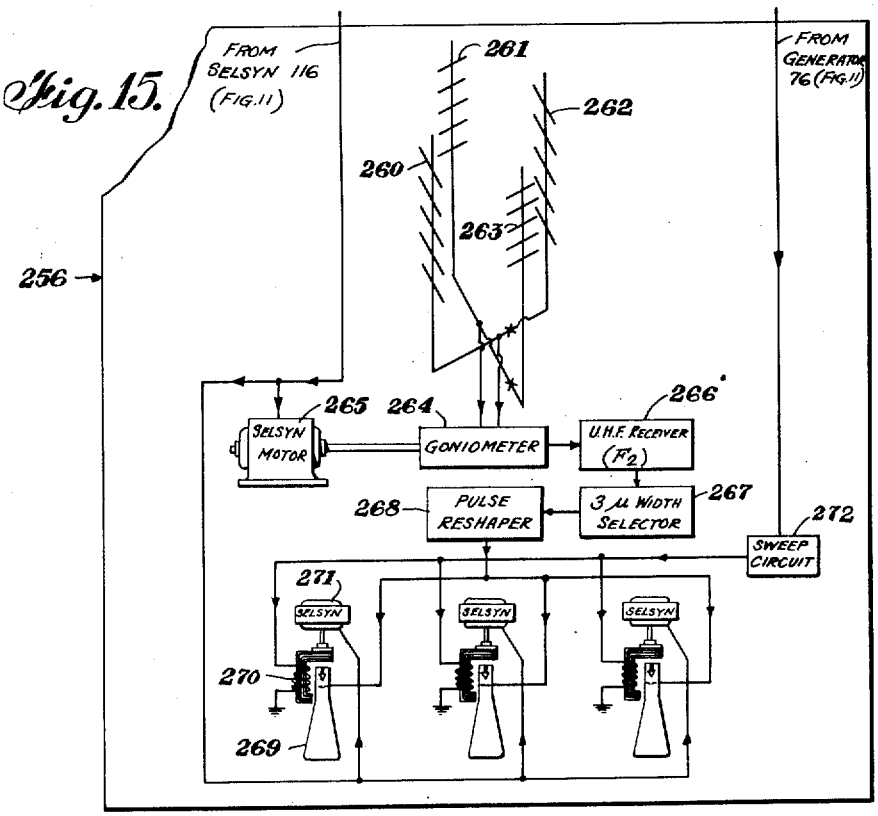
Figure 16:
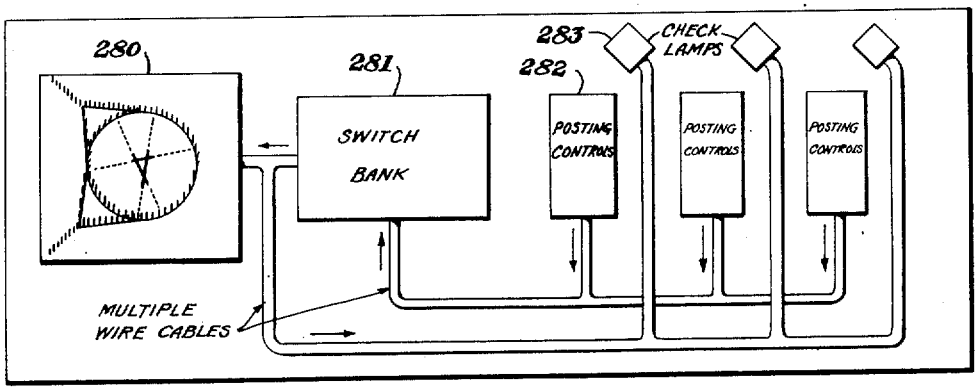
Figure 19:
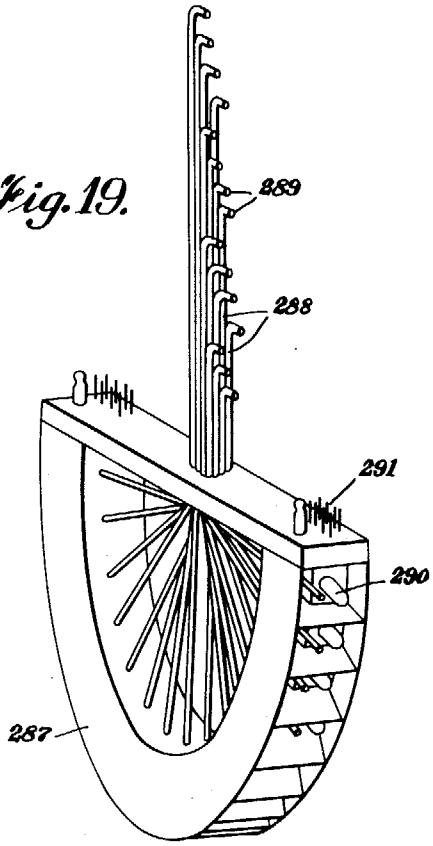
Figure 18:
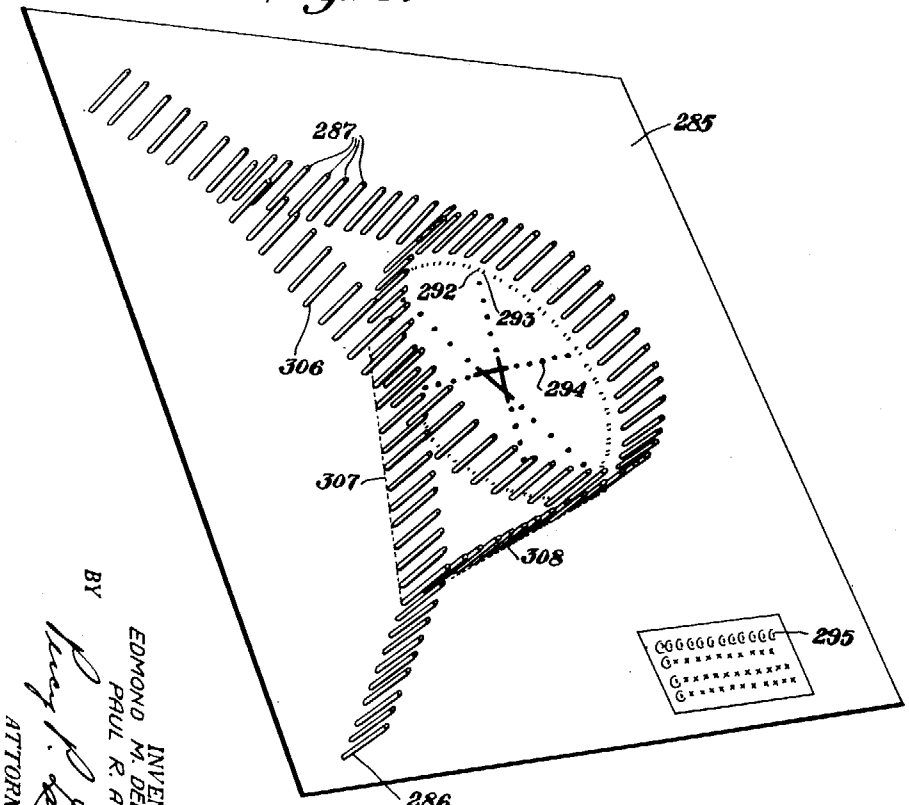
Figure 20:
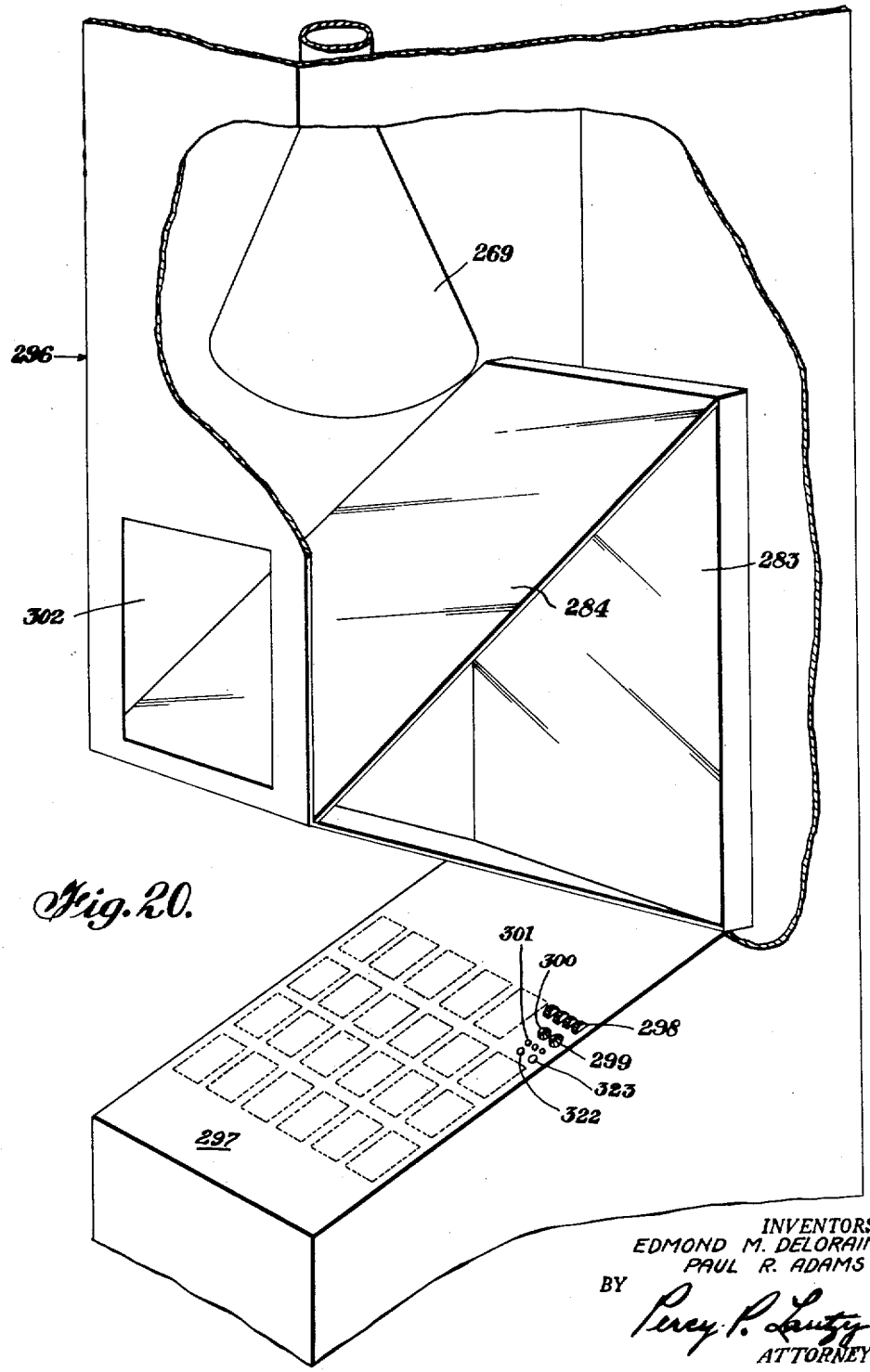
Figure 21:
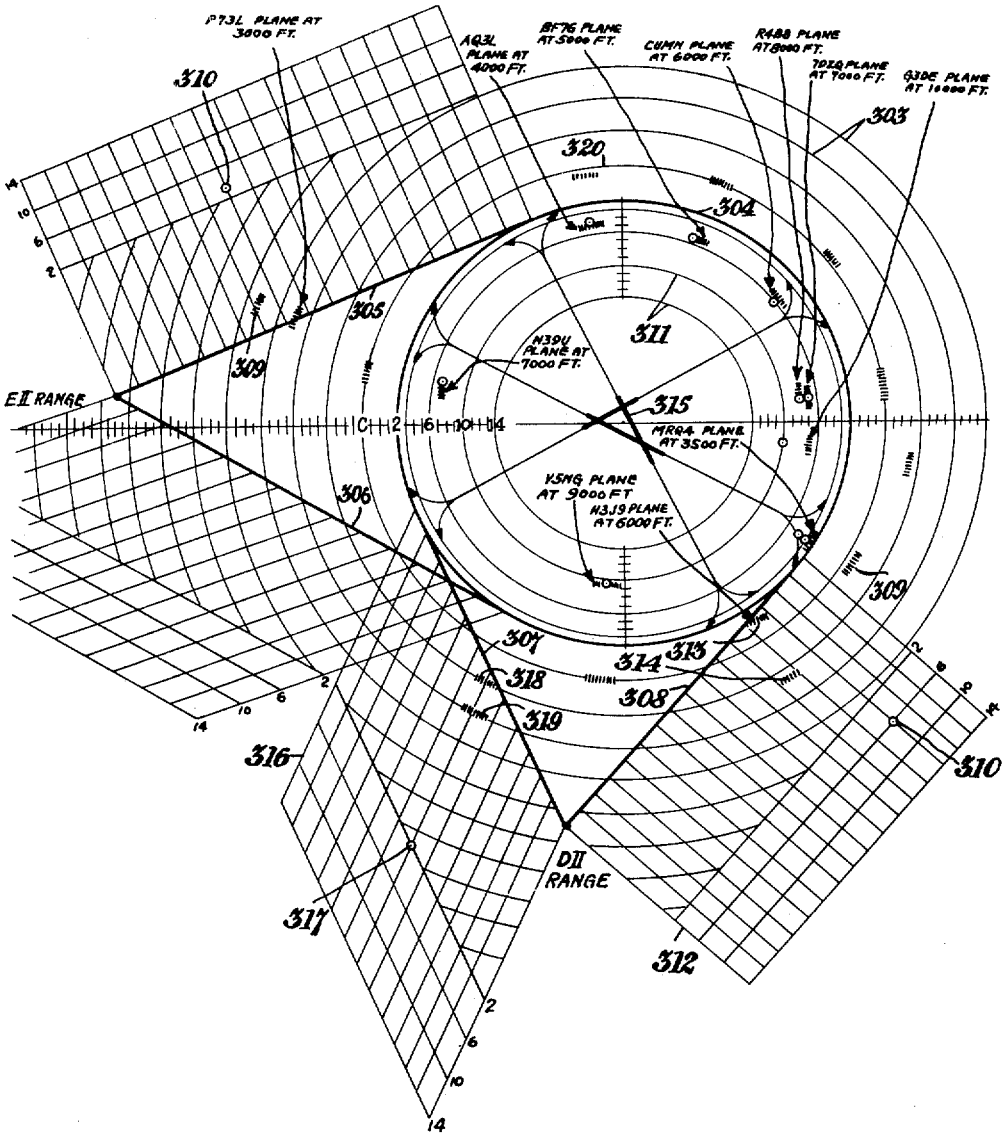
Figure 22:
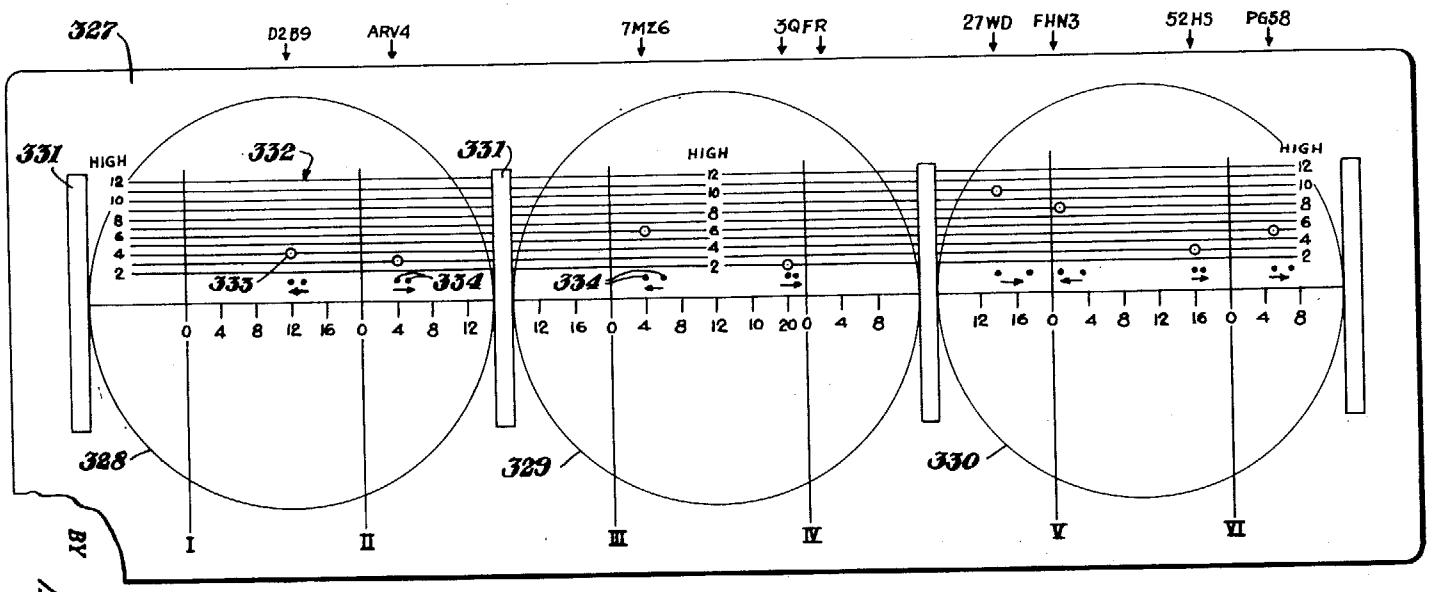
Figure 23:
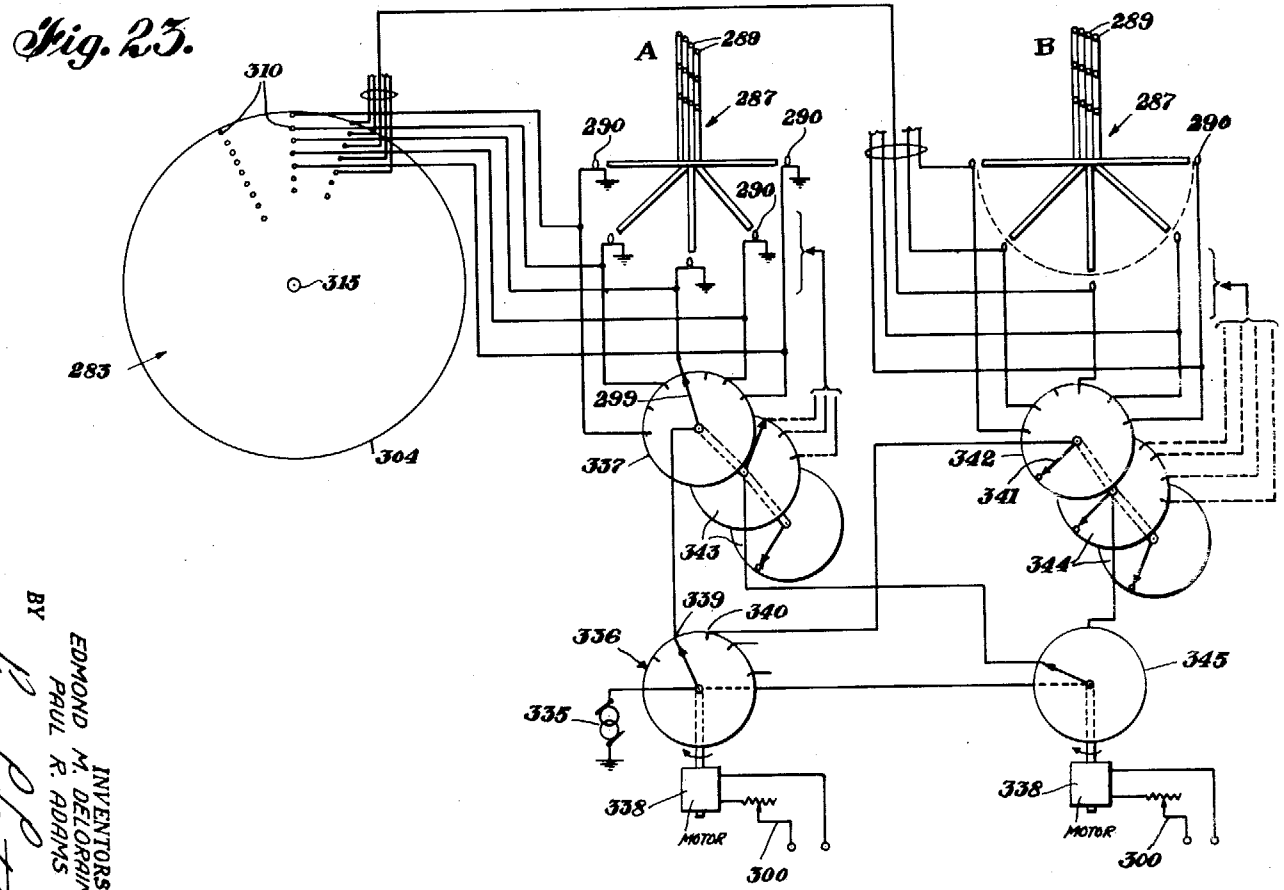
Figure 24:
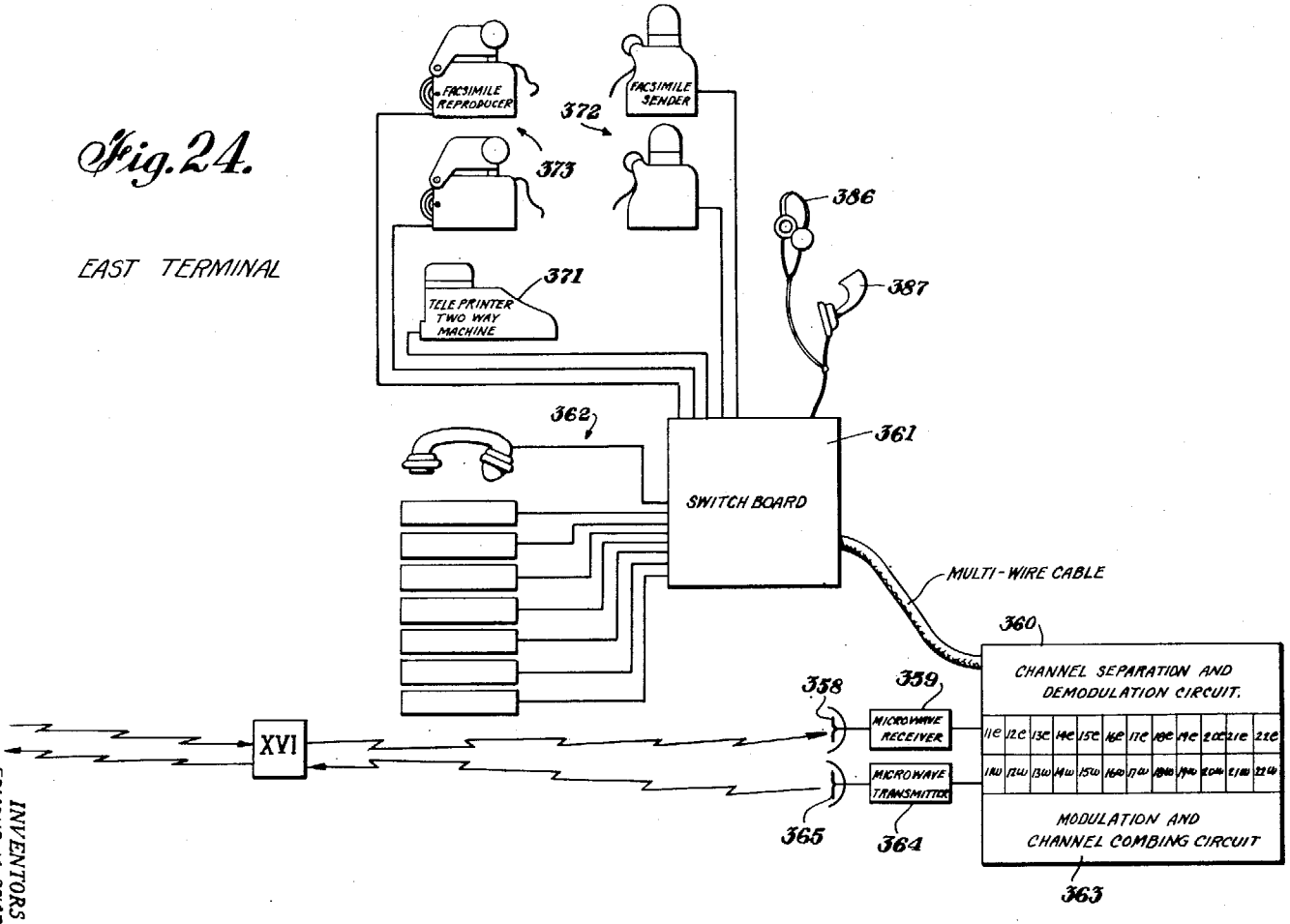
Figure 25:
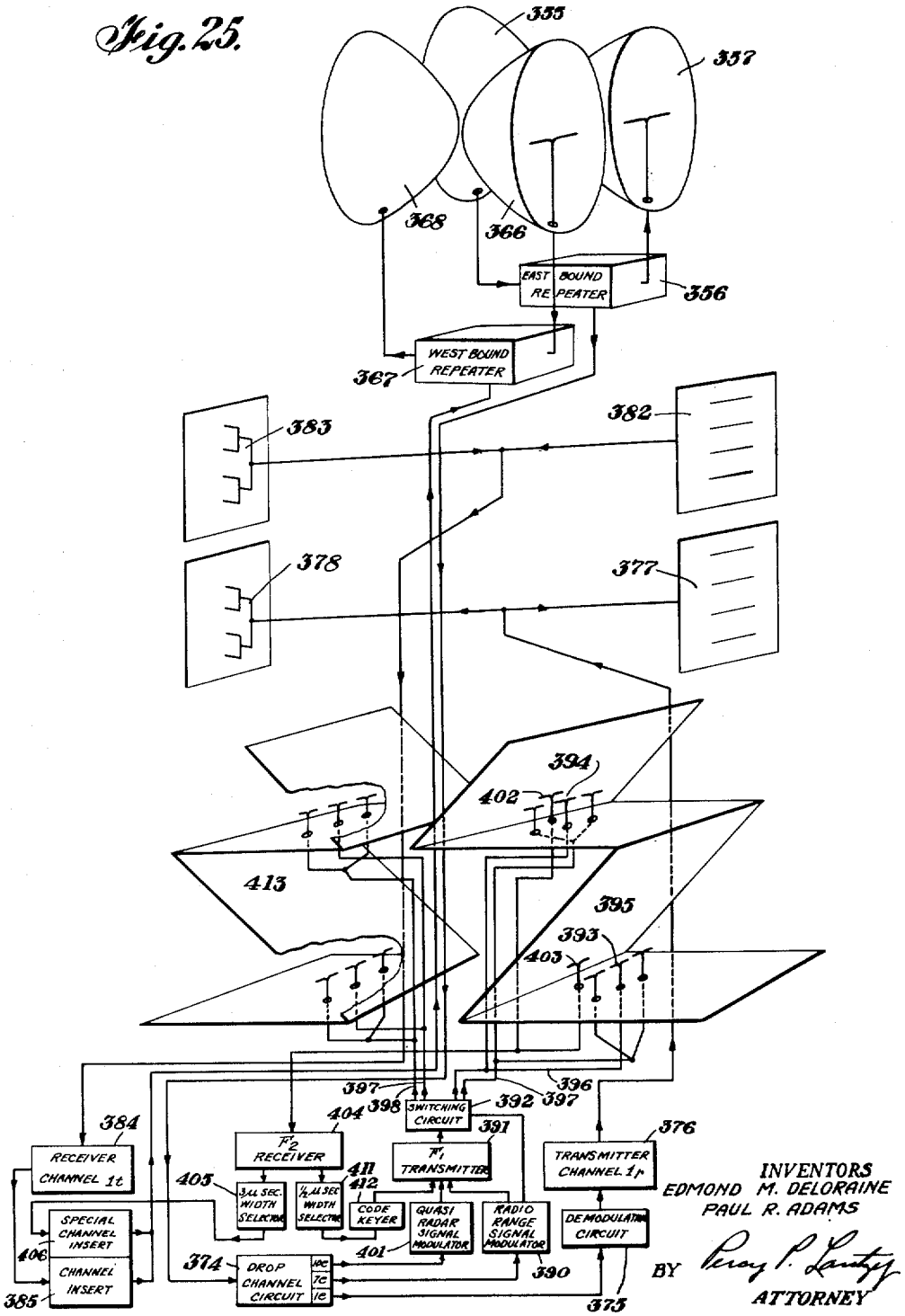

Figs. 9 and 10 taken together show circuit diagrams of the aircraft equipment for producing various indications;

Figs. 11 and 12, taken together, illustrate the transmitter installation at an airport, Fig. 11 showing the rotary beacon and distance repeater circuits, and Fig. 12 showing localizer and glide path beacon arrangement;

Fig. 13 is a schematic diagram of a localizer beacon;

Fig. 13A is a diagram of the field patterns produced in the rotary beacon of Fig. 11;

Fig. 14 is a wiring diagram of a pulse width selector circuit used in the system;

Fig. 15 is a schematic diagram of the quasi-radar indicator at the airport;

Fig. 15A is a view of the sweep pattern of one of the oscilloscopes of Fig. 15;

Fig. 16 is a block diagram of the display and posting desk equipment at the airport;

Fig. 17 is a schematic diagram of the airways terminal equipment showing the quasi-radar equipment for indicating the location of aircraft along the airways;

Fig. 18 is a view in perspective of a three-dimensional display board representing an airport;

Fig. 19 is a view in perspective of one of the display units used in the display board;

Fig. 20 is a view in perspective with parts broken away of a posting desk of the character used in the equipment of Figs. 16 and 17;

Fig. 21 is a diagrammatic view of the airport as obtained in the viewing frame of a posting desk used in Fig. 16;

Fig. 22 is a diagrammatic view of an airway as obtained in the viewing frame of a posting desk used in Fig. 17;

Fig. 23 is a schematic circuit diagram of the controls for one of the posting desks and associated display board;

Fig. 24 is a schematic diagram of the terminal and relay equipment of the system showing in detail the communicating features thereof; and Fig. 25 is a schematic diagram of the relay equipment used on the towers of the airways.

In Fig. 1, there is shown in schematic form the layout of a typical airways system according to the principles of our invention providing communication and quasi-radar facilities between airports 1, 2, 3 and between airports and planes 4 and 5 over intermediate repeater or relay towers 6 which may be spaced along the airway, say, every twenty miles, more or less, depending upon the terrain. Each airport is provided with a multi-channel ultra high frequency transmitter adapted to send signals to other airports and to planes in flight by way of the repeater towers 6 (see Figs. 1A and 25) which are equipped with highly directional antennas providing for radiation in specified directions such as east and west, as well as upwards or for general broadcasting in all directions, thus providing facilities for communication as well as range signals.

The planes, in order to properly cooperate with the traffic-control system are provided with transmitting and receiving equipment adapted for ultra high frequency signalling and adapted to indicate their identity and altitude as described in more detail hereinafter.

Landing beacon system in general

Figure 2:
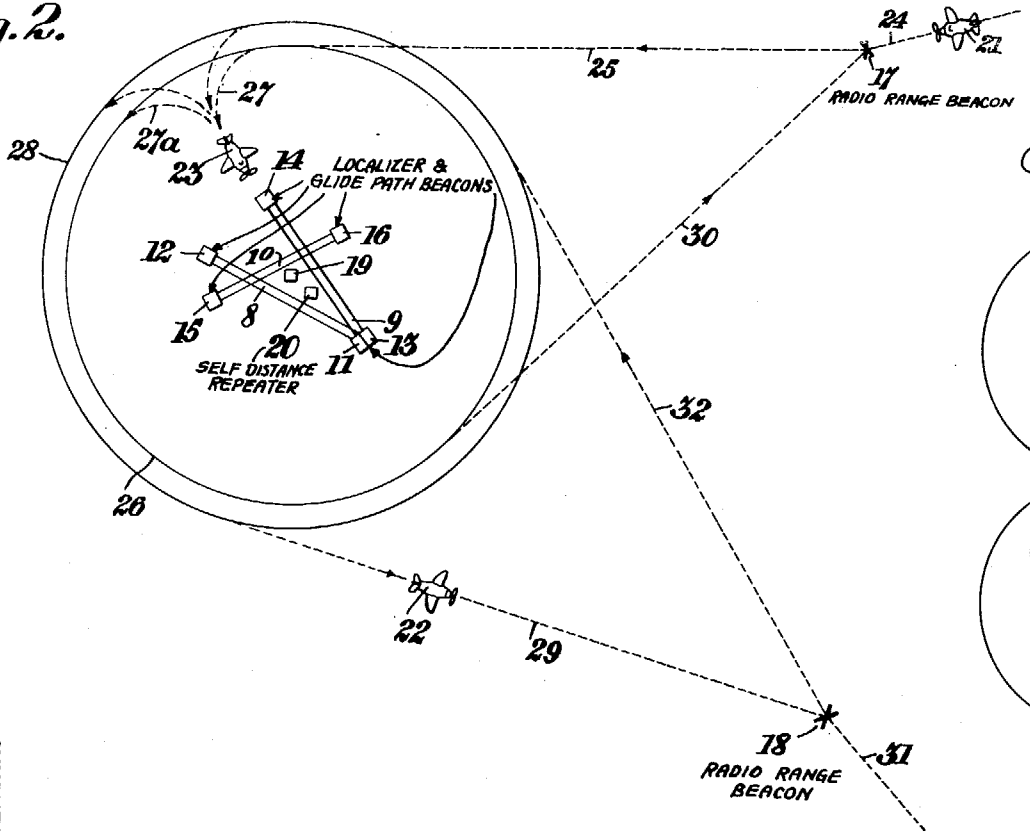
Fig. 2 is a plan view illustrating the general airport and radio range system.

Referring to Fig. 2, we have illustrated in plan view, the associated airway ranges and landing beacons of a simple airport layout which may be assumed to be one of the airports of Fig. 1. In the airport are provided three landing runways 8, 9, and 10. At opposite ends of each of the runways 8, 9, and 10 are provided localizer and glide path beacons 11, 12, 13, 14, 15 and 16 which serve to provide landing signal indications for guiding a craft into landing. A plurality of radio range beacons spaced from the airport are shown at 7 and 18, which beacons serve to guide the aircraft to a location at a predetermined distance from the airport itself. Additionally, at the airport is provided a rotary radio beacon 19 and a self-distance repeater 20. The aircraft, such as shown at 21, 22 and 23, are each provided with receiving equipment for receiving signals from selected ones of the range localizer and glide path beacons for guiding the craft into the airport. Additionally, each of the aircraft is provided with transmitter equipment for transmitting pulses to the self-distance repeater 20 so that the aircraft may be apprised of its location with respect to the airport. The particular airport and aircraft equipment will be described in more detail in connection with other specific figures.

While the airport of Fig. 2 is shown to have only three runways it will be understood that our invention is not so limited for there may be a great many more runways arranged, for example, tangent to a common circular airport loading, unloading and tanging zone.

Aircraft 21, for example, is shown approaching the airport on range 24 provided by beacon 17. After passing beacon 17, the aircraft will follow a path 25 to a point tangent to the imaginary circle indicated at 26. The craft will circle the airport maintaining its distance on circle 26 by means of the self-distance repeater signals until instructions for landing are received. The craft will then follow path 27 provided by range beacon 13 into a landing at runway 9. As shown, craft 23 is now approaching a landing on this runway. It will be understood that generally only one of these three runways may be used at a time since only that runway in which the wind direction is favorable may be used. On departure from this runway a craft will follow the path 27A to the imaginary circle 26 or to an outer imaginary circle 28 and thereafter will follow one of the departure paths 29 or 30 to radio range 31, provided by range beacon 18 or to radio range 21, provided by beacon 17. Aircraft 22 is shown following a path 29 to the range 31. An approach path 32 from radio range 18 to outer circle 28 is also shown in the drawing.

It will be understood that, in addition to the radio signals from the radio euipment, the craft will be informed of its attitude with respect to the horizontal by means of a known type of equipment providing artificial horizon indicators and of its compass direction by auxiliary compass equipment arranged on the craft.

In accordance with certain embodiments of our invention, the functions of these auxiliary equipments are combined with the indications from the radio transmission apparatus on the craft to provide a combined signal indication.

Preferably, the radio beacon transmitters for providing the localizer, glide path, range and rotary beacon signals and, if desired, also the self-distance indication signals are successively operated and operate on a common frequency so that a single receiver and indicating apparatus may be provided on the craft to receive all of these indications. Furthermore, these signals are preferably repeated at relatively short intervals so that substantially continuous indications may be provided on the aircraft. This will be brought out more clearly in the further specific description of the particular circuit embodiments in accordance with our invention.

Landing beam indicator on aircraft

Figure 3:
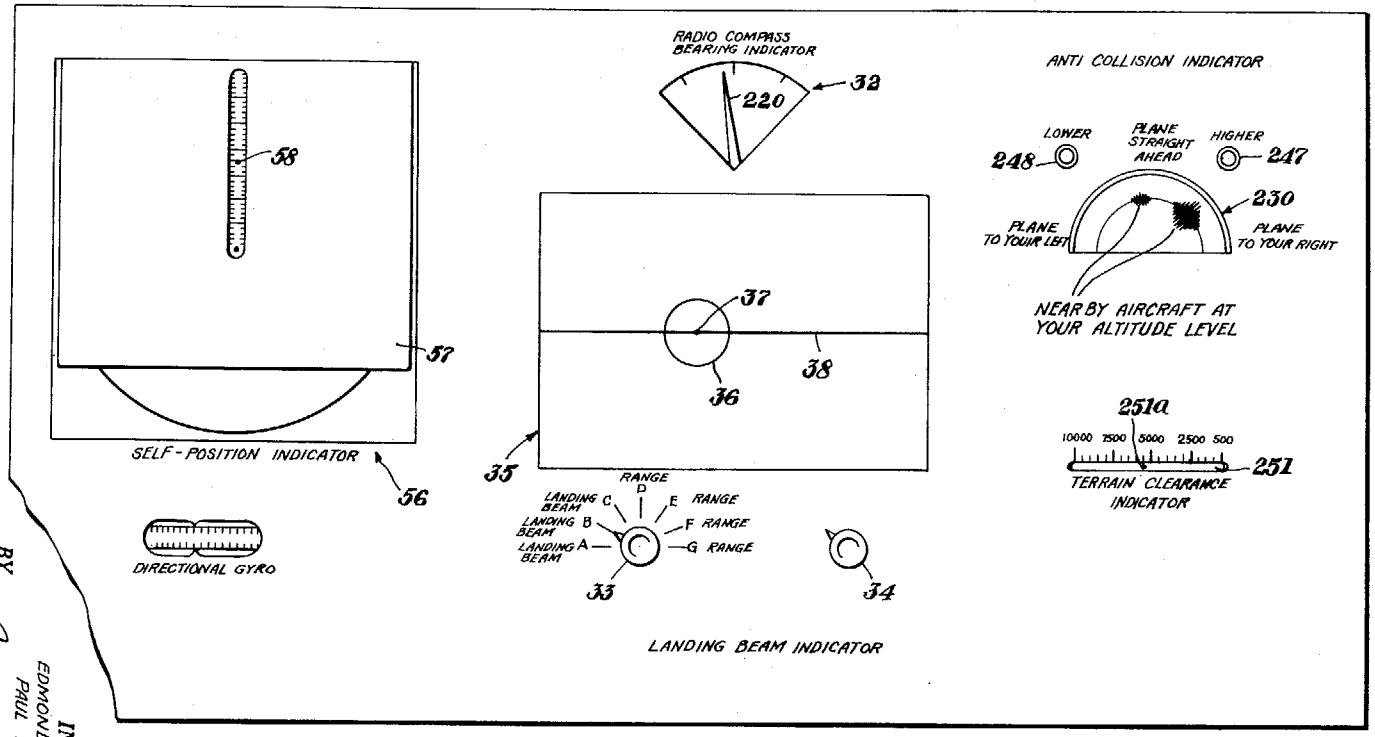
Fig. 3 is an illustration of the instrument panel showing the location of indicating instrument tuning.

The various guiding functions are preferably combined on simple indicators so that all of these indications may be provided on simple panel instruments illustrated by way of example in Fig. 3.

In Fig. 3 the radio compass bearing indicator 32 is shown at the upper right. This indicator constantly points toward a selected one of the localizer or range transmitters, the selection of the transmitter for such radio compass bearings being preferably made by the same two knobs 33, 34 which select such transmitter for controlling the landing beam indicator as explained later. Thus, during a landing this radio compass bearing indicator always points at the same localizer being used for the landing. To simplify the required antenna installation, the radio compass is arranged to give bearings only over a 90° angle (i. e. 45° each side of the direction of flight). The indicator dial is correspondingly restricted to a 90° arc.

The landing beam indicator 35 is intended for displaying the "fly left" and "fly right" indications received from a localizer transmitter and the "fly up" or "fly down" indications receiver from a glide path transmitter as well as the bearing indications of the radio compass and certain gyro indications. This instrument essentially includes a modified type of crosspointer meter for producing a pattern for ring 36 and dot 37 representing the plane location indications of both the localizer and glide path plus a simple optical arrangement for bodily shifting the whole pattern in a vertical or horizontal direction under the control of the radio compass bearing and gyro tilt described in detail later. In addition, a horizon bar 38 is provided which tilts to show the banking of the plane. Thus, the two types of location indications usually given by a crosspointer meter (planes located too high or too low or planes located too far left or too far right) are combined with the corresponding two types of attitude indications from a radio compass and a gyroscope (e. g. plane turned too far left or too far right and plane tipped too far up or too far down) and in addition the combined indicator also shows the gyro band indications (left wing low or right wing low).

In view of the fact that these three kinds of attitude indications must be viewed simultaneously with the corresponding two kinds of location indications in order to properly fly a landing beam, the combination landing beam indicator which shows all five types of indications at once is far more convenient to use than the separate types of indications now provided by the bearing indications of the radio compass, the bank and climb indications of the gyro horizon and the "fly up," "fly down," "fly right" and "fly left" indications of the crosspointer.

Figure 4:
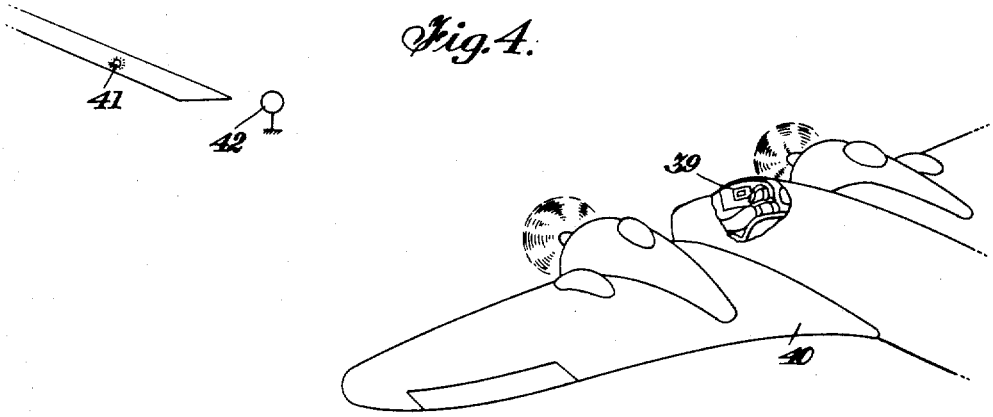
Fig. 4 is an illustration of an aircraft approaching a runway used in describing operation of one of the indicating instruments.

These five indications are combined in such a way that the pilot can imagine that he is actually looking through a window 39 in the nose of the airplane 40 at a pair of illuminated figures fixed on the ground at the near end of the runway as shown in Fig. 4. One of the figures 41 should be imagined to be a moderate sized spot of light, e. g., a single lamp placed on the center line of the runway at the desired point of contact, while the other figure 42 should be imagined to be a 12 foot diameter ring of lights mounted on a pole about 30 feet high and 1000 feet closer to the airplane as shown in Diagram I, Fig. 5. The pilot should imagine that he is looking through the small window 39 about 18 inches in front of his eyes at the ring and spot.

When the plane is correctly located at the proper height as represented by the glide path and the proper horizontal position as represented by the localizer and in addition is correctly aimed directly at the spot of light on the runway, the ring and spot would be exactly aligned with each other with the spot appearing exactly in the center of the ring; and the complete pattern of spot and ring would be seen through the center of the window both vertically and horizontally in the imaginary case. Under these same conditions, the actual indications given by the landing beam indicator would also show the ring 36 and spot 37 aligned with each other with the spot centered in the ring and the whole pattern centered vertically and horizontally in the rectangular opening as shown in Diagram 43 of Fig. 5.

Assuming that the plane remains fixed in the same correct position in space, but alters its attitude by rotating so as to aim to the left or right of the spot of light, the relative position of the ring 36 and spot 37 would appear unchanged, but the whole pattern would occupy varying positions with respect to the window in the imaginary case.

Figure 5:
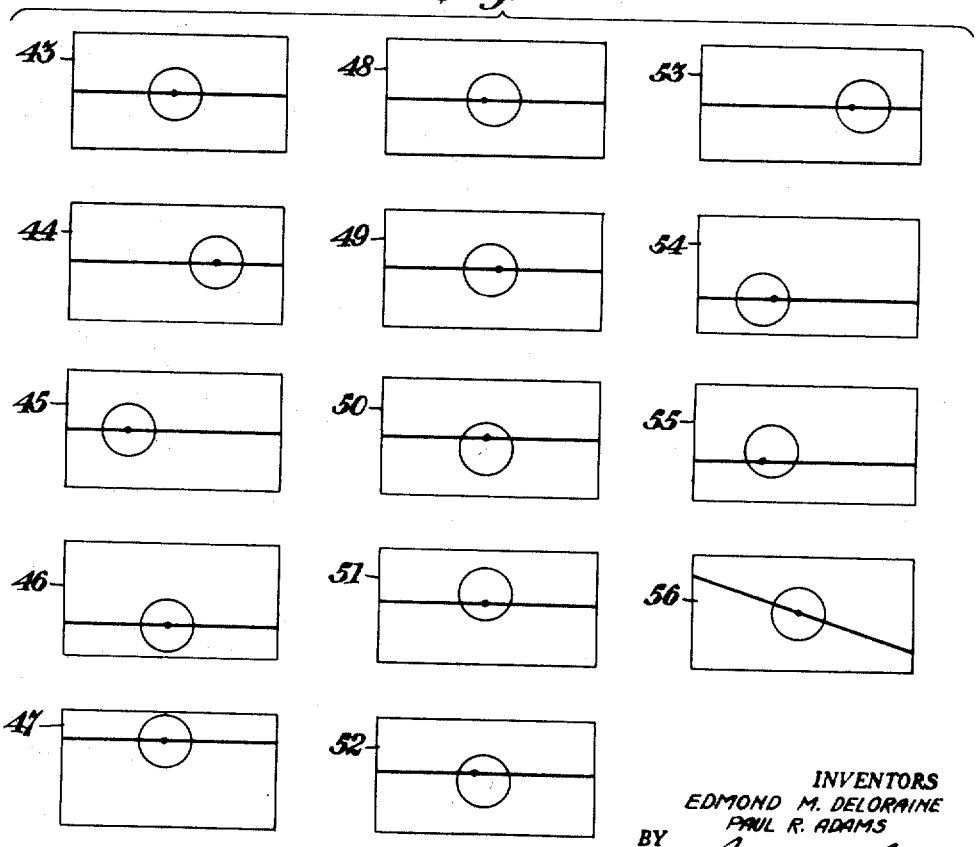
Fig. 5 is a group of diagrams indicating the appearance of the landing beam indication under different conditions.

Correspondingly, for these same changes in attitude of the plane, the indications given by the landing beam indicator of Fig. 3 would show the luminous spot 37 and ring 36 unchanged in relative positions, but shifted with respect to the rectangular frame as indicated by Diagrams 44, 45, 46, 47 of Fig. 5.

If instead of remaining in the correct location and changing its attitude, the airplane is assumed to be kept aimed directly at the spot of light on the runway but to be displaced in position so as to be too far to the left or too far to the right of the localizer equi-signal zone, or above or below the glide path equi-signal zone or to be displaced simultaneously in height and horizontally (e. g. above the glide path and to the left of the localizer equi-signal zones simultaneously) the whole pattern of ring and spot would remain approximately centered in the window but the ring 36 would change in position relative to the spot 37. The indications actually given by the landing beam indicator in such cases would again correspond to the imagined appearance of the light (see Diagrams 48, 49, 50, 51, 52 of Fig. 5).

In cases where the plane is simultaneously incorrect in its location and in its aiming, the indicator will continue to give representations corresponding to the appearance of the single lamp and ring of lights seen through a window in the imaginary case. A few such indications are represented in Diagrams 53, 54, and 55 of Fig. 5.

For giving the required indications of the angle of bank of the airplane a horizon bar is provided which tilts to show this angle. This horizon bar 38 is maintained substantially in line with the center spot 37 which represents the distant single point of light on the runway, so that the horizon bar must be imagined to represent a white string of lights arranged on the ground perpendicular to the runway and passing through the point of contact where the single spot is supposed to be located. Diagram 56 shows how this bar tilts.

In addition to being used for flying the landing beam i. e., the combination of a glide path and localizer, the landing beam indicator may also be used for flying a range. In this case, the ring 36 and spot 37 will continuously remain in the same horizontal line and only the sideways deflections of the center spot as well as the sideways displacement of the complete pattern will be used for displaying the corresponding left or right displacements of the plane from its correct location as well as its left or right twistings from the correct heading.

Immediately below the landing beam indicator 32 of Fig. 3, two knobs 33 and 34 are provided. Knob 33 serves to select the desired landing beam or range, while knob 34 selects one of three carrier frequencies which may be used at different adjacent airports. The system enables all indications required around one airport to be given on one single frequency. Three or more different frequencies will be provided, however, in order that closely adjacent airports may be operated on different carrier frequencies. Upon approaching a given landing field, the control tower will instruct the pilot which landing beam he is to take, and the pilot will know from his maps which carrier frequency is assigned to the field. Thus, if he is instructed to take landing beam C. on a field whose carrier frequency is II, he will merely turn his knobs to C and II respectively.

The self-position indicator 56 shown at the left of Fig. 3 is illustrated with a shield 57 lowered as it would be used in flying along the chain of ranges. In this condition it merely shows at 58 the distance from the airplane to the next range station.

Self-location system

Figure 6:
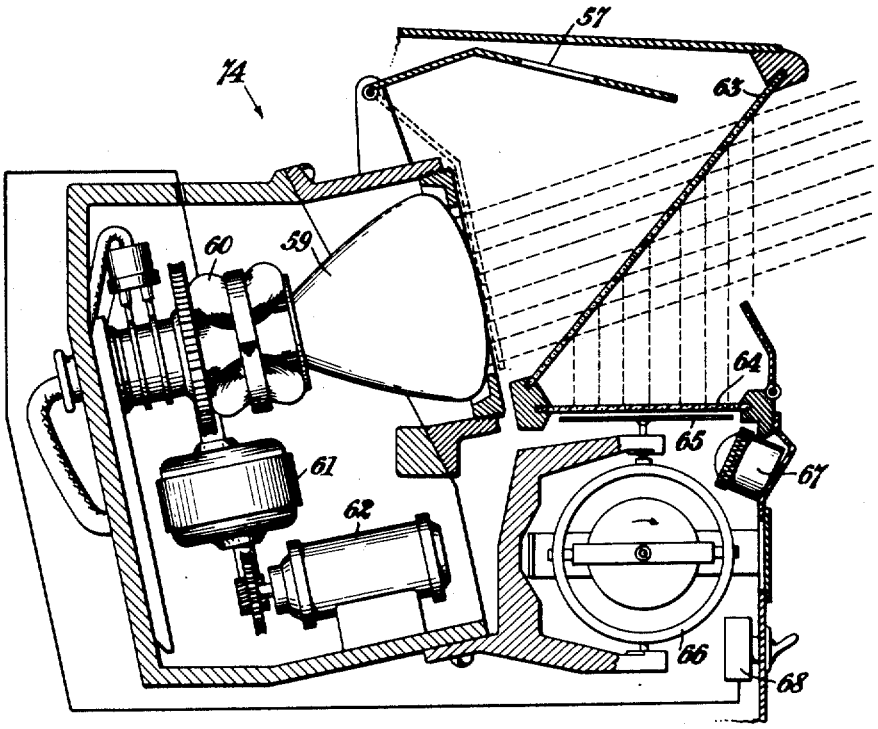
Fig. 6 is a sectional view illustrating a mechanical arrangement of a super-position unit.

For the purpose of flying around an airport, according to the system of the present proposal, the self-distance shield 57 should be raised as shown in the detailed illustration of the self-position indicator, Fig. 6.

In this figure is provided a cathode ray indicator 59 provided with rotary deflector coils 60. These coils are rotated about tube 59 by a motor 61 as will be described later in connection with the circuit diagram of the aircraft equisignal. Motor 61 also drives a rotary pick-up coil or goniometer 62 which supplies deflection voltages to coils 60. In a manner to be described in more detail later, this cathode ray indicator provides a spot on the screen of tube 59 indicative of the position of the craft from the airport in azimuth and direction.

Immediately in front of the screen of cathode ray indicator 59 is provided a receiving screen 63. Screen 63 is preferably in the form of a half-silvered mirror so that the indications from tube 59 may appear thereon simultaneously with reflected images. Below screen 63 is provided a cover glass 64 which serves to support map cards.

Figure 8:
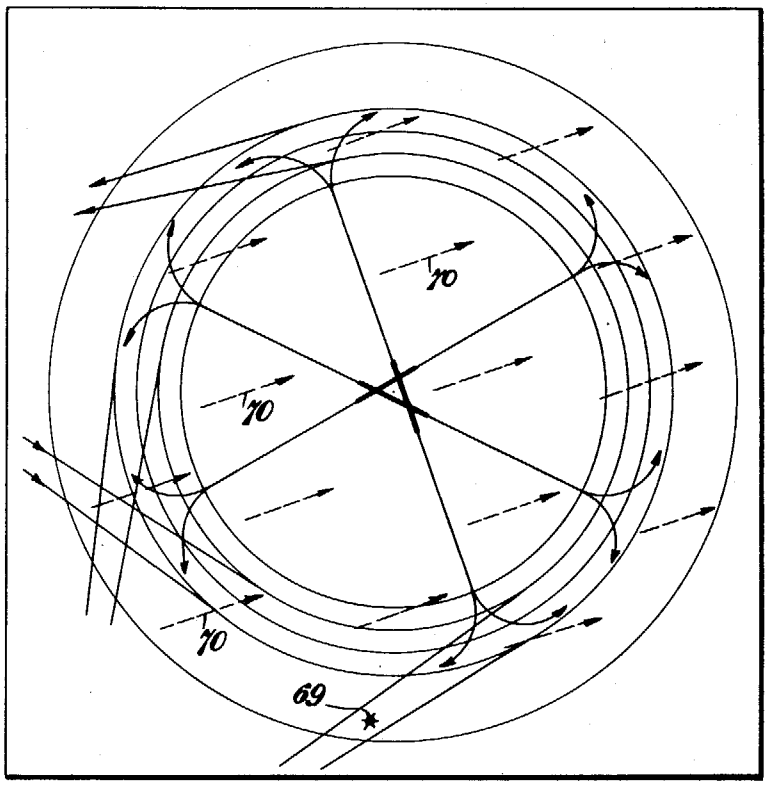
Figs. 7 and 8 are card-map indications to be used with the super-position indicator of Fig. 6.
Figure 7:
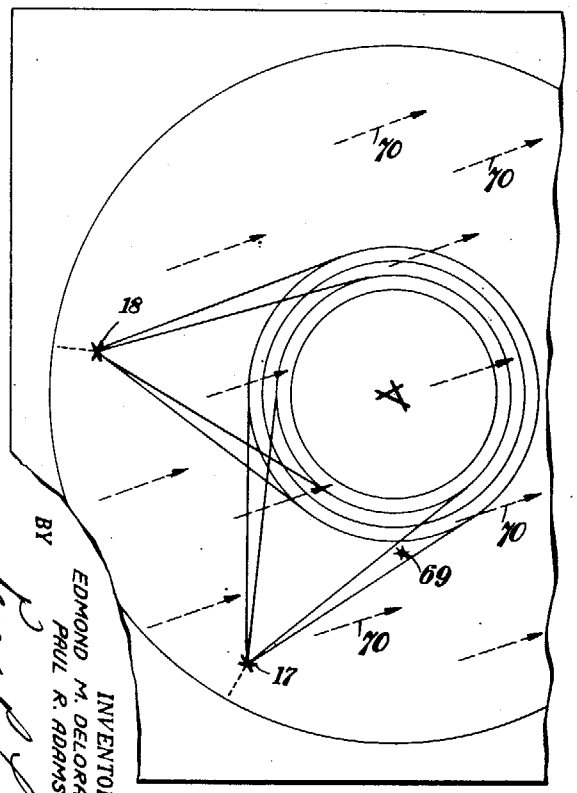

These maps show the radio range and the airport, as illustrated in Fig. 7 and the immediate vicinity of the airport, as shown in Fig. 8. Preferably the two maps are traced on a transparent or translucent card with different colored transparent ink, for example in purple and orange. The map of Fig. 8 is made to a larger scale than the general terrain map of Fig. 7 and may be used to guide a craft during the landing.

A transparent compass card is mounted on a gyro-compass 66 so that it will, at all times, be properly aligned with the true or magnetic north. On this card are provided markings showing the true north. It is clear that in place of a gyro-compass, other known means for maintaining a card 65 in a true or magnetic north position may be used. As a consequence of this supporting arrangement, the indicating spot appearing on the screen of tube 59 will be superposed on the map reflection on screen 63 so that the pilot will be enabled directly to read his position with respect to the adjacent terrain.

A switch 68 is provided to turn on with one of two coloured lights provided in lamp 67 so that a selected one of the two maps may be read. Simultaneously with this switching action, switch 68 also serves to change the sweep voltage amplitudes applied to the rotary deflecting coils 60 so that the sweep of the beam of tube 59 will correspond to the larger or smaller scales of the maps shown in Figs. 7 and 8. Thus, as the craft approaches the airport, these different maps may be visually indicated and simultaneously the magnification of the image will be changed so that the pilot may readily determine his position by the combined image formed on screen 63.

Assuming the magnification switch 68 is set for small scale indications, the raising of the self-distance shield will turn on a sharply filtered purple light in lamp 67, thus illuminating the card 64 from below. All indications shown on the back of the card in purple transparent ink become imperceptible and only the indications shown in orange can be seen. The card then appears as shown in Diagram, Fig. 7, of giving a small scale representation of the region around the airport. Under this condition, the visible area would represent a circle of given diameter, for example, thus showing not only the actual runways and the prescribed traffic circles to be flown, but also the straight "arrival" and "departure" branches which should be followed in flying between the ranges and the traffic circles.

If the carrier frequency selection switch below the landing beam indicator is set to the carrier frequency $F_2$, which is assumed to be the frequency used by the airport, a greenish-white spot from cathode ray indicator 59 will appear superposed on the illuminated image of card 64 on screen 63. This spot will represent the position of the airplane on the map as shown at 69. A group of black dotted arrows 70 will also be projected upon the underside of the card 64 from a light weight transparent disc 65 mounted on the gyro-compass 66. The position of the arrow thus shown will represent the direction in which the airplane is headed with respect to the map shown on the card.

Thus, the indication given will show simultaneously the complete position of the airplane and its heading with respect to the map of the airport.

Such an indication will enable the pilot to follow accurately any prescribed course which may be printed on the map. In the illustrations shown in Figs. 7 and 21, it is assumed that the pilot is flying northeast toward the airport on the "arrival branch" of the DII range. Since the spot 69 is properly centered on this branch, the pilot will know that he is in the correct location. Since the dotted arrows 70 are pointing slightly too far to the right, however, the pilot will know that he must turn his plane a few degrees to the left if he is to continue on the prescribed branch.

When the plane arrives close to the traffic circles, the pilot will throw the magnification switch 68 to high magnification, thus changing the color of the illumination from light 67 to orange and at the same time changing the magnification of the sweep of the scope. All lines printed in orange will then disappear and only the purple printing on the back of the card will show so that the card will appear as in Fig. 8. The position of the airplane will correspondingly shift outward on the screen so that the airplane will still be seen at 69 in the same relative position and attitude on the magnified map (i. e., on the arrival branch of the DII range close to the traffic circles, but aiming slightly to the right of the correct direction).

The same map indication may then be used for flying around the traffic circles and finally when permission is given, the plane will make a perfect curved turn toward the assigned runway, this turn being accurately controlled in accordance with the curved route printed on the map. As soon as the pilot arrives accurately in line with the runway, he will cease to fly by the map indications and will turn his attention to landing beam indicator which will then give him a high precision indication of both location and attitude vertically and horizontally as previously described.

The functions which must be performed to provide for self-location are the determination on the plane of its own distance from the center of the airport and the determination on the plane of its azimuth angle as seen from the center of the airport. Both these functions require cooperation between equipment on the ground and equipment in the airplane. The following explanation of the principles of operation of the self-location service will be made in conjunction with Fig. 9 representing the self-position, beam reception and transmitter units of the airplane equipment and Figs. 11 and 12 representing the airport equipment.

Turning to Fig. 11, basically 71 is a rotary beacon for sending out signals enabling a plane to determine its azimuth, while 72 is a self-distance repeater designed to receive certain types of pulses at a given frequency, $F_2$ and to re-transmit them at a different frequency $F_1$ for the purpose of enabling the plane to determine its distance from the center of the airport. In the airplane the unit 73, Fig. 9, is primarily a receiver for receiving the azimuth signals from 71 while 74 is essentially an electromechanical unit for converting the received azimuth signals into mechanical rotation of oscilloscope sweep coil 60.

The nature of these various equipments as well as their principles of operation can best be explained by tracing the progress of a set of azimuth signals through rotary beacon 71 and self-position reception unit 73 to indicator 74, and by then separately tracing the progress of a self-distance pulse from self-position reception unit 73 through transmitter 75 to the self-position repeater 72 as well as the progress of the re-transmitted self-distance reply pulse from the repeater 72 through the self-position reception unit 73 to the indicator 74.

The signals sent out from rotary beacon 71, Fig. 11, for determining azimuth are of two kinds; rotary signals and reference signals. The rotary signals consist of a series of pairs of pulses of two different characteristics, for example, of 5 microsecond and 3 microsecond pulse widths transmitted, for example, 4000 times a second with two different directive patterns so chosen as to sharply define an imaginary line hereafter called the sweep line. These diagrams are both rotated a given speed, for example at 12 times a second whereby the sweep line is correspondingly rotated. The reference signals merely consist of pulses of, for example, 12 microseconds width which are sent out uniformly in all directions at the instant when the sweep line is passing through true north. The latter reference pulse is only sent out every alternate time that the sweep line passes through north, so that this reference pulse is transmitted only 6 times per second.

The pairs of pulses of 5 and 3 microseconds width are generated in double pulse generator 76 which is arranged to send out first a 5 microsecond pulse and then immediately thereafter a 3 microsecond pulse, such a pair of pulses being transmitted once every 250 microseconds. Both these pulses are applied to the same transmitter 77, operating at $F_1$, but a switching circuit 78 which is timed by the pulse generator 76 routes the two types of pulses through different channels so that these can be radiated with different directive patterns. The 5 microsecond pulses pass out through the right hand side of switching circuit 78 to goniometer 85 which applies the signals variably to the four antennas 80, 81, 82, 83 with such magnitudes and phases as to produce a figure-of-eight pattern 84 (see Fig. 13A) having one of its null directions aligned with the imaginary sweep line to be defined. The second null which is not desired but is inherent in this type of pattern will be aimed to the rear (i. e., 180° away from the imaginary sweep line). The three microsecond pulses pass out of the left side of switching circuit 78 whence they are transmitted through goniometer 79 to the four antennas 80, 81, 82, 83, and simultaneously through the normally closed cam switch 86 to the central antenna 87. The relative strengths of these signals is such as to produce a cardioid pattern (88 of Fig. 13A); and the position of goniometer 79 is shifted 90° with respect to that of 85 so that the maximum of this cardioid will be aligned with the imaginary sweep line while the null of the cardioid is aimed backwards in line with the undesired second null of the figure of eight pattern. By such an arrangement of the patterns, the imaginary sweep line is quite sharply defined since this line will be the only direction in which a plane will receive pulses of 3 microseconds width without the reception of any pulses of 5 microseconds width.

The reference pulse of 12 microseconds width is generated by pulse generator 88A which is triggered for this purpose by a switch geared down from the main motor 115 so as to close 6 times per second when the sweep line is passing through true north. This 12 microsecond pulse is applied only to the omni-directional antenna 87, the switch 86 serving to disconnect this antenna from the other antennas at this instant. The switch 86 also applies a ground to pulse generator 76, over lines 89, 90 at this same instant, so as to temporarily stop the transmission of the 5 and 3 microsecond pulses, during the interval when the 12 microsecond pulse is to be transmitted and for about 12 milliseconds thereafter.

In the airplane equipment shown in Fig. 9, the various azimuth pulses are picked up by the antenna of self-position unit 73 and received by the receiver 91 of this unit. The pulses delivered by the output of this receiver are separated by the width selectors 92, 93, 94.

The output of width selector 92 which passes only the 5 microsecond pulses is applied to bias the width selector 94 so as to block the latter for a given interval, say 25 microseconds. Therefore, the received pulses of 3 microsecond width are not able to pass through width selector 94 except when these are received without any 5 microsecond pulse immediately preceding them. Thus, pulses of 3 microseconds width will only be delivered from selector 94 in brief groups 12 times a second when the imaginary sweep line of the rotating beacon swings past the airplane under consideration. The pulses thus delivered from 94 synchronize a lock-in oscillator 95 of a given periodicity, for example 12 periods per second; and the output of this oscillator 95 is passed through a phase splitter 96 to the stator coils of goniometer 62, thus producing in this goniometer a magnetic field rotating 12 times per second.

The 12 microsecond reference pulses which are sent out in all directions every second time that the imaginary sweep line passes through true north are similarly picked up by the antenna of reception unit 73, received in the receiver 91, and selected by width selector 93. From this width selector, the pulses pass to an unblocking circuit 97 over line 98a to momentarily unblock the associated discriminator circuit 98.

The rotatable (but normally stationary) search coil of goniometer 62 is continuously connected to the discriminator circuit 98 so that the alternating voltage produced in this search coil by the rotating field above mentioned, is continuously applied to this discriminator circuit. In the normal blocked condition such alternating voltage produces no effect but when the discriminator 98 is unblocked by the arrival of the 12 microsecond reference pulse, the polarity which the alternating voltage has at that instant will control the discriminator circuit so as to cause the latter to send out a positive or negative current for a short time (e. g. $\frac{1}{10}$ of a second). This brief surge of current passes through the motor 61 thus tending to drive this motor clockwise or counterclockwise, with a corresponding rotation of the search coil of goniometer 62.

Assume that the relation between the time of receipt of the reference pulse and the time of receipt of the 3 microsecond pulses (without 5 microsecond pulses) is such that the goniometer search coil has a positive voltage at the instant of unblocking of this discriminator 98. Then at each unblocking of this discriminator circuit, a positive current will pass through motor 61 which will finally cause this motor to turn and rotate the goniometer search coil. This will continue until the goniometer search coil assumes a position such that the voltage which it delivers to the discriminator circuit 98 is zero at the instant of the unblocking of the discriminator circuit.

Thus, the action of the discriminator circuit 98 and motor 61 is such as to rotate the goniometer search coil to a given position dependent upon the time of receipt of the reference pulse with respect to the instant when the imaginary sweep line of the rotary beacon swings past the airplanes. This will mean that the goniometer search coil will always assume a position corresponding to the azimuth angle of the airplane as seen from the rotary beacon 71.

In addition to the azimuth angle, it is also necessary to obtain an indication of the airplane's distance from the center of the airport, in order that the complete position of the airplane can be shown on a map of the airport. Such an indication is obtained by triggering transmitter 99 by pulses from pulse generator 100 to cause it to transmit at its carrier frequency of $F_2$ of self-distance pulse of a given character, for example, of ½ microsecond width to the self-distance repeater 72 at the airport (Fig. 11). The self-distance repeater then retransmits a corresponding self-distance reply pulse also of ½ microsecond width but on a different carrier of $F_1$ frequency. The self-distance reply pulse is then received in 91; and the distance of the airplane from the ground is determined by using this reply pulse to illuminate a spot on the screen of self-position oscilloscope 59 whose deflection plates are fed from a sweep circuit 101 synchronized with the transmission of the outgoing self-distance pulse from generator 100.

Considering these operations in greater detail, the self-distance pulse originates in non-synchronous generator 100 which generates a pulse of ½ microsecond width approximately 30 times per second. The pulses from 100 are applied through limiter 102 in the transmitter unit 75 to the $F_2$ transmitter 99 which thereupon radiates a corresponding half microsecond pulse of $F_2$ carrier to the self-distance repeater 72 at the airport. This self-distance repeater receives the self-distance pulses on antenna 103 and retransmits a pulse of the same width but on a different carrier frequency $F_1$ from antenna 104, this pulse being referred to as a self-distance reply pulse.

The reply pulse from repeater 72 is picked up by the antenna of self-position reception unit 73, received in receiver 91 and selected by width selector 105. From the output of 105 the pulse is applied to a control grid 106 of oscilloscope 59 in the self-position oscilloscope unit 74. At the instant when the pulse was applied from the pulse generator 100 to the transmitter unit 75, this same pulse was also applied to blanked sweep circuit 101 to initiate the sweeping action of this circuit. The sawtooth sweep voltage thus produced is applied to sweep coil 60 which magnetically controls the beam deflection of oscilloscope 59. Accordingly, when the self-distance reply pulse is applied to the grid of this tube, as previously described, the visible spot thus produced has a radial deflection corresponding to the time interval between the sending of the self-distance pulse and the reception of the self-distance reply pulse. Thus, the radial deflection of this spot measured from the center of the oscilloscope accurately represents the distance of the airplane from the center of the airport.

The direction in which the spot is radially deflected outward from the center of the circle, depends upon the rotary position of the sweep coil 60. This coil, however, is supported by the shaft of the goniometer 62 so that its position corresponds to the position of the search coil of this goniometer. As was previously explained in connection with the description of the transmission and reception of azimuth signals, the search coil of this goniometer 62 is controlled so as to constantly assume a position corresponding to the azimuth angle of the airplane as seen from the beacon 71 at the center of the airport. Thus, the luminous spot appearing on the screen of the oscilloscope 59 will have a position which corresponds both in distance and azimuth to the position of the airplane with respect to the center of the airport.

In order to render the indication more useful, the self-position unit is preferably arranged as shown in Fig. 6, so that the screen of the cathode ray tube whose spot represents the position of the airplane has apparently superposed upon it an image of a transluscent map of the airport. A switch 68 is provided to change the scale of the map by varying the color of its illumination by lamps 106 and 107, as previously described. This same switch is arranged to change the scale of the radial deflections of the oscilloscope beam by controlling sweep control circuit 108.

Landing beacons and range service

The functicns to be performed in order to render the landing beam and range service are essentially the functions generally performed separately by a number of glide paths, localizers and ranges on the ground cooperating with separate glide path receivers, localizer receivers and range receivers in the air. In accordance with the present invention, all these services are rendered simultaneously on one single carrier frequency which is also the same frequency used for the self-location services.

These functions will now be described in connection with Figs. 9 and 12. The usual 90 and 150 tone frequencies may be replaced by high frequency "tones" of the order of hundreds of kilocycles and these different frequencies or "tones" are used for the different glide path and localizer equipments. As an example, a system having the runway A, B and C and four range beacons called D, E, F and G may be considered. Twenty such "tones" are, therefore, required, the lowest four tones being used for the "A" glide path and localizer combination, the next four for the "B" glide path and localizer combination and the third group of four for the "C" combination of glide path and localizer. The last eight tone frequencies are allotted in pairs to the ranges D, E, F and G.

A suitable set of twenty tones is as follows:

718 and 650 kc. for "A" Glide Path
838 and 770 kc. for "B" Glide Path
958 and 890 kc. for "C" Glide Path
742 and 674 kc. for "A" Localizer
862 and 794 kc. for "B" Localizer
982 and 914 kc. for "C" Localizer
1078 and 1010 kc. for "D" Range
1102 and 1034 kc. for "E" Range
1198 and 1130 kc. for "F" Range
1222 and 1154 kc. for "G" Range It will be noted the above listed frequencies have been selected according to a systematic plan so that the lowest four frequencies, when mixed with a heterodyning oscillation of 702 kc. and then demodulated will yield beat frequencies of 16, 28, 40 and 52 kc. respectively. The next four tone frequencies, when mixed with a heterodyning oscillation of 822 kc. and then demodulated will also yield the same values of beat frequencies (16, 28, 40 and 52 kc.) while the third group of four tones when heterodyned with 942 kc., or the fourth group of four tones when heterodyned with 1062 kc., or the fifth group of four tones when heterodyned with 1182 kc. will also yield the same four beat frequencies. This relationship between the tone frequencies simplifies the design of the receiver which need only have four fixed filters for passing 15, 28, 40 and 52 kc., respectively, and five crystals for providing heterodyning frequencies of 702, 822, 942, 1062 and 1182 kc.

In order to still further reduce the possibility of interference between the various glide path, localizer and range transmitters, the several transmissions from these transmitters take place intermittently at a rapid rate, for example, six times per second, and definite time intervals are assigned to each transmission so that no two transmissions will take place simultaneously. Also, each transmitter sends its own two transmissions successively. In other words, in the case of a glide path transmitter, the "fly up" and "fly down" signals are successively transmitted, similarly in the case of a localizer or range the "fly left" and "fly right" signals are successively transmitted. Accordingly, ten different pairs of time intervals are required for the simultaneous operation of three glide paths, three localizers and four ranges.

In order to carry out the above mentioned two principles of timing the transmissions of the different glide paths and localizers so as to occur successively and adjusting their modulation frequencies so as to be different from one another, the ground equipment required for the landing beam and range service includes not only the glide path, localizer and range transmitters themselves, but also a central "landing beam control equipment" which is shown in Fig. 12.

Fig. 12 shows essentially control equipment 109, together with a number of localizers 110 and a number of glide path beacons 111. A number of range beaccns are also provided connected to leads 112 but are not shown and need not be considered in detail since they may be of any conventional form.

If more runways are provided a correspondingly greater number of beacons may be needed as will be clear.

The landing beam control equipment 109 (Fig. 12) comprises a master keyer 113 mechanically driven by shaft 114, the main motor 115 (Fig. 11) which serves to drive goniometers 79, and 85, Selsyn 116 and switches 86 and 89 in the rotary beacon system. This keyer may be of any conventional construction wholly mechanical or partially mechanical and partially electronic, and is arranged to produce six groups of synchronizing impulses per second, each such group being sent out during the 12 millisecond interval when the transmission of the 5 and 3 millisecond pulses normally sent out by the rotary beacon 71 is temporarily silenced by switch 86 of such beacon. Each of these groups of synchronizing impulses produced by the keyer 113 consists of 10 triggering impulses of any convenient length transmitted successively one millisecond apart over the 10 separate output circuits 117, 118, 119, 120, 121, 122, 123, 124, 125, 126. Each of these 10 output circuits is preferably provided with a corresponding delay adjustment by means of circuit 127—136 so that the relative timing of the synchronizing pulses received over these 10 outputs can be accurately adjusted.

The last four of the 10 output circuits are used for synchronizing the range transmissions which are located away from the airport and the corresponding outputs 123, 124, 125, 126 of 113 are, therefore, connected to the airways terminal equipment over lines 112. The first six sets of synchronizing pulses in each group are used to synchronize the transmissions of 3 of the localizers and 3 of the glide paths.

In the simple three runway system only one glide path and one localizer beacon would normally be operative. At a larger airport more runways may be available for simultaneous use. It is considered, however, that not more than 3 glide paths and 3 localizers will be operated at any one time. The selection of which 3 localizers and glide paths are to be used at any given time will be principally governed by the direction or velocity of the wind which may change within a comparatively short interval. It is desirable to provide for changing selection of these beacons quickly and conveniently. Accordingly, a group of 6 switches 137–142 are provided, which are ganged to be operated by one single manual control 143, and the connections from the first 6 output circuits 127, 128, 129, 130, 131, 132 of master keyer 113 to the selected 3 glide path beacons and 3 localizer beacons are controlled by these switches. The six glide path beacons are designated by 144–149 respectively and the six localizers by 150–155 respectively.

If the ganged switches 137–142 were set to their first position with their wipers resting on their number 1 contacts, the first 3 output circuits 117, 118, 119 will be routed to glide paths 144, 145 and 146 respectively, while the next 3 outputs 120, 121 and 122 will be routed to localizers 150, 151 and 152. Thus, localizer 150 and glide path 144 will be made effective to define a first landing beam; localizer 151 and glide path 145, would be effective for a second landing beam; and localizer 152 and glide path 146 will be effective for a third beam. Similarly, if the switches were set to their second position the first beam will be defined by localizer 151 and glide path 145, the second beam by localizer 152 and glide path 146, and the third beam by localizer 153 and glide path 147. In corresponding manner, other switch positions will render other combinations of glide path and localizer beams effective.

In order to render a given glide path or localizer effective for defining a certain beam, such glide path or localizer must not only receive the appropriate synchronizing signal from master keyer 113 so as to cause it to perform its transmissions during the two appropriate intervals allocated to that beam, but must also receive an additional controlling signal to cause it to employ the appropriate modulation "tones" allocated to that beam. Thus, a localizer which is to operate on the third beam must not only receive a synchronizing pulse from output 122 which defines the time for localizer transmissions from the third beam but must also be controlled to employ modulation "tones" of 914 and 982 kc. which are the tones allocated for localizer transmission on this beam. (See the table of tone frequencies given above.)

The control necessary to cause the selection of the appropriate tone frequencies in the several localizer and glide path equipments may consist of three distinctive signals of any type (e. g. +D. C., −D. C. and 60 cycles A. C.). These three characteristic frequencies may be directly superposed on the synchronizing pulses being thus controlled through the same switches 137–142 which control these impulses. Accordingly, it may be assumed that tone selector signal source 156 applies to outputs 117 and 120 of master keyer 113, a positive D. C. superposed upon the previously mentioned synchronizing pulses, while outputs 118 and 121 have negative D. C. and outputs 119 and 121 have low frequency alternating current superposed upon their synchronizing pulses. These combined pulses operate at the glide path and localizer systems to select the desired combinations of "tone" frequencies in any convenient known manner.

Up to this point only the landing beam control equipment has been considered in detail. It is believed that no similar detailed description of the glide path or localizer transmitters themselves nor of the receiving and displaying equipments on the airplane is necessary, since the general nature of these transmitters and airplane equipments, as well as their operating principles, can readily be understood from the following sequential description of a series of typical operations. Such sequential description will trace the progress of a typical signal from control equipment 109 through one of the localizer equipments 110, thence through reception unit 73 and beam reception unit 157 to the display unit 158, Fig. 9 in the airplane.

Assuming that the switches 137–142 have been set to position 6 so that localizers and glide paths 155, 149; 150, 144; and 151, 145; are conditioned respectively for transmitting the "A," "B" and "C" beams, and considering only the operation of localizer 150 (which is shown as a single block in Fig. 12 and shown in greater detail in Fig. 13), it will be seen from Fig. 12 that the output 131 of master keyer 113 will be connected through switch 141 to the localizer 150. Accordingly, the control wire leading to this localizer will be energized with negative D. C. upon which is superposed a set of synchronizing impulses consisting of the 5th impulse out of each group of 10 impulses which are transmitted six times per second by master keyer 113.

Referring now to Fig. 13, the negative D. C. arriving over the control wire 159 from equipment 109 of Fig. 12 is applied to switcher mechanism 160 so as to actuate this mechanism to its second position thus shifting the wipers of switches 161 and 162 to their second contacts. The localizer 150 is now conditioned for operation at the proper tone frequencies for localizer service on the second beam.

Upon the generation of the next group of synchronizing impulses by the keyer 113, the 5th pulse of the group passes through the switches, as already traced, to the control wire of localizer 150 in Fig. 13, and there serves to trigger the triple pulse generator 163. This triple pulse generator is designed to send out a first pulse of approximately 200 microseconds width, followed by a second pulse whose width is not critical, and then by a third pulse also of 200 microseconds width. The third pulse is similar to the first pulse but occurs 400 microseconds later so that there is a 200 microsecond blank period between the first and third pulses with the second pulse occurring during this blank period. It is the function of the first pulse to time the "fly left" transmissions, while the third pulse times the "fly right" transmissions and, therefore, these pulses should be exactly equal in width, being preferably produced by the same pulser tube. The second pulse which occurs during the interval between the first and third pulses has the function of switching over the antenna mechanism in between the transmissions of the two types of signals and should, therefore, be transmitted somewhat later than the middle of the blank space between the first and third pulses.

The first pulse is applied over line 164 to unblocking circuit 165 so as to render this circuit effective for transmitting a "fly left" modulating tone. Both the "fly left" and "fly right" tones are constantly generated in balanced modulator 166 which is energized by fixed crystal controlled oscillators 167 and 168 at frequencies of 250 kc. and 34 kc., respectively. The output of the balanced modulator 166, therefore, principally consists of two exactly equal sine waves of frequencies 216 kc. and 284 kc., respectively. When circuit 165 is unblocked by the first pulse from generator 163, these two tones are applied through double tuned R. F. transformer 169 to the amplifier 170. The transformer 169 not only selects the 284 kc. component to be used for the "fly up" signal while rejecting the equal 216 kc. component and the other products of modulation, but also because of its narrow selectivity characteristic serves to round the keying produced by circuit 165. Thus, instead of receiving a suddenly starting and suddenly stopping train of sine waves of 284 kc. frequency having a duration of 200 microseconds and a square wave envelope (produced by the keying effect of circuit 165) the amplifier 170 receives a gradual rising and gradual falling train of 284 kc. sine waves whose envelope has a rounded shape.

This rounded train of 284 kc. sine waves is applied to mixer 171 which also continuously receives a heterodyning sine wave from oscillator 172. This oscillator 172 can generate any of three frequencies, but, in the case assumed, will be generating 573 kc., since the localizer in question is assumed to be used for defining the "B" beam and, therefore, the control signal applied to the switcher mechanism 160 will have set the switch wipers of 161 and 162 to their second contacts, as previously explained. The cross modulation of the 284 kc. rounded train and the continuous 578 kc. heterodyning wave will yield the desired "fly up" tone frequency of 862 kc. as well as other undesired cross modulation products. The output of this mixer 171 is applied through switch 162 in its second position to the double tuned R. F. transformer 173, which screens out the undesired products and transmits only the 862 kc. tone appropriate for "fly left" signals of the "B" landing beam. Such signal is amplified in 174 and used to modulate transmitter 175 which is preferably of a type which emits carrier only in the presence of a modulating signal. Thus, this transmitter emits the desired "fly up" signal consisting of a train of 670 mc. waves modulated with an 862 tone having a rounded envelope somewhat longer than 200 microseconds in duration. Such signal is applied to the usual type of antenna array 176 having a central radiator 177 and a symmetrical set of side radiators 178, the phases of the signals applied to the central and side radiators being such that the radiation takes place predominantly on the right hand side of the desired course.

Shortly afterwards, the second pulse generated by triple pulse generator 163 actuates the transposition switcher 179 over line 180 so as to effectively transpose the transmission line 181 extending to the central antenna of the array. The effect of such transposition is that the next train of waves emitted by the transmitter 163 will be applied to the antenna array 176 with a reversed phase relationship between the central and side antennas so that the radiation will take place predominantly to the left of the desired course as is required for the "fly right" signal.

Finally, the third pulse generated by 163 is applied to unblocking circuit 182 over line 183. This circuit like the circuit 165 applies the 216 kc. and 284 kc. components from modulator 166 to the amplifier 170; but this time these mixed components are passed through transformer 184 instead of transformer 169. The selected component in this case is, therefore, the 216 kc. wave. Therefore, this wave when mixed in 171 with the 578 kc. output of 172 results in a tone frequency of 798 kc. appropriate for the "fly right" signal. Such tone frequency after passing through transformer 173 to screen out undesired cross modulation product is applied through amplifier 174 to the transmitter 175 as before. The corresponding tone modulated carrier wave is again applied to the antenna as previously described but is this time radiated predominantly to the left of the course because of the phase reversal introduced in 179.

The "fly left" and "fly right" signals which are transmitted six times per second as thus described in the form of a "fly left" modulated signal immediately followed by a "fly right" modulated signal are picked up by the antenna of the self-position reception unit 73 on the airplane (see Fig. 9). If the airplane is to the left of the correct course, the "fly right" signals will be received with greater amplitude than the "fly left" signals, the reverse being true if the airplane is to the right of the correct course. If, however, the airplane is exactly on the correct course, the two immediately successive signals of each transmission are picked up with equal amplitudes.

Just prior to the reception of the various "fly left" and "fly right" signals in the three operative localizers and of the corresponding "fly up" and "fly down" signals of the three glide paths, the airplane will receive a 12 microsecond pulse of $F_1$ carrier frequency from the rotary beacon 71 as previously explained in the description of the self-location service. Such signal in addition to being applied to unblocking circuit 97 as previously described, is simultaneously applied to unblocking circuit 185 of beam reception unit 157, thus preparing the unit 157 for the subsequent reception of the various "fly down," "fly left," "fly right" signals.

When the "fly left" signal arrives from localizer 150 which is assumed to be conditioned for defining the "B" beam, as above described, this signal will be received in receiver 91 thus yielding a rounded train of 862 kc. waves. Such train of waves will be applied not only to the width selectors 92, 93, 94 (which will not respond to this signal) but also through unblocking circuit 185 to the mixer 186 of unit 157. Assuming that switches 187, 188, 189 have been set to their second position as shown, so as to condition this beam reception unit B for receiving the signals of the B beam, the oscillator 190 will be generating a frequency of 822 kc. which will be constantly applied to the mixer 186. The 862 kc. tone from the "fly left" signal when mixed with this 822 kc. heterodyning wave will yield in the output of mixer 186 a 40 kc. beat note which will pass through the filter 191 to varistor 192. This varistor 192 will rectify the signal to produce a positive current which will pass through switch 188 in its second position to the meter movement 193 of display unit 158.

When the immediately succeeding "fly right" signal arrives at the airplane, it is similarly received in receiver 91 to yield a 794 kc. tone which is applied through unblocked circuit 185 to the mixer 186 as before. Such 794 kc. tone when heterodyned with the 822 kc. output from 190 will yield a beat note of 28 kc. which will pass through the filter 194 to the varistor 192. The polarity of the connections from 194 to 192 should be such that the current produced by rectification of 192 will be negative. This negative current will again be applied through switch 188 in its second position to the meter movement 193 of display unit 158.

Assuming that the plane is exactly on course so that the "fly right" and "fly left" signals just described are received with equal amplitudes, the positive and negative currents which will be applied to the meter movement 193, as above explained, will be of the same magnitude and, therefore, no deflection will be produced. If, however, the plane is to the left of the course, the "fly right" signal will be predominantly received so that the negative current will exceed the positive current, thus resulting in a deflection of the pointer 195 of 193. If the plane is to the right of the course the pointer will be deflected in similar manner but in the opposite direction.

Immediately before the receipt of the two signals above traced—i. e. the "fly left" and "fly right" signals from the localizer used for the "B" beam, the plane will receive a corresponding pair of "fly up" and "fly down" signals from the glide path used for the "B" beam. In the case assumed, where localizer 150 is used for the "B" beam, the glide path used for this same beam would be glide path 144.

All the detailed description of the transmission and reception of localizer signals made with reference to Fig. 13 may be considered as applicable also to the glide path, since all glide path and localizer equipments may be essentially identical. In fact, the only differene between the glide paths and localizers is a difference in the antenna arrays employed and a difference in the frequencies of the transformers, and of the three crystals contained in 172 (see Fig. 13). In the case of all the localizers, the transformers 173, 173A, 173B may be tuned to 710, 830 and 950 kc., while the oscillator 172 may have crystals for operation at 458, 578 and 698 kc. to provide frequencies corresponding to the table previously given. In the case of all glide paths, however, the corresponding transformers 173, 173A, 173B are tuned to transmit frequencies of 685 kc. ±40 kc., 805 kc. ±40 kc. and 925 kc. ±40 kc., while the corresponding crystals in the oscillator 172 are ground for 434, 554 or 674 kc.

Thus, when set for "B" beam operation a glide path equipment will produce modulations of 838 and 770 kc. for its "fly up" and "fly down" indications. Such tone frequencies when mixed with the 822 kc. heterodyning wave used for "B" beam reception produce in the mixer 186 beat frequencies of 16 and 52 kc. respectively which are passed by filters 196 and 197 respectively and are detected into positive and negative currents in varistor 198 and then applied through switch 189 in its second position to the meter movement 199 in display unit 158.

It will be seen, therefore, that the localizer signals will control meter movement 193 of display unit 158 while the glide path signals will correspondingly control meter movement 199 of this unit. Meter movement 199 carries a luminous ring 200 which is deflected back and forth (so that its image as seen in inclined mirror 201 seems to move upward or downward) under control of the glide path signals. Meter movement 193 carries a luminous spot 202 normally positioned centrally behind the luminous ring 201 but capable of moving right or left under control of the localizer. The relative positions of the spot and ring are thus controlled by the landing beam signals to produce the several different types of indication shown in diagrams of Fig. 5.

In order to produce horizontal and vertical displacements of the complete group of spots with respect to the viewing frame as illustrated by diagrams 44, 45, 46 and 47 of Fig. 5 the inclined mirror 201 is controlled by Selsyn motor 202*a* (which is actuated from the radio compass unit) and by a gyroscope 203, having its axis of rotation vertical. Accordingly, the mirror will be tilted vertically by the gyro in response to a vertical tilting of the plane and will be tilted left or right by the radio compass when the plane turns right or left. The luminous spot and ring carried by the meter movements 193 and 199 will, therefore, appear to shift with respect to the viewing frame in the desired manner.

The horizon bar 204 is tilted by sideways tilts of the gyro 203 to show the angle of bank. This bar is placed behind the mirror 201 at the position of the virtual image of the spot and the mirror is sufficiently transparent so that this bar can be seen.

Radio compass feature

The radio compass function required consists of continuously finding and indicating the direction of a particular localizer or range transmitter. The direction of such transmitter relative to the axis of the plane is called the "relative bearing" of the transmitter; is shown directly by the needle of the radio compass bearing indicator 32 (see Fig. 3). This same information is preferably also displayed in a slightly different form on the display unit 158 the information being given in this case in the form of a sideways displacement of the whole ring-and-spot pattern of the indicator (see Fig. 5).

For performing this function, no special equipment is required on the ground since the normal localizer or range signals are made use of. The airplane equipment for performing the radio compass function consists of a forward scanning radio compass unit 205 with a suitable antenna array 206 fixed on a forward portion of the airplane, and a bearing indicator unit 32, Fig. 3. The self-position reception unit 73 and the beam reception unit 157 which have already been described as used for other functions are also employed for the radio compass function.

The radio compass unit 205, Fig. 9, essentially includes a pattern shifting means 207, 208, an electronic reverser 209, a rotary mechanism motor 210 and a modulation detection circuit. The energy received on antenna array 206, after passing through phase shifters 207, 208 and electronic reverser 209 is applied over line 211 to the input of receiver 91. Since the direction finding compass unit is designed to receive energy from the localizer beacon, the energy received on antenna 206 will be characterized by the same selective signal as is the localizer signal. This energy is applied over unblocking circuit 185, mixer 186 and filter 213 to a modulation detector 214. Filter 213 is tuned to pass the beat frequency corresponding to the localizer signal. This energy will carry at modulation dependent upon the antenna switching action in antenna array 206. Modulation detector 214 detects only this modulation produced by the reversing switching of electronic reverser 209. When array 206 is aligned with the localizer transmitter, the two outer anntennas which are coupled in phase opposition due to transposition 215 will have no effect. The electronic reverser 209 serves alternately to connect the central antenna of the array 206 with one, and the other the two outer antennas, thus producing a modulation effect whenever the outer antennas are not arranged for null reception. This modulation effect, detected in 214, serves to control reversible motor 210 in accordance with the phase of departure of the null reception with respect to the center antenna.

If the antenna is not aligned with the localizer beacon, the incoming signals applied to modulation detector 214 over filter 213 will produce a resultant current which will drive motor 210 in one direction. The shaft of motor 210 is coupled over reduction gearing 216 to phase shifters 207 and 208. These phase shifters are arranged to adjust the phase of the two outer antennas so that the null of the two outer antenna units will be readjusted into alignment with the transmitting beacon. Accordingly, these antennas will again be quickly aligned to null position.

Also coupled to the shaft of motor 210 is a Selsyn generator 219. Selsyn generator 219 is connected by line 218 with Selsyn motor 202a to control the position of mirror 201. Selsyn generator 219 is also further connected to a second Selsyn motor 219 which controls pointer 220 on bearing indicator 32. The specific constructions of phase shifters 207, 208, electronic reverser 209 and modulation detector 214 have not been shown in detail since these mechanisms all are well known in the art.

The use of the receiver unit 91 simultaneously to respond to the radio compass unit as well as to the other services will not materially affect any of the other indications. The modulation which results from the rapid phase reversal in the signals from the radio compass unit will always be relatively slight since any appreciable amount of such modulation will cause the motor 210 to readjust the pattern so that it has its null aligned with the signal source, thus reducing any modulation substantially to zero. Accordingly, any such modulation will not adversely affect the operation of the other equipments provided in reception unit 73. The non-directive antenna, associated with reception unit 73, may be mounted for reception from the rear of the plane, thus supplementing the forward reception of the array 206. In such case, the reception of signals from the various other services may be better than would be possible without this directive array.

Pulse width selector

The pulse width selectors, shown in the various parts of the system, may be of any desirable type. These width selectors serve to select pulses of any particular width to the exclusion of other pulses. In Fig. 14 is illustrated a simple form of width selector described in detail in the copending application of E. Labin and D. D. Grieg, Serial No. 487,072, filed May 15, 1943, now Patent No. 2,440,278 issued April 27, 1948.

The pulses are applied to a tube 221 and produce in the output thereof negative pulses shown at 222. These negative pulses are applied to shock excite tuned circuit 223 which is tuned to a frequency of which the pulse width represents one-half a wavelength. The pulses are simultaneously applied to the grid of damping tube 224 connected across tuned circuit 223. The pulses applied to circuit 223 will produce a wave having a negative portion, as shown at 225, and a positive portion at 226. The oscillations produced in circuit 223 will tend to go negative after portion 226 has been produced. However, damping tube 224 will short circuit any further negative portion since, at this time, the negative pulse 22 no longer is present on the grid of tube 224. As a consequence, only the portions 225 and 226 are produced.

If pulses of different widths, either smaller or larger, are applied to the input circuit, these pulses will produce portions 226 having lower peak amplitudes since they are not related to the one-half wavelength period as are those of the wanted pulses. Accordingly, the wanted pulses will produce the higher peak value. These higher peak portions 226 from the output of circuit 223 are then theshold clipped by clipper amplifier tube 227. This tube is biased to such a value that the portions 226 of lower amplitude will not pass. The peak portions passed correspond only to the received pulses of the desired width.

While we have shown a particular set of tone frequencies and selecting arrangements for distinguishing the various localizer, glide path. range beacons, one from another, it will be clear that other types of signals and selecting systems may be used. Furthermore, instead of width selection as the principal selecting function, amplitude, tone, or frequency modulation characteristics may be applied to the various pulses to achieve a similar result.

Anti-collision feature

Referring more particularly to Fig. 10, the portions of this diagram which are of interest in connection with anti-collision service are four groups of equipment 75, 229, 230 and 231 which together constitute a basic equipment which may be assumed to be ultimately installed on every plane which is licensed for flight above the ceiling of visibility at least in the densely travelled regions of the United States, for example. These four units are respectively the transmitter unit hereinbefore referred to for continuously sending out signals representing the airplane altitude. an anti-collision receiving unit for receiving similar signals from other planes, an anti-collision oscilloscope unit for displaying the received indications and a rotatable anti-collision antenna unit, which is the preferred antenna to be used with the receiving unit 229 in the better class of installations.

The transmitter unit 75 principally consists of the fixed frequency UHF transmitter 99 operating at the assigned air frequency $F_2$ together with a pulse generator 232, a tunable audio oscillator 233 and a modulator 234 which modulates the amplitudes of the pulses from 232 in accordance with the sine wave from 233. A simple barometer mechanism 235 controls the frequency of the tunable oscillator 232, e. g. by rotating a light weight silvered mica disc serving as a variable condenser. The barometer mechanism 235 is preferably much more rugged and simpler than the usual type of altimeter. It does not need, and preferably should not have, any reset arrangement to correct for varying barometer readings on the ground; and in addition its linkage may be a simple system producing a swing of about 90° rather than a high-motion linkage with gears for producing 3600° of rotation. The other minor elements 233, 232 and 234 will be simple circuits of well known design, while the transmitter 99 will be a low power fixed tuned transmitter with no controls.

The operation of transmitter unit 75 is as follows: Pulses of one microsecond width generated at the rate of 5000 per second in 232 are amplitude modulated in 234 in conformity with the audio note from 233. This audio note is controlled by 235 so that the nominal tone frequency for zero altitude is 650 cycles this tone frequency being increased by 40 cycles for every 1000 feet of altitude. The actual tone frequency will differ somewhat from the nominal frequency above set forth because of variations in barometric pressure on the ground; but such variations are immaterial since all planes near enough together to be in danger of collision will have the same error. The transmitter 99 will be modulated by the amplitude modulated pulses from 234 and will thus continuously emit short one microsecond train of $F_2$ carrier with amplitudes varying in accordance with the appropriate audio tone.

The anti-collision receiving unit 229, for example, consists of a fixed tuned $F_2$ receiver 236 whose output passes through a width selector 237 for screening out all other types of pulses used in other services. From 237 the anti-collision pulses pass through a conventional detector 238 which acts in the usual way to derive a signal corresponding to the envelope of the received energy. The envelope so derived may correspond to a complex wave comprising components of several different low audio frequencies if signals are being simultaneously received from several nearby planes at different altitudes. In order to select from all these component frequencies only those representing altitudes close to the altitude of the receiving plane itself, the audio tone from oscillator 233 of this plane is mixed with the complex received signal in the mixer 239 and then passed through a low pass filter 240. Only those received signal components whose tone frequency is within fifty cycles of the tone frequency of the receiving plane itself will pass through this filter 240.

In those cases where the installation of a rotatable antenna is impracticable, the receiver 236 may be fed by a fixed antenna having a moderate forward directivity, and in this type of installation the output from filter 240 will be applied directly to a pair of deflecting plates of the oscilloscope 230. Wherever practicable, however, it is preferred to use a rotatable antenna unit such as 231 and in such installations the output from filter 240 will be connected in series with a D. C. voltage source 242 to a resistance type goniometer 243 (i. e. an endless circular potentiometer with four fixed taps and two sliding brushes) and thence will be distributed in varying ratio among the four deflection plates of the oscilloscope 230.

Assuming that the rotary antenna installation is used, the resistive goniometer will be arranged to rotate in synchronism with the rotary antenna 244, so that when this antenna is receiving predominantly from the right the voltage from source 242 will be applied to the proper plates to shift the cathode ray spot of the oscilloscope 230 to the right. As the antenna rotates to point straight ahead, the distributer action of resistive goniometer 243 will transfer the potential from 242 to the other pair of plates of 230 so as to deflect the spot upward. Finally as the antenna 244 rotates to receive predominantly from the left the potential of 242 will be applied to the deflection plates in such sense as to shift the oscilloscope spot to the left. Simultaneously with such transfer of the D. C. potential from 242, the rotation of goniometer 243 will also correspondingly transfer any signals delivered from the output of filter 240 so that these will be always effective to cause a radial reflection of the spot. The amplitude of such radial deflection will be dependent upon the received signal strength, and thus will constitute an approximate indication of the distance of the plane whose signals are being received.

Preferably, this rotating antenna is located in the front of the airplane nose or, where engines make this impossible, immediately below the nose and inclined slightly upward so as to be effective for reception from the front of the airplane and over a comparatively wide angle at each side. When the rotatable antenna is pointing directly backwards or in any other direction in which directive reception is impracticable—the switch 245 controlled by a cam on the antenna rotating mechanism removes ground from 237 to block the effective reception of signals.

The inclined reflector plate 246 which is shown behind the rotary antenna 244 is not necessary for the anti-collision service but is provided for the Terrain Clearance Service hereinafter described.

In order to permit the pilot to test for the presence of planes in higher and lower levels as well as to determine if any planes are at or near his own level, the push-buttons 247 and 248 are provided in oscilloscope unit 230. The buttons are connected so that 247 will momentarily raise the frequency of tunable oscillator 233 by forty cycles while 248 will correspondingly lower it by forty cycles. Depression of either of the buttons will also momentarily interrupt the transmission of the tone from 233 to 234 so as to avoid sending out an incorrect altitude indication during the testing interval. The upward or downward shift of the tone frequency from 233 changes the tone applied to mixer 239 so that a higher or lower group of frequency components received from 238 becomes effective to pass through filter 240 to the indicator 230.

By the use of pulses for the anti-collision transmission, the difficulties of simultaneous reception from several nearby planes have been greatly minimized. Since the pulses are only one microsecond in width and are transmitted only 5000 times per second, each transmitter is actually "on the air" only $1/200$ of the time. Thus, even if seven or eight planes are simultaneously transmitting within effective range of the given receiving plane under consideration, the pulses of these seven or eight transmissions will only overlap about three per cent of the time. At the same time the use of amplitude modulation of these pulses provides the advantage that when several series of pulses interleaved in random fashion are simultaneously received, the amplitude demodulator 238 of the given plane can successfully demodulate all these signals simultaneously to derive a complex wave having frequency components corresponding to all the seven or eight tone modulations of the separate signals.

Terrain clearance feature

Since this service is performed by transmitting a pulse from the plane and receiving the same pulse after reflection from the earth, no equipment is required on the ground. By using the transmitter and receiver of the anti-collision equipment, the only additional equipment required on board the airplane consists of unit 250 and oscilloscope 251.

No special pulses need be transmitted for the terrain clearance indications but instead, the self-distance pulses of ½ microsecond width which are sent out from transmitter 99 under control of pulse generator 100 as hereinbefore described are made use of for measuring terrain clearance also. Although the antenna 252 which radiates these pulses is primarily designed for maximum radiation in a horizontal direction, this antenna will give sufficient downward radiation for terrain clearance measurements since these measurements need only be made up to elevations of about two miles above the earth.

The self-distance pulses emitted from transmitter 99 and radiated downward toward the earth will be reflected back to the airplane where they will be picked up by rotating antenna 244 of the anti-collision equipment. In order to increase the efficiency of this antenna for radiations arriving from a downward direction, the inclined reflector 246 is preferably provided as previously mentioned, thus serving to tilt the maximum lobe of the reception diagram down toward the earth during the intervals when the antenna 244 is aimed toward the back of the plane. During these same intervals, the cam switch 245 is arranged to ground the lead extending to width selector 253 in terrain clearance unit 250 so that this width selector becomes operative.

The self-distance pulses picked up by antenna 244 after reflection from the ground during such intervals are applied as usual to receiver 236 of the anti-collision receiving unit 229, but having ½ microsecond width, these pulses pass through width selector 253 instead of width selector 237. From the output of selector 253, the pulses are applied to the grid of terrain clearance oscilloscope 251 thus producing a luminous spot on the screen thereof. The position of this spot is determined by the deflector plates of the oscilloscope 251 which receives a saw-tooth sweep voltage from blanked sweep circuit 254. In order to synchronize this sweep circuit 254 so that its saw-tooth sweep voltage will commence to rise at the instant when the self-position pulses are sent out from the airplane, this sweep circuit is connected as shown to the output of the self-position pulse generator 100 in unit 73. Thus, each time a self-position pulse is sent out the sweep circuit 254 commences to apply a rising sweep voltage to the plates of oscilloscope 251 and the value which this voltage has attained by the time the corresponding pulse returns to the plane after reflection from the earth, determines the position of the spot on the screen of the oscilloscope. Accordingly, the position of the spot on this oscilloscope with respect to the starting point of the sweep will represent the absolute altitude or terrain clearance.

Since the antenna 244 is used during about half its revolution for reception of anti-collision signals, the reception of terrain clearance pulses will be blocked during these periods by interruption of the ground applied from cam switch 245 to the width selector 253. Actually this interuption may be maintained for about ¾ of a revolution of the antenna 244 so that the reception of altimetry pulses will only take place during the remaining 90° of rotation. This will mean that the spot representing the terrain clearance on the altimetry indicator will be keyed off and on at the rotation rate of antenna 244, i. e. once per second.

Quasi-radar feature

The small equipment shown at 255 in Fig. 10 is included on each of the planes using high density airports and cooperating quasi-radar equipments, such as shown at 256 in Fig. 15, are installed at these airports, and used as the principal means of determining the positions, altitudes and identities of the airplanes around such airport. With such equipment at airports is included control and indicating equipment described in detail hereinafter.

The additional equipment required on the planes for this purpose comprises merely an identity code keyer 257 continuously actuating a set of contacts at a slow rate in accordance with the Morse code representing the airplane's identification number, a simple barometer 258, (consisting of a Sylphon bellows and a simple lever linkage for swinging a condenser plate through 90 degrees under control of the movement of such bellows), and a variable delay circuit 259, including one or two tubes and arranged to trigger a pulse 10 to 100 microseconds after the reception of an applied pulse, the delay being dependent upon the capacity of the above mentioned variable condenser.

The equipment required on the ground for the quasi-radar service consists merely of the quasi-radar receiver 256, shown in Fig. 15. No corresponding quasi-radar transmitter would be required since the rotary beacon 71 already described for providing azimuth indications would serve as the transmitter for the quasi-radar service.

The quasi-radar receiver 256 comprises the four $F_2$ receiving antennas 260, 261, 262, 263, preferably located on the same mast as the transmitting antennas 80–83 of beacon 71. These antennas are connected to the goniometer 264 which is rotated in synchronism with beacon 71 by a Selsyn motor 265. The output of goniometer 264 is connected to a receiver 266 which includes a 3 microsecond width selector 267 and a pulse reshaper 268. The output of the reshaper 268 is applied to the grid of one or more oscilloscopes 269.

These oscilloscopes 269 are arranged in the posting desks hereinafter described in connection with the display unit of the airport for viewing by the posting operator. Although these oscilloscopes 269 are mechanically a part of the posting desk, they are represented in Fig. 15 as being part of the quasi-radar receiver 256 because of the fact that they are electrically controlled by the other elements of this unit 256, and also because of the fact that if the display unit with its display boards and posting desks were to be provided at an airport not equipped with quasi-radar receiver 256, the oscilloscopes 269 would be omitted from the posting desks.

In addition to their grids, which are energized from receiver 266, as above mentioned, the oscilloscopes 269 also are controlled by magnetic deflection windings 270 which are rotated by Selsyn motors 271 in synchronism with rotary beacon 71. These deflection windings 270 are energized with sawtooth current waves from common sweep circuit 272 which is synchronized by pulses from pulse generator 88A in the rotary beacon 71.

The principles of operation of both the radar reply equipment 255 in the airplane and the quasi-radar receiver 256 on the ground can best be explained from the following sequential description of operation of the complete quasi-radar service. Such sequential description will trace a complete cycle of quasi-radar operations commencing with the transmission of pulses from the rotary beacon 71 (which also serves as the transmitter of the quasi-radar system) and continuing through the reception of such signal in the airplane and the radiation of a corresponding radar reply signal from the airplane and concluding with the reception of such radar reply in the quasi-radar receiver 256 and the display of the corresponding signal on the screens of oscilloscopes 269.

The transmission of the signals of rotary beacon 71, Fig. 11, takes place exactly as previously traced in connection with the self-location service. The pulse generator 88A generates first a 5 microsecond and then a 3 microsecond pulse which are modulated onto $F_1$ carrier by transmitter 77, and then radiated from antennas 80–83. As previously explained, the radiations of these two pulses are characterized by different radiation patterns having the form of a figure-of-eight and a cardioid so oriented as to sharply define one single sweep line direction along which only the 3 microsecond (but not the preceding 5 microsecond pulse) can be received. The transmission of the two successive pulses in accordance with these different radiation diagrams is controlled by switching circuit 78 and goniometers 79 and 85.

In addition to the transmission of these two successive pulses, as previously described, the rotary beacon 71, Fig. 11, is required to perform one additional special function in connection with the quasi-radar receiver 256. This additional function is the synchronizing of the sweep circuit 272 by the double pulse generator 76. For this purpose the pulse generator 76 should be arranged to deliver a synchronizing pulse to sweep circuit 272 at the instant when it transmits the second or third microsecond pulse of its double pulse signal. Thus, each time a pair of pulses is sent out by rotary beacon 71, the sweep circuit 272 is triggered by generator 76 at the instant of transmission of the 3 microsecond pulse. This sweep circuit 272 then commences to deliver to deflection windings 270 of the several oscilloscopes a deflection current starting at zero and uniformly increasing in value during 240 microseconds which ensue before the next double pulse transmission.

While this deflection current through circuit 272 is increasing from zero, the double pulse signals from the rotary beacon 71 are being propagated as before, to the airplane, where they are received in the unit 73 exactly as previously described in connection with the self-location service. As explained in such previous description, no effective output is delivered by width selector 94, excepting during those short intervals when the imaginary sweep line of the beacon 71 is very nearly aligned with the airplane. During such intervals, however, the selector 94 will pass the 3 microsecond pulses of each double pulse signal received.

Assume that the double pulse signal being traced is received by an airplane which is very nearly exactly aligned with the imaginary sweep line of the beacon 71. The width selector 94 of such airplane will consequently pass the 3 microsecond pulse of such double pulse signal and this pulse is not only applied to the lock-in oscillator 95 for controlling the azimuth indication on the plane as previously described, but is also applied to the radar reply unit 255. In this unit 255, the 3 microsecond pulse is connected directly to the normal contact of identity code keyer 257 and indirectly through delay circuit 259 to the off-normal or active contact of this same code keyer 257.

Assuming that this keyer is in normal condition, i. e. its contacts are not actuated to represent the dots or dashes of the airplane's identity code, the 3 microsecond pulse will, therefore, pass immediately from width selector 94 through code keyer 257 to transmitter unit 75, where it will be applied through limiter 102 to transmitter 99. The transmitter 99 will then emit a 3 microsecond pulse of $F_2$ carrier substantially instantaneously after the corresponding 3 microsecond pulse of the double pulse signal is received from the beacon M.

If the keyer 257 had been in off-normal condition (i. e. with its contacts actuated for the production of a dot or dash) at the instant when the 3 microsecond pulse was received from rotary beacon 71, the pulse would have had to pass through delay circuit 259 before being delivered through the keyer to the transmitter unit 75. Under such conditions, the radar reply pulse sent out by transmitter unit 75 would have been correspondingly delayed by ten or more microseconds, the exact amount of the delay being determined by the delay action of circuit 259. Since this circuit is designed to introduce a delay depending upon the position of barometer mechanism 258, the extent to which the radar reply signal from transmitter unit 75 would be delayed would depend upon the altitude of the airplane.

It will thus be seen that during normal or non-keying intervals the airplane will transmit a radar reply signal substantially instantaneous but that during keying intervals, the airplane will transmit its radar reply with a delay representative of its altitude.

In either case, the radar reply signal after being transmitted must travel back to the center of the airport where it will be picked up by antennas 260–263 of quasi-radar receiver 256. The reception diagram of this group of antennas will be favorable for receiving this signal since the goniometer 264 is synchronized with beacon M in such phase that the maximum reception direction of antennas 260–263 is always pointed in the same direction as the imaginary sweep line of beacon 71.

The radar reply signal thus picked up by antennas 260–263 and transmitted in cooperation with goniometer 264 is applied to receiver 266. This receiver detects the signal to produce a pulse corresponding to the envelope. Also, as previously mentioned, the receiver 266 contains a pulse width selector so as to pass only pulses of 3 microseconds width, these pulses being then re-shaped at 268 to yield extremely narrow pulses capable of defining sharp spots on the oscilloscope screen. The positions in which the spots will appear on the screens of oscilloscopes 269 is determined by the deflection windings 270 which are being increasingly energized by the uniformly rising current from sweep circuit 272 as previously described.

It will be remembered that the sawtooth deflection current commenced to rise from zero at the instant when generator 76 produced the 3 microsecond pulse for transmission from the rotary beacon 71. Thus, during the time when such 3 microsecond pulse was traveling outward from the beacon to the plane and during the time when the corresponding radar reply pulse was traveling back from the plane to the quasi-radar receiver, the currents produced in deflection windings 270 by sweep circuits 272 have been constantly increasing. At the instant when the radar reply pulse arrives at quasi-radar receiver 256 and is applied to the grids of oscilloscopes 269 to illuminate beam spots on their screens, therefore, the deflection current will have a value dependent upon the time of propagation to the plane and back. The radial displacements of the spots from the centers of the oscilloscopes will, therefore, correspond to the distance of the plane from the central part of the airport where beacon 71 and quasi-radar receiver 256 are located.

The angular direction in which the spots are located from the centers of the screens will depend upon the rotary positions of the windings 270. Since these windings are rotated in synchronism with the beacon 71, the direction of deflection of the spots will correspond to the direction of the imaginary sweep line of beacon 71. But the radar reply impulses are sent out only from those planes which are aligned with this imaginary sweep line, as previously explained, and therefore, the angular direction to the spots will correspond to the azimuth angle of the plane.

Thus, the spots on the screens of oscilloscopes 269 will have radial displacements from the center corresponding to the radial distances of the airplanes from the airport, the directions of these displacements corresponding to the direction of the airplanes.

The above discussion applies to the spots produced during the normal or non-keying intervals when the radar reply signals are sent out by the airplane immediately upon the receipt of the 3 microsecond pulses from the rotary beacon 71. During the keying intervals when the code keyer 257 of the radar reply signals transmitted from such plane will be delayed by an interval representing the airplane's altitude as previously explained. The corresponding spots shown on the screen of oscillographs 269, during such keying intervals, will therefore be displaced outward by an extra distance corresponding to the airplane's altitude. Thus, during these keying intervals, the spots will be shown in a fictitious or "ghost" position, the radial direction of deflection being correct but the extent of radial displacements being greater than the correct amount by a distance representing the airplane's altitude.

It will thus be seen that the spots representing any airplane will normally be shown on the screen in a position accurately representing the airplane's true position but will jump outward during the keying intervals to a ghost position somewhat farther out from the center of the screen. The separation of the true and ghost positions of the spot will represent the altitude of the airplane. This is illustrated in Fig. 15A where the tracing of the cathode ray beam is indicated by broken line 273 on oscillograph screen 274. The spot 275 represents a plane's true position in distance and azimuth with respect to the center 276 and reference lines 277, 278. The spot 279 is the "ghost" indication for the true position spot 275. The utility of these indications is discussed in further detail hereinafter with respect to Fig. 21.

Posting desk and display boards

The oscilloscopes 269 are arranged in posting desks (to be described later) for viewing by the posting operator. Although these oscilloscopes 269 are mechanically a part of the posting desks, they are represented in Fig. 15 as being part of the quasi-radar receiver 256 because of the fact that they are electrically controlled by the other elements of this unit 256, and also because of the fact that if the indicating equipment were to be provided at an airport not equipped with a quasi-radar receiver 256, the oscilloscopes 269 could be omitted from the posting desks without disturbing the other functions of the desks.

The display function which is carried out partly manually and partly automatically consists essentially of converting information received from the quasi-radar equipment, into a convenient three-dimensional display. The equipment used to perform this function consists of the main display board 280, Fig. 16 (to be described in detail with reference to Fig. 20) and a number of posting desks, each comprising a bank of switches 281, a board containing posting controls 282, a check lamp board 283, a viewing surface 284 for providing a schematic view of the airport superimposed on the indications obtained from the check lamp board and the respective oscilloscope one of which is also mounted on each desk.

The general appearance of a display board 285 is shown in Fig. 18. As can be seen from this figure, this board contains a number of rod-like display units 286 projecting up to a height of about four inches above the top of the display board. Some of these rod-like display units are arranged in a circle representing a traffic circle, while others may be arranged in straight lines representing the ranges and the straight arrival and departure branches connecting these ranges to the traffic circles. The arrangement of the rod-like member may also take the form shown in Fig. 17 at 280a to represent airway repeater stations between airports. Each such display unit is arranged to show spots of illuminations at different elevations above the surface of the map. Thus, the positions of airplanes can be displayed in three-dimensions.

There are several ways in which one can produce the desired effects of spots of illumination at different elevations. One form of display unit 287 contemplated for the purpose shown in Fig. 19 comprises a number of transparent plastic filaments 288 bunched together to form a narrow bundle somewhat more than four inches high with the upper ends 289 of the various filaments 288 terminated at different heights in the bundle. At the bottom of the bundle the separate filaments fan out toward a number of separate lamps 290 in separate sockets. The complete display unit is arranged to be plugged into the display board from the underside thereof with the group of filaments projecting through a hole in the display board. Suitable terminal pins 291 are provided for each display unit for making the required electrical connections with corresponding jacks on the under side of the display board.

Each display unit 287 is provided with 13 filaments 288 and 13 corresponding lamps 290 for displaying illuminated spots at any of 13 heights above the display board. The highest level may be used to represent any plane flying at 13,000 feet or more and the other 12 levels may separately represent the altitudes from 1000 to 12,000 feet.

In addition to the display units, the main display board is provided with certain auxiliary lamps as shown in Fig. 18. There are two such auxiliary lamps 292 and 293 adjacent each display unit of the traffic circle. One of these may be an orange lamp signifying that the plane represented on the adjacent display unit is "too close" (i. e. is flying considerably inside the circle which should be flown) while the other may be a blue lamp signifying that the plane is "too far." Also, a row of five red auxiliary lamps 294 are provided in line with each runway to represent planes landing or taking off.

The traffic controller may be provided with a telephone plug (not shown) and a group of telephone jacks 295 may be provided along the side of the display board nearest to him to enable him to quickly give the posting operator a message for relaying to any plane (or even to enable the controller to speak directly to the plane if he wishes to do so). In order that the traffic controller may quickly identify the airplane which corresponds to any particular spot of illumination which he sees on his display board his phone plug (not shown) may be wired so that when touched against the sleeve of any one of his phone jacks, it will extinguish the corresponding spot. Thus, by sliding his plug over the jacks until it extinguishes the spot in which he is interested and then plugging it into such jack, he will be immediately in communication with the proper posting operator who is in charge of posting the corresponding plane (and in addition, the circuits will automatically tell this posting operator which of the several planes he is handling is under consideration).

The general appearance of one of the posting desks from which the lamps of the display board is controlled is shown in Fig. 20. Such display desk 296 includes the cathode ray tube upon the screen of which the airplanes' positions, identities and altitudes are automatically displayed by means of the quasi-radar equipment as described hereinabove, the check lamp board 283 whose lamps are wired in parallel to the lamps of the main display board but which are arranged on a flat surface instead of three dimensions, and a posting shelf 297 shown as having 24 groups of posting controls 298. Each of these groups of posting controls includes a speed selection knob 299, an altitude selection knob 300 and three buttons 301 for stepping the lamp indications forward fast or slowly or backward slowly.

The posting desk also includes a viewing frame 302 in which the operator appears to see superposed upon each other the screen of the oscilloscope 269 and the check lamp board 283. The appearance of this combined indication as seen in the viewing frame 302 is represented in Fig. 21.

In this figure the light and medium-heavy circles 303 are merely graduations to facilitate estimation of distances. The very heavy-weight circle 304 and the four heavy-weight lines 305, 306, 307, 308 extending to the points marked "EII range" and "DII range" represent respectively the circle of display units on the main display board 285, and the four straight rows of display units extending from the ranges to such circle (as in Fig. 18). Thus, all these extra heavy lines correspond to the true positions of the display units on the main display board. The groups of dots 309 are luminous spots on the cathode ray screen representing the positions and altitudes of the airplanes. The tiny circles 310 represent the corresponding lamps which have been lighted in the check lamp board, these being wired in parallel with the lamps in the display unit of the main display board. The whole task of the posting operator is to control the switches which extinguish and light these lamps so that the proper lamps will be lighted for representing the positions and altitudes of the airplanes as shown by the groups of dots 309.

Because of the fact that the spots of illumination on the main display board are given in three dimensions with 13 possible heights of illumination for each display unit, while the corresponding check lamps 310 seen by the posting operator must be arranged in two dimensions but must nevertheless include 13 check lamps 310 for each display unit 287, it is necessary to have 13 side-by-side rows of check lamps 310 for each row of display units 287. This obviously renders it impracticable to superpose all check lamps directly upon the extra heavy lines 305 to 308 representing the straight and circular rows of display units 287.

Accordingly, the check lamps 310 corresponding to the circular row of display units are arranged on 13 concentric circles 311 with the extra-heavy circle 304 serving as the 2000 foot row and with the 12 successively smaller circles 311 inside such extra-heavy circle serving as the 3000 foot to 14,000 foot rows. In the case of the check lamps corresponding to the straight rows of display units, it is believed more convenient to arrange these along the parallel grids of lines 312 shown a short distance away from the extra-heavy lines 305 to 308 which represent the corresponding rows of display units.

Consider, for instance, the heavy line 308 extending from range DII upward and to the right toward the heavy traffic circle 304, this line 308 being hereafter referred to as the DII range arrival branch. The check lamps which represent the illuminated spots 289 of the display units on the corresponding DII arrival branch 308 of the main display board are arranged in 13 parallel rows on the grid of lines 312.

It will be noted that there is a circle 310 shown on the number 6 line of this grid 312. As indicated by the marginal legend on the figure this circle 310 represents a plane whose identification number is H3J9 flying at an altitude of 6000 feet and coming in on the arrival branch 308 of the DII range. The corresponding oscilloscope representation of this plane consists of two groups of dots 313 and 314 slightly above and to the left of the corresponding check lamp 310. These two groups of dots 313 and 314 respectively represent the true position of the plane and a fictitious or "ghost" image of the plane used as hereinbefore explained for determining its altitude. The group of dots which is closest to the center 315 of the circle always represents the true position of the airplane. It will be seen that this group of dots 313 is about one-fifth of the way down from the upper end of the line 308 representing the DII range's arrival branch. Correspondingly, the check lamp 310 is located about one-fifth of the way down from the top of the line marked 6. Ideally, the position of the check lamp 310 should be exactly opposite the center of the inner group of dots 313. Actually, such exact coincidence is not always possible since there are only about 12 to 15 display units along the DII range arrival branch 308 and hence there are only about 12 to 15 check lamps on the corresponding line number 6. Nevertheless, even with this number of lamps, it is possible to maintain the circle 310 very nearly aligned with the inner group 313 of dots representing the plane position.

The outer group 314 of dots which are exactly aligned radially with the inner group represent a fictitious or ghost position of the airplane. This ghost position of the airplane is always located outside of the true position of the airplane by an amount which represents the altitude of the airplane. If the airplane's altitude is 1000 feet, the ghost position of the plane will be shown three spaces outside of the true position of this plane. For a 2000 feet altitude, the ghost would be four spaces outside of the true position. For any other altitudes, also, the number of spaces between the ghost and the true position of the plane is always two spaces greater than the altitude in thousands of feet.

It will be seen that for the airplane H3J9 which has just been considered, the ghost is eight spaces outside of the true position of the airplane and, therefore, the airplane must be at 6000 feet. Accordingly, the lamp 310 representing this plane is shown on the number 6 line of the grid 312 associated with the DII range arrival branch 308. In similar manner, the grid 316 shown below and to the left of the DII range departure branch 307 shows a check lamp 317 on the number 2 grid line representing a 2000 foot altitude. This check lamp 317 accurately represents the altitude and position of a corresponding plane X7BH, whose true position 318 is shown to be on the heavy line representing the DII departure branch 307 and whose ghost position 319 is shown to be 4 spaces outside of such true position. Also, the grid corresponding to the departure branch 305 of the EII range shows a similar check lamp 310 on the number 3 line representing a 3000 foot altitude. This represents the plane P73L whose true position is shown to be exactly on the heavy line 305 representing the EII range departure branch and whose ghost is shown to be 5 spaces further out.

In case of planes traveling around the traffic circles, these are represented on the display board by lighting corresponding spots at appropriate heights on the circle of display units 287 seen in Fig. 18. In the two-dimensional representation of Fig. 21, this circle of display units is imagined to be tipped over inwardly so that the 13 inner sets of circular graduations 311 represent the various heights of lamps on the display board. For this purpose these inner groups of graduations are numbered 2 to 14 as shown.

To facilitate the readings it is suggested, for instance, that the procedure specified for planes flying around the airport be such that the planes flying around the traffic circle at 2000 feet are supposed to fly on a circle of 9 mile radius (corresponding to the circle marked 2 in Fig. 21), while planes at 3000 feet altitudes are supposed to fly on a circle of .37 mile less than 9 miles in radius (corresponding to the first light weight circle 311 inside of the circle 304 marked 2 in Fig. 21). Similarly for each additional thousand feet of altitude the prescribed radius of flight is decreased another .37 mile. Thus, in the ideal case, if all planes were flying at exactly the radii assigned to them, as well as at the correct altitudes, the dots 309 representing the true positions of the planes would fall on the circles which corresponded to their altitudes. Consider, for example, a plane (such as CUMN in the upper right sector of Fig. 21) accurately flying at 6000 feet and at the exact radius prescribed for that altitude. Such plane would appear in the viewing frame shown in Fig. 21 as a group of dots 309 exactly on a circle 311 marked 6. Similarly a plane (such as N39U at the left side of Fig. 21) flying at 10,000 feet and at the corresponding radius would be represented by a group of dots 309 on the circle marked 10.

Actually, however, it is recognized that the planes would not always fly accurately at their assigned circles and occasionally may not even hold accurately to their assigned altitudes. In order to check this, one could, of course, measure the distances between the true representation of each plane and its ghost representation and thus determine its true altitude and then could observe whether its true position as represented by the inner group of dots corresponded to this altitude. A much simpler way of quickly checking this is available, however, because of the layout of the screen in Fig. 21. If a plane is flying at exactly its prescribed radius and altitude, its ghost will always appear on the checking circle 320 marked C which is just four spaces outside the circle for 2000 feet flight. Thus, if any ghost appears to be very far off this circle, the posting operator will at once know that the plane is departing considerably from its assigned altitude or radius.

Consider, for instance, the plane G3DE (shown almost directly to the right of the center of the circle). The dots 309 representing the true position of this plane lie on the circle corresponding to a 7000 foot altitude (i. e. one space from the circle marked 6). The outer group of dots 309 representing the ghost position of this airplane, however, are three spaces outside of the checking circle 320 marked C. This directly indicates that this plane is incorrect either in radius or altitude. Looking more closely, one can see that the difference between the ghost and the true position of the plane is 12 spaces. Therefore, the plane must be at 12,000 feet. Assuming that this altitude has actually been assigned to plane G3DE, one will know that the plane is actually flying at the correct altitude, but is flying three units outside of its assigned radius, i. e. $3 \times .37$ mile outside of its true position. Such departure of any plane from the radius assigned to it is not at all serious, since the planes are essentially separated by altitude rather than by radial position. Nevertheless, for the convenience of the posting operator, it is desirable that the planes should so far as possible keep to their assigned radii since this will considerably reduce the difficulty of quickly checking their positions and altitudes. Accordingly, it may be desirable to call the attention of the pilot to the fact that he is not on his correct radius and to request him to pay more attention to this requirement or to check his instruments if they are at fault.

It will be noted that the check lamp 310 representing the above mentioned plane G3DE is on the circle No. 10. This is because the plane is actually flying at 10,000 feet altitude as above determined and, therefore, should be displayed at a height of 10,000 feet on the main display board (i. e. with its check lamp shown on the 10,000 feet circle of Fig. 21).

In order to determine the identity of the planes, the groups of dots 309 representing the true and ghost positions of each plane are flashed slowly in accordance with the Morse code representing the identity number of the plane. The flashing is alternate so that the ghost will be illuminated when the true position is extinguished and vice-versa.

In order to control the movement of the illuminated spots 309 on the display board and of the corresponding check lamps 310, the posting operator may use the 24 groups of posting controls 298, Fig. 20. Each of these groups of posting controls 298 is associated with one motor driven automatic telephone type switch, Fig. 23, which is capable of stepping an illuminated spot 289 (and corresponding checking spot 310) forward around the traffic circle at any one of 12 different speeds. Each group of posting controls includes one speed regulating dial 299 for selecting a speed closely approximating that of the airplane, one altitude selecting dial 300 which determines the height of the corresponding illuminated spot 289 on the display board 285 (and the row in which the corresponding check spot 310 will be displayed) and three buttons 301 for causing the spots to "inch forward" one step at a time, "inch backward" one or two steps, or "race forward" rapidly at the rate of several steps per second. Each such group of posting controls 298 also includes a set of four finger wheels 321 each having a full set of numbers and letters printed on it, these wheels being provided with recesses for the operator's fingers so that they may be quickly set up to display any four character code.

Adjacent each group of posting controls a "calling" lamp 322 and a telephone answering jack 323 are provided. These are connected to the appropriate one of the telephone jacks 295 on the display board 285, Fig. 18, so that the lamp 322 will be lighted when the traffic controller inserts his phone plug in such jack 323.

A special control could be provided for the purpose of turning out the illuminated spots 289, Fig. 19, and check lamps 310, Figs. 21 and 23, controlled by any given automatic switch and restoring the switch to its normal position. Preferably, however, the altitude selecting dial 300, Fig. 20, will be wired so that when this is set to zero altitude the associated lamps 310 are extinguished and the automatic switch is driven around to its normal starting position ready for use in posting the next plane which may arrive.

Of the 24 motor driven automatic switches associated with the 24 groups of posting controls 298, we may assume that two are capable of advancing lamps along the DII range arrival branch, two are capable of advancing lamps along the DII range departure branch, Fig. 21, while four more are similarly assigned to the arrival and departure branches of the EII range. The 16 automatic switches associated with the remaining 16 posting control groups 298 may be assumed to be capable of advancing the lighting of lamps 290 around the circle of display units 287 on the main board.

Accordingly, when a plane starts to come in from the DII range on the DII arrival branch, the proper posting operator must make use of an idle one of the two control groups 298 assigned to this branch to start an illuminated spot 289 on the display board (and a check lamp 310 on the viewing screen 284) traveling in conformity with the plane. First he will determine the altitude by noting the separation between the ghost and the true positions of the planes and will set his altitude control knob 300 to this value so as to produce a spot 310 in the correct row of lines 312 below and to the right of the DII range arrival branch 308. Next, he will estimate (or determine from the operator previously posting this plane) the approximate speed and set his speed regulating dial 299 thereto. Third he should read the Morse code of the plane to determine its identification number and set up this number on the group of 4 finger wheels 321 located immediately adjacent the group of posting controls 298 which he has chosen to represent the plane. Thereafter, he should from time to time check to see if the altitude of the plane is changing or if he has misjudged its speed, and in either such case should correspondingly correct his altitude or speed dial.

Comparatively little attention should, however, be required until the plane arrives at the traffic circle 304, at which time he will have to choose for this plane a different control group 298 out of the set of 16 which are capable of advancing lamps around the traffic circle. He will then turn the altitude control knob 300 of the previously chosen control group back to zero, extinguishing the lamp, and with the "forward inching" button 301 of the newly chosen control group will advance a lamp to approximately correct position thereafter inching it to the exact position desired with the "forward inching" button 301. The altitude and speed dials 300 and 299 of the newly chosen control group 298 will be set as before to represent the speed and altitude of the plane. Thereafter as long as the plane continues to fly around the traffic circle at a constant altitude and speed, the posting operator will not need to take any further action with respect to this plane, excepting to check from time to time that its ghost remains on the checking circle 304 and its check dot 310 remains practically superposed on the spots 309 representing its true position.

The fact that the display board is not fully automatically operated but is controlled through the agency of a posting operator renders the system not only more economical but also far more flexible than a system using full automatic means for producing displays. Thus, during the transition interval when the system of the present proposal may be gradually coming into use, there may be a period of years when information with respect to the positions of some or all the planes near the airport is not yet available in accordance with the contemplated plan but is instead obtained from intermittent telephone or Teletype reports. Because of the partially manual control of the display system herein disclosed, it will still be possible to post this information on the main display board in the same form in which it could be shown when the whole system ultimately became available.

The fact that the display board is semi-automatic in its operation greatly reduces the work of the posting operator as compared with other systems in which the posting operator must separately control the displaying of each successive position of each airplane. With the switching mechanisms automatically advancing the lighting of the lamps at a rate selected by the posting operator, the latter's duties consist essentially of setting up the posting controls initially when a plane enters a new section (e. g., enters an arrival branch from a range or enters a circle from an arrival branch), restoring the posting controls to inoperative condition when a plane leaves a given section, and periodically checking the correlation between the check lamps and the indicated plane positions to make necessary corrections in speed or altitude if these vary.

The general appearance of the airway posting desks used for controlling the movement of the illuminated spots on the airway display board of Fig. 17 is essentially the same as the appearance of the airport posting desk 296 (shown in Fig. 20) excepting that three cathode ray tubes of slightly smaller diameter are substituted for the one very large cathode ray tube 269 illustrated. The posting controls and the general relationships of the viewing frame, the cathode ray screen and the check lamp board is, however, substantially as shown in Fig. 20.

The viewing frame of the airway posting desk appears as at 327 illustrated in Fig. 22. The three circles 328, 329, 330 represent the screens of three oscilloscopes while the heavily lined rectangles 331 at the left and right margins of these circles represent masking strips used for covering the undesired marginal portions of these screens. The vertical lines I, II . . . VI represent the positions of successive towers along the airways, these vertical lines as well as the mileage scales being engraved on a ground glass which forms the front surface of the check lamp board (c. f. 283 in Fig. 20). The grid 332 of twelve horizontal lines marked "2, 4 . . . high," represents the different altitude levels; and the check lamps shown as small circles 333 are arranged in twelve rows along these lines. The tiny dots 334 shown just above the scale of miles are the luminous spots which represent the planes on the cathode ray screen. (The arrows shown below these spots do not exist at all, but are merely shown in the picture to indicate the direction in which the luminous spots are moving.)

It will be noted that each plane is represented by two luminous spots as well as by a check lamp. The right hand one of these two luminous spots represents the altitude of the airplane according to any suitable scale which would be measured by means of dividers or other suitable means. Alternatively, a large number of fine vertical graduations could be provided just above the scale of miles so that the operator could by counting these graduations determine the altitude of any plane without the use of dividers.

In addition to representing the positions and altitudes of the airplanes as above explained, the spots may also indicate the identities of the airplanes by a Morse coding. The two dots representing any plane are not actually illuminated at the same time, but are alternately flashed in a complementary rhythm representing the dots or dashes of the airplane's identifying code. Thus, the dots representing each airplane appear as a dot which normally lies in the true position of the airplane but which jumps slightly to the right during each dot or dash of the identification number. The luminous persistance of the cathode ray screen is preferably sufficiently short so that such identification code can easily be read, while still being sufficiently long so that there will be no difficulty in measuring the distance between the two positions of any dot by the use of dividers or graduations as previously explained.

The diagram of Fig. 23, represents in functional form a possible circuit and automatic switching arrangement for the control of the display board lighting as well as that of the check lamp board 283. The altitude indicating lamps 290 of the display units 287 are shown to be connected in parallel with the check lamps 310 of the check lamp board 283, the parallel circuit being supplied from the source 335 through a motor driven position selecting stepping switch 336 and the manual control 299 of an altitude selecting stepping switch 337. As referred to hereinbefore, the posting desks are each provided with the controls 300 for regulating the speed of a motor 338 driving the position selecting switch 336 at a speed corresponding to a given airplane speed so that the respective display units and check lamps are lighted in step with the oscilloscope indications. In the diagram, voltage is supplied from the source 335 through a contact 339 of the step switch 336 to the display unit A through the altitude control 299. After a suitable interval of time, depending on the speed of the motor 338, the display unit B will be supplied over contact 340. Although not shown, an altitude selector control 341 of an altitude selector switch 342 may be made to move automatically into an altitude selecting position analogous to that of switch 337 upon the change from step 339 to 340 in order to illuminate the proper lamp in the display unit B and on the check board 283. In order to accommodate the indication for additional planes, switches 337 and 342 are seen by way of illustration, ganged to second and third contact plates 343 and 344, respectively, which may be connected to the source 335 through a position selector switch 345 and others as needed.

For the sake of economy and reliability, it is preferred to use existing types of telephone selector switches which have been successfully manufactured and employed for many years in the field of automatic telephony. In order to adapt these to the ideal requirements above set forth, it would be possible to gang several such switches together for each switch required. It is virtually certain, however, that a considerably more efficient and economical arrangement can be devised using a smaller amount of equipment with more complex circuits.

In addition to the possibility of greatly reducing the amount of the equipment required by means of the various equipment-saving circuit principles which have been worked out and used for many years in the field of automatic telephony, it is also probable that other circuit features taken from the telephone art can be used to actually improve the performance, possibly by automatically handling the transition from the posting of an airplane travelling along an arrival branch to the posting of the same airplane travelling around the traffic circle. It is believed, therefore, that further details of the automatic switching arrangements can best be disregarded, since it is certain that the required functions can readily be performed and since it is almost equally certain that the particular circuits which will finally be used will involve many short cuts and improvements too complex to merit discussion at this point.

Although in general each plane is represented by only two spots (or one spot jumping between two positions) as above explained, there may be cases where echo effects result in doubling the representation of a plane. Such echoes or double transmissions are likely to occur when a plane happens to be within a very short distance from one of the relay towers. This echo effect, however, appears as if there were two planes exactly equally distant from the tower and flying in opposite directions. Thus, there may be four instead of two spots, one pair being to the right of and the other pair being to the left of the vertical line IV which, for example, represents tower IV. The distances from the line representing the tower to the left hand spot of each pair will always be alike in any such case of double representation or echo; and in any such case the left hand pair of spots will be the true representation while the right hand pair of spots will be the echo. In order to verify whether the right hand pair of spots is actually an echo, the observing operator need only note whether both pairs of spots are keyed in exactly the same rhythm.

Such echos only appear when the plane is closely adjacent one of the vertical lines representing a tower and will only last for a short time. It should be noted, moreover, that the number of such echoes shown at any one time on the screens will not be very large since each plane may display an echo only about ten or twelve percent of the time.

The airway multi-channel communicating features

The airway system has been described generally, hereinbefore, with reference to Figs. 1 and 1A; also the posting of the flight conditions of aircraft along the airways between airports has been described in connection with Figs. 16 through 23 particularly Fig. 22. Figs. 24 and 25 illustrate further the communicating feature of the airways. In Fig. 24 a west terminal and an east terminal are shown interconnected by a plurality of radio repeater stations preferably of a beamed micro-wave type. Fig. 25 shows, diagrammatically, the equipment of one of the relay stations.

In a copending application of E. M. Deloraine, Serial No. 531,851, filed April 20, 1944, entitled "Repeater Link System," now Patent No. 2,509,-218 issued May 30, 1950, is disclosed a similar repeater system for multiplex communication between two remote points by way of a plurality of directive repeaters together with the provision of arrangements for broadcasting or directively transmitting certain of the channels from each of the towers so that craft travelling along a line within range of these towers may communicate selectively with a base station or with each other. In applicants' Patent No. 2,421,017, entitled "Communication and Guiding System," is disclosed a multiplex communicating system in combination with beacons at the repeater stations thereof for guiding aircraft along the chain of repeaters. The present invention includes many new features and improvements on many of the features disclosed in these two copending applications.

A micro-wave or pulse type of communicating system employed in the present and the above-mentioned copending applications is preferred regardless of the broad band characteristics thereof because of the multi-channel capabilities and speed of transmission afforded by such system. Furthermore, the difference in cost of the micro-wave beam radio system is little more for the extra wide band width of say 1000 kc. as compared to a narrow band width of 100 kc. The wider band width has the advantage of multi-channel forwarding continuously and at high speed information as to positions, altitudes and identities of all planes along the route. Probably this information could be carried over a narrow band channel if intermittent reports of each plane every few minutes were regarded as acceptable; but it is believed advantageous to have this information continuously. Moreover, where wide band channels are available, it becomes possible to use a very simple quasi-radar method hereafter described for determining the plane positions, altitudes and identities from the towers and forwarding the information to the base without complex coding and decoding mechanisms.

Another advantage of the wide band width micro-wave transmission is to send the necessary weather information by high speed facsimile methods. If the wide bands are suitable for transmitting short pulses, the transmission of facsimile will not only be speeded up but will also be simplified since the facsimile signals can be conveniently transmitted in the form of brief pulses or dots and therefore can be applied directly on a pulse transmission channel.

Still another advantage of micro-wave transmission is to simplify the multi-channel telephone transmission problem by making use of one of the more recent methods of multi-channel modulation in place of the conventional combination of amplitude modulation and filters with its level adjusting circuits, its level equalization circuits, and its inherent tendency to increase the percentage of amplitude distortion each time it is repeated. The methods of modulation which appears most suitable for a chain of beamed micro-wave radio links are the FM method of modulation and the time modulated pulse method with time separation of channels. The latter method is preferable to FM for this particular service because of its possible combination with the quasi-radar and radio range timing features, as well as many other advantages to be had such as in simplicity of equipment, for example.

If the air route is one with a very high density of traffic, two separate airway installations are provided parallel to each other but separated by about 10 miles, each such airway being used for one direction of traffic. If the air route has a lower density of traffic one single bi-directional airway installation is provided, and the traffic in opposite directions is segregated at different levels. In the latter case, the single bi-directional airway may split into two one-way branches in the neighborhood of each airport as hereinbefore described.

If it is desired to use existing wire facilities consisting of a number of wire circuits of the usual type, it is possible to keep the whole system as described, except that the towers will not relay a UHF multi-channel system.

The main difference in such case will be that the wire circuits will not be capable of giving an accurate direct indication of position of all planes along the airways. Instead this knowledge will be obtained by translating the information of plane positions obtainable at each tower into a form capable of being transmitted over a telephone line.

A second limitation is that no high speed facsimile circuit may be available.

If the existing wire facilities are of the coaxial cable type and are capable of handling wide bands, then the whole system previously outlined can still be carried out with no change other than the substitution of the coaxial cable communication system in place of the beamed radio link system.

As hereinbefore mentioned, the airway system is also provided with quasi-radar service for determining the positions, altitudes, and identities of all planes flying above a given airway and for automatically forwarding such information to one of the airports at which such airway terminates. It is, therefore, possible to provide a three-dimensional display board 280a, Fig. 17, whose construction is essentially similar to that of the three-dimensional board 280 shown in Figs. 16 and 20, but which will show in a graphical manner the positions and altitudes of the airplanes flying along the airways. Such three-dimensional board is actuated by a bank of control switches 281a which in turn are controlled from one or more posting desks 282a, the controls of which are actuated by an operator in coordination with the corresponding lamp indications on check lamp board 283a similarly as explained for Figs. 15, 16 and 20.

An airway having two terminals with interconnecting relay stations is shown in Figs. 17 and 24 taken together, the relay stations or towers being shown in more detail in Figs. 1A and 25. The airport of Fig. 17 is representative of a master terminal for controlling the airplane guidance and communication facilities and for directly receiving the indications of airplane positions. Such airway may be assumed, for example to be about 350 to 450 miles long with 16 radio stations spaced along the route to be followed with the master airway terminal station of Fig. 17 located at the western airport and the somewhat simpler terminal station of Fig. 24 located at the eastern airport.

When flying along an airway, the pilot must for self-position indication keep the shield 57 of the indicator 56 (Figs. 3 and 6) lowered so that this indicator will appear as illustrated in Fig. 3. Under such condition the position of the luminous spot with respect to the mileage scale shown in this figure will represent the distance to the next tower eastward. Thus when a plane is flying westward, the distance will be given to the next tower ahead, but when the plane is flying eastward, the distance will be given backward to the tower previously passed. The identity of the tower from which the distance is measured will be shown by a coded flashing of the luminous spot. If the pilot mistakenly raises the shield of this indicator so as to see the complete map, the spot will immediately commence to travel rapidly in a circle with a clockwise rotation so as to warn the pilot that the position of the spot with respect to the map is not to be used as an indication of the airplane's position.

As hereinbefore explained in Fig. 17, the airway terminal is provided with a quasi-radar indication representing the positions, altitudes and identities of all planes flying along the airway, and in addition, a three dimensional display board is provided upon which the information from the quasi-radar indicator is semi-automatically displayed.

The general appearance of this three dimensional display board is shown at 280a, Fig. 17, the construction thereof as well as the method of controlling the illuminated spots are substantially the same as described for the airport display board of Fig. 18. The only significant difference is that the airway display board has its rod-like display units arranged in straight rows to represent one or more airways.

The general appearance of the airway posting desks used for controlling the movement of the illuminated spots on the airway display board is also substantially the same as the airport posting desk of Fig. 6 excepting that three cathode ray tubes of slightly smaller diameter are substituted as shown in Fig. 22 for the one large cathode ray tube illustrated. The posting controls and the general relationships of the viewing frame, the cathode ray screen and the check lamp board are, however, substantially as shown in Fig. 6.

It will be noted that each plane is represented by two luminous spots 334 as well as by a check lamp 333. The left hand one of these two luminous spots represents the altitude of the airplane according to a suitable scale. Preferably, the posting operator is provided with a special quick acting divider which can be operated with one hand like a pair of scissors and which has a scale so as to directly indicate the altitude when the pointers of such divider are set on the two spots representing any airplane. Alternatively, a large number of fine vertical graduations could be provided just above the scale of miles so that the operator could by counting these graduations determine the altitude of any plane without the use of dividers.

Airport to airport communication

In tracing the sequential operations involved in airport-to-airport communications, specific reference will be made to the diagrams of Figs. 1, 17 and 24. Referring first to Fig. 17, it may be assumed that one of the telephone sets intended for airport-to-airport calls has been connected through switchboard 350 to channels 11w and 11e in equipments 351 and 352, respectively. The microphone circuit of this telephone set will be connected to input 11e of the modulation and channel combining equipment 351, while the receiver circuit of this telephone set will be correspondingly connected to output 11w of the channel separation and demodulation equipment 352. It may be assumed also that corresponding connections have been made in the eastern airway terminal equipment shown in Fig. 24.

Now if the telephone user at the western airway terminal speaks into his microphone, the voice signals will be transmitted through switchboard 350 to input circuit 11e of equipment 351.

The equipment 351 is arranged to produce 23 interleaved sets of pulses, each set including 12,500 pulses per second. For the moment, it may be assumed that the successive pulses of any one set of 12,500 pulses per second are equally spaced 80 microseconds apart. One such set of 12,500 pulses per second consists of pulses 2 microseconds long hereafter called synchronizing pulses. The other 22 sets of pulses consist of pulses about ½ microseconds long for carrying 22 separate signals, each such set being referred to as a communication channel. The combined series of pulses resulting from the interleaving of these 23 sets of pulses will, therefore, contain a total of 287,500 pulses per second spaced 3.48 microseconds apart, every 23rd pulse of such combined series being 2 microseconds in length while all the others are about ½ microsecond in length.

Actually the 12,500 pulses of any one communication channel are not uniformly spaced 80 microseconds apart as above assumed, but are initially offset as hereinbefore explained in connection with "push-pull" time modulation so that the time intervals between successive pulses of each channel are alternately substantially 78 and 82 microseconds. These pulses are further displaced or modulated in "push-pull" manner according to the instantaneous value of the signals to be transmitted.

For producing the required time modulation of the pulses of the 22 communication channels, the pulses of each channel are time shifted by a time modulation circuit similarly as disclosed in the aforementioned application, E. M. Deloraine, Serial No. 531,851, and E. M. Deloraine-P. R. Adams Patent No. 2,421,017, which is controlled by signals applied to the corresponding input of equipment 251. Thus, the 12,500 pulses of the first eastbound channel 1e are shifted by a time modulation circuit which is controlled from input circuit 1e of the equipment 351, while the 12,500 pulses of the second eastbound channel 2e are shifted by a time modulation circuit which is controlled from input circuit 2e of the equipment 351, etc.

Similarly, in the case of the particular communication now being traced in detail, the pulses of the eleventh eastbound channel 11e are time modulated (by a corresponding time modulation circuit) in accordance with the voice signals applied to input circuit 11e of the equipment 351. The voice-modulated pulses of channel 11e (together with the pulses of all the other channels) are transmitted to the micro-wave transmitter 353. Such transmitter responds to each applied pulse by delivering a corresponding brief pulse of micro-wave carrier at a frequency $a_1$, and such brief pulses of carrier are radiated eastward by sharply beamed antenna 354. Referring now to Fig. 25 which may for the moment be assumed to represent tower station I (see Fig. 1), the pulses of micro-wave carrier on frequency $a_1$ which are transmitted on a narrow beam from the terminal equipment of Fig. 17 are received by tower antenna 355 and applied to the wide band eastbound repeater 356. This repeater detects the applied carrier into the form of pulses, and applies these pulses to remodulate another carrier of slightly different micro-wave frequency $a_2$, which will then be radiated from tower antenna 357 in a narrow beam directed toward the next tower station II.

At the tower station II, a similar reception, repetition and retransmission takes place, the new transmission being at a new carrier frequency $a_3$ (see Fig 1A). In similar fashion the pulses will be repeated with change of carrier frequency from tower to tower until finally they arrive at the eastern airway terminal equipment Fig. 24 (see also airport 2, Fig. 1).

Referring to Fig. 24 which represents the eastern terminal (airport 2, Fig. 1), the signals will arrive from tower station XVI at carrier frequency $a_2$ and will be picked up by receiving antenna 358, and detected in microwave receiver 359 to yield 287,500 pulses per second whose timing corresponds to that of the pulses delivered to microwave transmitter 353 at the western terminal of the airway. From receiver 359 these 287,500 pulses are delivered to channel separation and demodulation circuit 360.

In this circuit 360 the separate sets of pulses serving to separate 22 channels will be sorted out by an electronic distributor operating according to the same general principles as a multiplex telegraph distributor, but using electronic circuits in place of mechanical moving parts and working it at a much higher speed than used in ordinary multiplex telegraphy. The special synchronizing pulses of 2 microsecond length are used to maintain this electronic distributor properly synchronized in the manner explained in the aforementioned application of E. M. Deloraine, Serial No. 531,851 and E. M. Deloraine-P. R. Adams Patent No. 2,421,017. The result of this distributor action is to separate the 287,500 pulses per second from receiver $E_4$ into 22 channels or sets of pulses each having only 12,500 pulses per second. The pulses of each channel are now demodulated by a set of 22 time modulation detector circuits of known type also comprised in equipment 360. Such detector circuits act to convert the inequalities of spacing of a series of pulses into varying voltages. The aforementioned application of E. M. Deloraine, Serial No. 531,851, and E. M. Deloraine-P. R. Adams Patent No. 2,421,017, disclose suitable forms of time modulation detector circuits.

Thus, the pulses of the eleventh eastbound channel 11e whose spacing was originally varied in time according to the speech signals from the microphone at the western terminal will, after detection in a time modulation detector circuit 360, reproduce the original speech modulating voltages which will then be delivered to output circuit 11e of the equipment 360. Such speech voltages will then be applied through the switchboard 361 to the receiver of the telephone set 362 under consideration at the eastern terminal of the airway.

When the telephone user at the eastern terminal of the airway starts to talk in reply to the speech signals just traced, the resulting voice currents from his microphone will be transmitted back to the receiver of the corresponding telephone set at the western base in the same manner as above traced. In this case, the channel used will be channel 11w instead of 11e and equipment 363, transmitter 364 and antenna 365 modulate, transmit, and radiate the signal. In each tower the receiving antenna 366, repeater 367 and transmitting antenna 368 are used. At the western terminal of the airway, the receiving antenna 369, micro-wave receiver 370 and channel separation and demodulation equipment 352 serve to pick-up, receive, separate and demodulate the signals which are then delivered through switchboard 350 to the receiver of the appropriate telephone set.

In the same way as above described, any other pair of telephones at the western and eastern terminals of the airway may be interconnected for conversation and eleven such two-way conversations can simultaneously be carried on over channels 11e—22e and channels 11w—22w.

Although the communication above described in detail was assumed to be a two-way telephone conversation, the channels 11w—22w and 11e—22e can handle any other types of communications which are capable of being sufficiently accurately represented by defining their instantaneous amplitudes 12,500 times per second. If the communications are composed of a mixture of sine waves as in the case of voice communications, the channels will satisfactorily reproduce all frequency components between 0 and 3,000 cycles per second. In the case of communications which essentially consist of a number of discrete dots of varying amplitudes, however, the dotting frequency can be as high as the number of pulses transmitted, i. e., 12,500 per second. Any one of the channels 11e—22e or 11w—22w is, therefore, capable of handling a facsimile transmission having a dotting rate of 12,500 per second which is several times higher than the speed of facsimile transmission normally attainable over telephone wires.

It should also be noted that each of the channels 11e—22e and 11w—22w is capable of transmitting frequencies as low as may be desired down to and including direct current of either positive or negative polarity. Accordingly, these channels are readily usable for transmitting teleprinter signals without the need for any special converters.

In the pictorial representation of Fig. 24, it is assumed that the eleven eastbound channels 11e—22e and the eleven westbound channels 11w—22w are being used at one time for interconnecting eight telephone hand sets 362, one two-way teleprinter machine 371 and two high speed facsimile senders and reproducers 372, 373 at the western terminal with a corresponding number of hand sets, teleprinters and facsimile equipments at the eastern terminal. For simplicity of illustration this figure shows only the number of telephone sets and other communication equipments which are assumed to be in use in this particular example. In practice, of course, one would usually have telephones, teleprinters and facsimile equipments amounting to several times the number of simultaneously available channels, these telephone sets or facsimile or telegraph instruments being connected to free channels through the switchboard at those moments when it is desired to use them. It should also be understood that the system could be designed to handle many more than 22 two-way channels, thus providing more than eleven two-way channels for airport-to-airport communication if required.

assigned to this traffic controller or company dispatcher are plugged through the switchboard to output circuit 1w of channel separation equipment 352 and to input circuit 1e of channel combining equipment 351 (see Fig. 17).

Now when the traffic controller or company dispatcher speaks into the microphone of his telephone set, the resulting voice currents are delivered to input circuit 1e of equipment 351 thus time modulating the corresponding series of pulses in the manner described in the preceding section. Just as before, the pulses of this channel together with all the pulses of the other channels serve to modulate the micro-wave transmitter 352 which then transmits corresponding pulses of micro-wave carrier over antenna 354 to the next tower.

As before, these pulses are repeated from tower to tower with a slight change of the micro-wave carrier frequency. In addition to repeating these waves as before, certain ones of the towers are also arranged to pick out the particular channel 1e which is now being considered, and to rebroadcast the speech modulation thereof at a VHF frequency suitable for reception by the VHF radio-telephone equipment of the airplanes (see Fig. 10).

Referring to the table herebelow, it will be seen that each different tower is arranged to select a particular channel number from the microwave artery for transmission to the planes on a corresponding VHF frequency. The towers which are arranged to pick out channel 1e from the microwave artery for broadcasting to the airplanes, will be seen to be towers No. II and IX. The manner in which each of these two towers performs its function will now be traced in detail with reference to Fig. 25.

Table I

| | Tower number | | | | | | | | | | | | | | | |
|---|---|---|---|---|---|---|---|---|---|---|---|---|---|---|---|---|
| | I | II | III | IV | V | VI | VII | VIII | IX | X | XI | XII | XIII | XIV | XV | XVI |
| **MICROWAVE LINKS** | | | | | | | | | | | | | | | | |
| Receive from west on Frequency | $a_1$ | $a_2$ | $a_3$ | $a_1$ | $a_2$ | $a_3$ | $a_1$ | $a_2$ | $a_3$ | $a_1$ | $a_2$ | $a_3$ | $a_1$ | $a_2$ | $a_3$ | $a_1$ |
| Repeat toward east on Frequency | $a_2$ | $a_3$ | $a_1$ | $a_2$ | $a_3$ | $a_1$ | $a_2$ | $a_3$ | $a_1$ | $a_2$ | $a_3$ | $a_1$ | $a_2$ | $a_3$ | $a_1$ | $a_2$ |
| Receive from east on Frequency | $b_2$ | $b_3$ | $b_1$ | $b_2$ | $b_3$ | $b_1$ | $b_2$ | $b_3$ | $b_1$ | $b_2$ | $b_3$ | $b_1$ | $b_2$ | $b_3$ | $b_1$ | $b_2$ |
| Repeat toward west on Frequency | $b_1$ | $b_2$ | $b_3$ | $b_1$ | $b_2$ | $b_3$ | $b_1$ | $b_2$ | $b_3$ | $b_1$ | $b_2$ | $b_3$ | $b_1$ | $b_2$ | $b_3$ | $b_1$ |
| **SPEECH WITH AIRPLANES** | | | | | | | | | | | | | | | | |
| Receive from planes on Frequency | *6t | 1t | 2t | *6t | 3t | 4t | *6t | 5t | 1t | *6t | 4t | 2t | *6t | 5t | 3t | *6t |
| Insert into Microwave Artery Channel | 6w | 1w | 2w | 6w | 3w | 4w | 6w | 5w | 1w | 6w | 4w | 2w | 6w | 5w | 3w | 6w |
| Select from Microwave Artery Channel | 6e | 1e | 2e | 6e | 3e | 4e | 6e | 5e | 1e | 6e | 4e | 2e | 6e | 5e | 3e | 6e |
| Transmit to planes on Frequency | *6r | 1r | 2r | *6r | 3r | 4r | *6r | 5r | 1r | *6r | 4r | 2r | *6r | 5r | 3r | *6r |
| **RADIO RANGE TIMING** | | | | | | | | | | | | | | | | |
| Timing Signal received over Channel | 8e | 7e | 8e | 7e | 8e | 7e | 8e | 7e | 8e | 7e | 8e | 7e | 8e | 7e | 8e | 7e |
| **QUASIRADAR** | | | | | | | | | | | | | | | | |
| Quasiradar Signal timed over Channel | 10e | for all towers | | | | | | | | | | | | | | |
| Radar Reply returned westward over Channel | 7w-10w. | for all towers | | | | | | | | | | | | | | |

NOTE: Frequencies 6t and 6r are normal standby frequencies of airplane radio telephone sets.

Airport to plane communication

Referring to Figs. 1, 17 and 25, it may be assumed that one of the traffic control personnel, or a company dispatcher of one of the airlines at or near the west terminal (airport 1 of Fig. 1) wishes to speak to the airplane 4 shown near repeater station II. Assume that the receiver and microphone connections of the telephone set The eastbound microwave radiation arriving at tower II or IX from the preceding tower (I or VIII) is picked up by receiving antenna 355, Fig. 25 and passes through eastbound repeater 356 to transmitting antenna 357 in the same way as previously described. At the same time that the pulses are being repeated through repeater 356, however, these pulses are also applied from this repeater to the drop channel or outbranching circuit 374 which is arranged to pick out of all the sets of pulses representing the 22 different eastbound channels, only the three particular sets representing channels 1e, 7e and 10e. Since the channel now under consideration is the first eastbound channel 1e, the pulses of this channel will be picked out and delivered through the corresponding output 1e of drop channel circuit 374 to demodulation circuit 375. This latter circuit detects the time modulations of the pulses to yield the speech frequencies of such modulations, and applies these speech frequencies to amplitude modulated VHF transmitter 376.

The VHF transmitters 376 of the various towers I, II . . . XVI are fixedly tuned to operate at different ones of the eight possible reception frequencies of the airplanes' radio-telephone equipment. These various settings of the VHF transmitters are shown in Table I, in which the eight possible receiving frequencies of the VHF airplane radio-telephone are respectively designated as 1r, 2r . . . 8r, while the corresponding eight transmitting frequencies of the aircraft VHF radio-telephone equipments are respectively designated as 1t, 2t . . . 8t. As shown in this table the towers II and IX now under consideration should have their drop channel circuit 374, Fig. 25, arranged to select from the microwave artery eastbound channel No. 1e and the VHF transmitters 376 of these two towers should be fixed-tuned to frequency 1r.

Thus, the speech frequencies applied to transmitter 376 of tower II or IX are modulated onto a VHF carrier of frequency 1r and thence are applied to the wide angle antenna arrays 377 and 378 for radiating this modulated VHF carrier in all directions from the tower.

Assume that the airplane 4 engaged in the communication is adjacent tower No. II and has its VHF radio-telephone equipment set 379, Fig. 10 for reception on frequency 1r and transmission on frequency 1t. (The manner of arranging for such selection of channels will be explained below but may be disregarded at the moment.) The speech modulated VHF carrier from tower II will be propagated to the plane where it will be picked up by the antenna of VHF receiver 380. This receiver 380 amplifies and detects the signals to yield speech waves which are applied to the corresponding headphones.

When the pilot of the airplane replies to the speech communication by speaking into the microphone of the radio-telephone transmitter 381 the speech modulated waves are radiated on VHF carrier frequency 1t. These VHF waves of frequency 1t are radiated downward to tower II where they are picked up by one of the receiving antenna arrays 382 and 383, Fig. 25. From antennas 382, 383, the VHF waves are applied to receiver 384 which receives and demodulates these to yield speech frequencies in the usual way. Such speech frequencies are then applied to channel insert circuit 385.

The channel insert circuit 385 is of a type generally used for time modulated pulse transmissions such as set forth in the aforementioned application E. M. Deloraine, Serial No. 531,851, filed April 20, 1944, and E. M. Deloraine-P. R. Adams Patent No. 2,421,017, includes a pulse generator normally producing 12,500 equally spaced pulses per second, this pulse generator is synchronized by energy from the westbound repeater 367, so that these pulses are produced at the correct instants for representing the first westbound channel 1w. A time modulation circuit is associated with this pulse generator for shifting the timing of the generator pulses under the control of the applied signal voltages, the working bias being so adjusted that these pulses are normally slightly unequally spaced. Arrival of speech frequencies from receiver 384 acts to increase or decrease this working bias so as to correspondingly increase or decrease the unequality or time displacement of the pulse spacing. The pulses delivered from channel insert circuit 385 to westbound repeater 367 are thus properly timed for fitting into their assigned time positions in the multi-channel westbound artery and in addition, are characterized by slight variations of timing representative of the speech signals from the airplane.

In westbound repeater 367, the pulses of such channel 1w are added in between the other pulses of the multi-channel artery and modulated with the other pulses onto the appropriate microwave carrier. As will be seen from Table I, the carrier frequency used for repeating westward from tower II is microwave frequency b2, while that used for repeating westward from tower IX is microwave frequency b3.

The microwave signals are now repeated westward from tower to tower in the manner previously described, the receiving antenna, repeater, and transmitting antenna employed in each tower being 366, 367 and 368, respectively. Finally, when the signals arrive at the western terminal, they are received by antenna 369, detected in receiver 370 and applied to channel separation and demodulation equipment 352. The pulses of the first westbound channel 1w are segregated from the pulses of other channels and demodulated as previously described so as to yield the same speech signals originally delivered to the microphone of the airplane radio-telephone transmitter 381. These speech signals are then delivered over output 1w to the switchboard 350 from which they are applied to the receiver of the telephone set being used for the communication under consideration.

In the foregoing detailed description, it was assumed that one of the traffic controllers or company dispatchers, whose telephone set had been connected through the switchboard 350 to the outgoing and incoming channels 1e and 1w was carrying on a communication with the pilot of an airplane near tower II and it was assumed without explanation that the VHF radio-telephone equipment of this airplane had been conveniently tuned to the corresponding VHF frequencies 1t and 1r.

In order to arrange for an appropriate setting of the airplane radio-telephone equipment and a corresponding connection of the telephone set of the traffic controller through switchboard 350 to the appropriate communication channels, it is desirable to reserve one set of channels for standby use, such channels not being normally used for conversations with individual planes, but being reserved solely for broadcasting brief messages to all planes along the air route as well as for giving instructions with respect to the channels to be used for any desired individual communications. In the system illustrated, it has been assumed that the sixth receiving and transmitting frequencies of the VHF radio-telephone equipments on each airplane would be designated as the standby channels and it is assumed that all pilots would be instructed to keep their radio-telephone equipments normally set for reception on VHF frequency 6r and transmission on VHF frequency 6t. Correspondingly, in the western terminal equipment of the airway shown in Fig. 17, the sixth eastbound and westbound channels 6e and 6w are illustrated as permanently connected to head set and microphone 386 and 387 which are used by a special standby operator.

If any traffic controller (or other authorized person) wishes to speak to a particular plane which is known to be flying along a certain section of the airway within line of sight of a certain group of towers, such traffic controller will ask the standby operator to set up the desired connection, mentioning in his request the identification number of the plane and the approximate section of the airway over which it is flying as well as the number of his own telephone instrument. The standby operator, by comparing the connections which she has already set up for conversations with other planes will observe which of the five two-way channels 1e—5e and 1w—5w are free and will select an appropriate pair of these channels which is branched out at a tower within easy reach of the airplane desired. Thus, if the first and third channels are already in use so that only channels 2e, 2w, 4e, 4w and 5e, 5w are free, and if the plane is flying between towers VI and VII, she may decide to use channels 4e and 4w for the desired communication between the traffic controller and the plane (see Table I). In such case, she will first speak into her microphone 387 and will announce the identity number of the plane desired and the number of the channel which she is to select, e. g., "Calling PG58—please take frequency 4." The pilot will first acknowledge by repeating the message, "Plane PG58 taking frequency 4" and will then switch his VHF radio-telephone set to frequencies 4t and 4r. At the same time, the operator will connect the instrument of the traffic controller desiring the connection through her switchboard 350 to the fourth eastbound and westbound channels 4e and 4w. When the pilot has shifted to frequencies 4r and 4t he will announce his presence by saying "PG58 answering." Thereafter the conversation between the traffic controller and airplane pilot can take place in the same way as above traced in detail, excepting that channels 4e and 4w and frequencies 4t and 4r will be used in place of the channels and frequencies 1e, 1w, 1t and 1r previously assumed.

Referring to Table I, it will be noted that the standby channels 6e and 6w are branched in and out at every third tower so that any airplane will always be within range of one of the towers through which these standby channels are branched. The other channels 1e–5e and 1w–5w are distributed so that these are repeated at only very long intervals and, moreover, are shuffled in such a way as to render the maximum service to the maximum number of airplanes under any reasonable likely conditions.

If the pilot of any airplane desires to initiate communication with the airbase, he must speak to the standby operator using his standby transmission and reception frequencies 6t and 6r and telling the operator that he desires a communication with a certain traffic controller or airlines representative. The standby operator will then arrange for the desired connection in the same way as previously described.

Radio range transmissions

Each tower is arranged to transmit a pair of cross diagrams modulated with different distinctive tones so that the equi-signal region of the two diagrams defines a vertical plane lying in the direction of the route to be flown. As in the case of the localizers and glide paths hereinbefore described, the differently modulated radiations of the two diagrams are not transmitted continuously, but rather are transmitted in the form of brief spurts or trains of signals. The signals for the left and right radiation diagrams are transmitted one after the other.

In the case of an airway to be used for one direction of flight only, (e. g. for westward flight only) such radio range transmissions are radiated in one direction only (i. e. eastward from the tower). In this case, the radio range equipment is essentially the same as the localizer equipment of Figs. 12 and 13 excepting that the range need not be equipped for quickly shifting its modulation frequencies.

In the case of an airway of the bi-directional type, each tower is arranged to transmit first a pair of differently modulated radiations for giving "fly left" and "fly right" indications for westbound planes, these two radiations being transmitted eastward with crossed diagram patterns (see Fig. 13A). Immediately thereafter, the same tower transmits a second pair of modulated radiations representing "fly left" and "fly right" signals for eastbound airplanes, the latter radiations being transmitted westward according to another pair of crossed diagrams. The radio range transmissions from such tower, therefore, consist of four short signal trains sequentially transmitted on four different radiation diagrams.

The two eastward radiations representing "fly left" and "fly right" signals for westbound airplanes are modulated with two suitable superaudible tone frequencies such as 1078 kc. and 1010 kc., the range defined by these modulation tones being referred to as the D range. The two westward radiations representing "fly left" and "fly right" signals for eastbound airplanes will use a different pair of modulating tones, e. g. 1102 kc. and 1034 kc., and the range defined by these radiations will be known as the E range (c. f. table of modulation tones, column 19). Thus, each tower of a bi-directional airway may be said to include two separate radio range stations, one directed eastward and one directed westward, the range transmissions of either of these ranges being separately selectable by the airplane.

The purpose of so distinguishing the eastward and westward radio range radiations from each tower is to facilitate the proper action of the radio compass which should, for maximum convenience in flying, always indicate the bearing of the next tower ahead, rather than that of the tower previously passed.

The radio range transmissions from successive towers are timed so as not to overlap, thus eliminating the possibility of course bends or beat notes which might result if two adjacent towers transmitted their radio range signals simultaneously.

To trace in detail the operations of the radio range facility, it is necessary to start by referring to master keyer 113 of the landing beam control equipment 109 illustrated in Fig. 12, since this master keyer controls the timing of the radio ranges along the airways as well as that of the glide paths and localizers at the airports. As previously explained, the different output circuits 117 through 126 are arranged to deliver timing pulses spaced about 1200 microseconds apart, the first six of these output circuits being used for controlling the timing of the glide paths and localizers. The last four output circuits 123 to 126 of master keyer 113 are reserved for timing the radio range transmissions of the airways radiating from the airport. For any one airway in which one pair of such timing circuits is used, the connections are arranged so that no two airways whose towers are within interfering distance of one another will transmit simultaneously.

In the case of the airway chosen for illustration, the two timing leads extending from delay circuits or phasers 133 and 134 of Fig. 12 are used for the timing (see Fig. 17). The timing pulses arriving over the first of these wires from master keyer output 123 are transmitted over eastbound channel 7e and are used for timing both the D and E radio range transmissions from all the even numbered towers of the airway (e. g. towers II, IV, VI, etc.). The timing pulses arriving over the third wire from master keyer output 125 are transmitted over eastbound channel 8e of the microwave artery and are used for timing both the D and E radio range transmissions from all the odd numbered towers of the airway (e. g. towers I, III, V, VII, etc.).

The manner in which the timing pulses act to modulate the appropriate sets of pulses of the microwave artery in equipment 351 may be the same as in the case of the modulations of channel 11e by speech waves, explained in the preceding sections. Preferably, however, channels 7e and 8e are modified so that the pulses representing these channels are normally not transmitted at all and the effect of the timing pulses applied to the input 7e or 8e is preferably such as to cause the transmission of one pulse in the corresponding channel. The manner in which the pulses are modulated into the microwave carrier in transmitter 353 radiated by antenna 354 and relayed eastward from tower to tower is the same as in the case of the telephone communications previously traced.

Referring now to Fig. 25, which may for the moment be assumed to represent any even numbered tower along the airway, the timing pulse arriving in channel 7e is not only repeated eastward through repeater 356, but is also applied from repeater 356 to drop channel circuit 374 which selects this pulse in the same manner as previously described for channel 1e, and delivers it over output 7e to the radio range signal modulator 390.

This radio range signal modulator 390, together with transmitter 391 and antenna switching circuit 392, may be considered as constituting an equipment essentially similar to the localizer equipment 150 of Fig. 13, but without the remote controlled frequency changing features of such localizer. The only significant difference is that the antenna switching circuit 392 has five possible states rather than only two.

In the normal state, the antenna switching circuit 392 is arranged to deliver the signals applied from transmitter 391 only to the transmission line which extends to the center antennas 393, 394 of the two groups of three transmitting antennas shown in antenna group 395. This normal state of switching circuit 392 is not used for any of the radio range transmissions, being intended for other facilities hereafter described. Besides this normal state, switching circuit 392 may be controlled by modulator 390 so as to provide four other switching combinations. For the "fly left" signals of range D which are required to be radiated eastward slightly to the right of the course, the switching circuit 392 applies the signals from transmitter 391 to transmission lines 396 and 397 simultaneously with a suitable phase relation for producing the required inclination to the right. For the "fly right" signals of the same D range, switching circuit 392 applies the signals from transmitter 391 to the same two transmission lines 396 and 397 but with an opposite phase relationship so that the resulting radiation diagram is tilted to the left of the course. Similarly, for the "fly left" and "fly right" signals of the E range which must be radiated westward to the right and left of the course respectively, the circuit 392 applies the signals from transmitter 391 to both transmission lines 397 and 398, the phases of the connections being different for the two signals so as to produce the required right and left inclinations of the radiation diagrams.

The radio range signal modulator 390 controls the generation of the required four modulation tones in the proper successive timing; and simultaneously with the delivery of these four successive tones to transmitter 391, the modulator 390 also applies suitable controls to the switching circuit 392, thus shifting the latter into the required four successive states above described.

At any of the odd numbered towers along the airway, the operation of the range is the same as above traced except that the drop channel circuit 374 of such towers is designed to select channel 83 rather than channel 7e; and, therefore, the timing of the radio range transmissions from such odd numbered towers would be controlled by the timing pulse from output 125 to master keyer 113, in Fig. 12.

Airway quasi-radar operation

As previously mentioned, a direct communication of the positions, altitudes and identities of all planes flying along the airway is obtained at the western terminal of such airway by a quasi-radar facility operating with the radar reply equipment of the airplanes.

The function of the quasi-radar equipment is to send a pulse at suitable intervals from the westward airway terminal eastward on the microwave artery, such pulse being used to initiate the radiation of quasi-radar signals from each tower at the instant when such pulse passes through the tower. The quasi-radar signals radiated from each tower have such a characteristic as to exactly simulate the signals which would be received by an airplane from the rotary beacon 71 of Fig. 11 at the instant when the imaginary "sweep line" of such rotary beacon was aligned with the airplane. Thus, each airplane receiving such a quasi-radar signal from the tower west of it responds in the same way that it responds to the rotary beacon 71 when the sweep line of the latter comes into alignment with the airplane. The radar reply signals sent back from the airplane are received by equipment provided at each tower for this purpose, and are forwarded over the microwave artery to the western airway terminal where they are displayed in the oscilloscopes of the posting desks, as shown in Fig. 22.

Since the total time for the propagation of the initial pulse from the western terminal over the microwave artery to a tower just west of the airplane, and thence from the tower to the airplane, plus the time of propagation of the radar reply signal from the airplane back to the tower and thence over the microwave artery to the terminal, is proportional to the distance of the airplane from the terminal, the oscilloscopes of Fig. 22 are arranged to directly indicate the position of the airplane along the airway. In addition, the identity and altitude of the plane are represented by "ghost" pulses in the same way as prepreviously described in conjunction with Figs. 21 and 22.

Tracing these operations in greater detail, the initial pulses are generated at a suitable rate, e. g., 180 pulses per second by pulse generator 343 in Fig. 17. The output of this pulse generator 343 passes through circuit 344 whose function is to to block the transmission of quasi-radar pulses six times per second during the intervals when the radio range transmissions are being triggered from master keyer 113 in Fig. 12. For this purpose, the timing pulses delivered from such master keyer are applied to the blocking circuit 344, as indicated at 112, which is arranged to block all transmissions from generator 343 from a short interval after the receipt of any such timing pulse. Normally, however, the blocking circuit 344 will pass pulses from generator 343 to input circuit 10e of modulation equipment 351.

The application of such a pulse to input circuit 10e of modulating and channel combining equipment 351 may produce a time modulation of one of the pulses corresponding to channel 10e. Preferably, however, the pulses of channel 10e are normally all suppressed and the effect of the pulse received from generator 343 is to permit the transmission of one pulse of such channel 10e. In order to insure that generator 343 will send out its quasi-radar initiating pulse exactly at the instant when the multi-channel artery is ready for the transmission of one of the pulses of channel 10e, the modulation and channel combining equipment 351, which controls the timing of the pulses for all the channels of the microwave artery, is arranged to synchronize the generator 343 as indicated by circuit 400 from 351 to 343. Therefore, each quasi-radar initiating pulse applied to input circuit 10e from generator 343 will arrive at a suitable time so that a corresponding pulse can immediately be sent out in one of the time intervals allotted to channel 10e of the microwave artery.

The pulse transmitted over channel 10e is modulated and then radiated together with all the other pulses of the microwave artery and is repeated eastward from tower to tower in the manner previously described. Referring to Fig. 25, it will be seen that the quasi-radar pulse on channel 10e is not only repeated eastward through repeater 356, but is also applied from this repeater to drop channel circuit 374 which is arranged to select this pulse and deliver it over output 10e to the quasi-radar signal modulator 401.

The modulator 401 has the function of producing a signal which will exactly simulate the signals that would be received by an airplane from rotary beacon 71 at the instant when the sweep line of such rotary beacon was swinging past the airplane. Because of the types of signals used in the rotary beacon 71, this characteristic signal is a very simple one consisting merely of a pulse of 3 microseconds duration not immediately preceded by a pulse of 5 microseconds duration (see radar reply unit 255 of Fig. 10). Accordingly, the quasi-radar signal modulator 401 is merely a simple pulse reshaper which transmits a 3 microsecond pulse in response to the shorter pulse delivered by drop channel circuit 374.

The 3 microsecond pulse thus delivered by modulator 401 is modulated onto an F1 carrier in transmitter 391 and passes through switching circuit 392 (which is now in its normal state) to transmission line 396. Since the transmission line 396 extends to the center antenna of each group of three transmitting antennas in array 395, the quasi-radar signal is radiated eastward with a diagram which is somewhat wider than the diagrams of the radiation for the radio range signals and which is not inclined either to the right or to the left of the course. The reflecting shields of antenna array 395 serve to prevent any radiation in a westward direction, since it is not desirable for the quasi-radar signals to travel along the microwave artery past a given airplane and then back westward to such airplane.

All airplanes which are within line of sight of the tower under consideration and which lie east of such tower will receive the quasi-radar signal thus radiated and will respond thereto by sending back a radar reply pulse 3 microseconds long on a carrier frequency of $F_2$. This response will take place exactly as in the case of quasi-radar signals received from the rotating beacon 71 when the latter has its sweep line aligned with the airplane. In order to provide against the possibility that some airplane might respond to two quasi-radar signals received at slightly different instances of time for two different towers which are both to the west of the airplane and both within line of sight, the circuits used for radar reply in the airplane (see Figs. 9 and 10) are preferably constructed so that they cannot respond twice within an interval of 30 or 40 microseconds. For this purpose, the width selector 94 of Fig. 9 may be arranged to clock itself for a short interval after the reception of any three microsecond pulse.

The radar reply signals from the airplane are propagated in all directions but are only received by the tower or towers which lie within line of sight to the west of the airplane since the receiving antennas 402, 403 in antenna array 395 (Fig. 25) are capable of receiving only from the east because of their large reflecting shields. It is possible that two towers, both west of a given airplane, may both receive the radar reply signals from such given airplane; and such double response of one radar reply pulse may occasionally cause duplicate indications as hereinbefore described in connection with Fig. 22.

The radar reply signal so picked up on the two receiving antennas 402, 403 are applied to receiver 404 which is fixedly tuned to $F_2$. The demodulated 3 microsecond pulses delivered from the output of this receiver are selected by width selector 405 and applied to special channel insert circuit 406. This channel insert circuit 406 is essentially a pulse re-shaping circuit which is normally blocked, excepting during the time intervals corresponding to channels 7w, 8w, 9w and 10w.

As previously explained, the separation of the 22 channels of the multi-channel microwave artery is carried out on a time channel basis with each second of time divided into 287,500 equal intervals each of 3.48 microseconds duration. Every 23rd one of these intervals contains a synchronizing pulse of 2 microseconds width, thus leaving a group of 22 successive intervals free for communication purposes between each two synchronizing intervals. In the westbound microwave artery, the first interval of each such group of 22 is reserved for the pulses of channel 1w, while the second interval of each group is reserved for channel 2w, etc. Thus, the four time intervals reserved for channels 7w, 8w, 9w and 10w, together form a time interval about 13.9 microseconds long, beginning about 20.9 microseconds after the start of each group of time intervals. Since the total length of the group of 22 intervals is about 80 microseconds, the time allotted for channel 7w–10w amounts to 13.9 microseconds out of every 80 microseconds. Thus about 17% of every second is allotted to these 4 channels 7w–10w. The special channel insert circuit 406 is, therefore, unblocked for an interval of 13.9 microseconds every 80 microseconds, or about 17% of the time.

To correctly time the unblocked intervals of this circuit 406, a base wave generator synchronized from the westbound repeater 367 must be provided; but such synchronized base wave generator is assumed already to be provided in circuit 385 since a normal channel insert circuit usually includes such base wave generator as set forth in Deloraine application Serial No. 531,851. The special channel insert circuit 406, therefore, need only include (1) a pulse reshaper for converting the 3 microsecond pulses received from 405 into short pulses of suitable length for transmission in the multi-channel artery (e. g. about ½ microseconds long); (2) a phase delay circuit for the base wave, and (3) an arrangement for applying the phase shifted base wave to such pulse reshaper for unblocking the latter.

If the 3 microsecond pulse received from 405 arrives at a time when the pulse reshaper of special insert circuit 406 is blocked, this pulse will not pass through 406 and, therefore, the corresponding radar reply signal will be lost. About 17% of the radar reply pulses will arrive at an instant when the reshaper of special insert circuit 406 is unblocked and in such case, the radar reply pulse after reshaping to a suitable length in circuit 406 will be applied to the westbound repeater 367 and thus injected in the microwave artery.

In order to insure that the radar reply pulses coming from any one plane will be thus injected into the microwave artery a fair proportion of the time, it is only necessary to arrange that the timing of the eastbound microwave artery is slightly out of synchronization with the timing of the westbound artery, since the timing of the eastbound artery determines the exact instants when the quasi-radar pulses will be transmitted toward the airplanes while the timing of the westbound artery determines the exact instants when any tower is capable of injecting the corresponding radar reply pulse into the westbound artery. Referring to Figs. 17 and 24, it will be seen that modulation equipment 351 in Fig. 17 controls the timing of the channels of the eastbound artery, while the corresponding modulation equipment 363 in Fig. 24 similarly controls the channel timing of the westbound artery. In order to insure the required asynchronism, it is merely necessary to make the base wave generator contained in equipment 351 slightly different in frequency from that contained in equipment 363. A still more reliable and constant degree of asynchronism can be assured by taking from equipment 360 of Fig. 24 a synchronizing signal representing the timing of the eastbound artery and after passing such synchronizing signal through a frequency shifter to increase it by a small amount, using the resulting increased frequency to synchronize the base wave of equipment 363. It is preferred to have the degree of asynchronism between eastbound and westbound arteries adjusted so that the group frequency of one such artery differs from the group frequency of the other artery by about 20 to 30 cycles per second. This will insure that the radar reply signals from any given airplane will arrive with such timing as to be injected into the microwave artery at least 20 to 30 times per second.

After being injected into the westbound microwave artery each of the radar reply pulses is repeated from tower to tower toward the western terminal in the manner previously described until it is finally picked up by antenna 369, Fig. 17, received in receiver 370 and applied to channel separation and demodulation equipment 352.

Channel separation equipment 352 is arranged to deliver the pulses arriving over channels 7w, 8w, 9w and 10w without demodulation so that the arriving radar reply pulses are delivered directly from circuit 352 to the oscilloscopes 307, 308, 309.

At the instant when the quasi-radar initiating pulse was applied from generator 343 through circuit 344 to input 10e of modulation circuit 351, this same voltage was simultaneously applied to a blanked sweep circuit 410 so as to start the sweeping action thereof. During all the time when the quasi-radar pulse was traveling out eastward along the microwave artery to the tower west of the airplane under consideration and thence from this tower to the airplane, as well as during the corresponding return trip from the airplane to the tower and thence back to the western terminal, the sweep circuit 410 was progressively deflecting the beams of all the oscilloscopes.

Preferably, the output of this sweep circuit is divided into 15 different outputs, the first such output commencing to sweep as soon as the circuit 410 is triggered and continuing to sweep for the first fifteenth of the total sweep interval. Thereafter, this sweep voltage preferably remains fixed and the voltage of the second output commences to rise during the second fifteenth of the total sweep interval. Thereafter, the third output commences its sweep and then the fourth, etc. Thus, the effect is as if the fifteen oscilloscopes (of which only three are shown) were all provided with one single common beam which was swept first across the first screen, next across the second screen and then across the third screen, etc. The position of the beam along the series of screens of the fifteen oscilloscopes at the instant when the radar reply pulse finally arrives at the western terminal will, therefore, be representative of the distance of the given airplane from this western terminal.

Normally, all the beams above described as sweeping across the screen of the oscilloscopes are blocked by the bias normally standing on the grids of these oscilloscopes. At the instant when the radar reply pulse is applied from circuit 352 to the grids of all these oscilloscopes, the beam is momentarily rendered effective to illuminate the appropriate portion of the screen of the appropriate tube. Thus the position of the illuminated spot represents the distance of the airplane from the terminal.

It will be recalled that the radar reply signals from each airplane are sometimes received instantaneously and sometimes with a delay representative of the airplane's altitude, the change-over from one condition to the other being made in a rhythm representing the airplane's identity (see Fig. 22). Accordingly, the representation of each airplane on the appropriate oscilloscope screen in Fig. 17 will have the form of a spot which jumps back and forth between two positions, thus clearly showing both the identity and altitude of the airplane as well as its true position.

The appearance of the indications representing any given airplane may be somewhat altered by the double reception of the radar reply pulses sent back by such airplane. This will be most noticeable when the airplane is directly over a tower or slightly each thereof. At such time, the length of the path from the airplane down to the nearby tower and thence along the micro-wave artery to the western terminal will be substantially longer than the length of the path from the airplane westward to the next tower about 20 miles away and thence along the microwave artery to the western terminal. The difference in the lengths of such paths will be approximately equal to the altitude of the airplane or to its left or right displacement from the airway. During the periods when an airplane is within a few miles east of any tower, therefore, it may be expected that two representations of the airplane's positions will be given as shown for example in the case of the airplane 3QFR in Fig. 22. As will be seen from the above explanation, the most noticeable double representation will actually occur when the plane is slightly east from the tower. To aid the operator in recognizing such double representations, however, the vertical line IV which represents the fourth tower along the airway, is preferably shown slightly displaced from its true position so that this line will lie midway between the two indications of the airplane's position on the oscilloscope.

When the airplane is five or six miles east of a given tower, e. g., tower IV, the echo effects will be hardly perceptible. It is true that the radar reply signals from the airplane may still be picked up by tower III as well as tower IV, but the two replies so picked up will arrive at the western base practically simultaneously since the length of the propagation path from the airplane to tower IV and thence westward along the artery to the western terminal will be practically the same as the length of the alternate propagation path from the airplane to tower III and thence westward to the terminal. If, for example, the airplane is six miles east of tower IV at an altitude of 5000 feet and approximately on course, the distance between the two propagation paths above traced will be less than 0.06 mile.

Airway self-distance facility

As hereinbefore explained, each airplane is arranged to send out about 30 pulses per second with pulse widths of ½ microseconds each on a carrier frequency of $F_2$, and is also arranged to receive back from a suitable repeater on the ground corresponding ½ microsecond pulses on a frequency of $F_1$ for determining its distance from the point where the repeater is located. In order that this same facility may be available when the airplane is flying along the airway, it is necessary to provide at each tower a repeater designed to receive ½ microsecond pulses at $F_2$ and to retransmit the same pulses at $F_1$. In accordance with the system of the present invention, the effect of such repeater is attained with a minimum amount of additional equipment by making use of the $F_2$ receiver 404, Fig. 25, already provided for reception of quasi-radar reply signals and by also making use of the $F_1$ transmitter 391 already provided for radio range transmission and quasi-radar signal transmission. In order to give the required repeater action, it is merely necessary to interconnect the receiver 404 and the transmitter 391 through a ½ micro-second width selector 411.

Since it is desirable also to provide a timed interruption of the repeater action, for identifying the tower whose distance is being measured, the code keyer 412 is also provided, and is arranged to interrupt the transmission from selector 411 to transmitter 391 in accordance with the code identifying the tower.

Since the radiation from transmitter 391 as well as the reception by receiver 404 takes place through the uni-directional antenna array 395, the self-distance repeater on any given tower will only be effective for planes east of such tower. Thus, the system avoids the confusion which might result from measuring the distances to the next tower east, as well as to the next tower west.

Antenna arrangement

The very sharply beamed antennas 355, 357, 366 and 368 of the micro-wave arteries, are preferably located near the top of the towers. This makes the ground effect negligible since the amount of energy directed toward the ground and thus reflected upward to interfere with the direct wave is so small as to give no serious trouble.

In the case of the other antennas which must radiate over comparatively wide angles, it is proposed to arrange these at moderate elevations above the ground and to provide each antenna with sufficient vertical directivity so that its radiation or reception takes place primarily in a horizontal direction. In the case of antennas 377, 378, 382 and 383, such vertical directivity may be attained by stacking two or more elements while in the case of the antennas shown in the shielded arrays 395 and 413, the necessary vertical directivity may be attained by the use of reflectors.

In the case of all the antennas except 355, 357, 366 and 368, it is assumed that at low angles near the horizontal the ground reflections may tend to produce nulls, and accordingly, every antenna will be duplicated by another antenna positioned slightly higher, the two such antennas being joined in quadrature relation. By choosing the proper relationship between the vertical separations of the two antennas so used and the total elevation of the antenna above ground, it is possible to reduce the depths of nulls occurring at low angles as a result of ground effect. Nulls which might occur at higher angles because of ground effect are expected to be reduced by the vertical directivity of the antennas themselves.

Interference problem

In general interference between pulses of two different sets of pulse signals will be small because of the relatively small percentage of the time cycle of transmission and the different pulse widths used. The worst interference that may be caused is by short pulses coinciding with longer pulses. This, however, will introduce only a small percentage of noise since the timing of the pulses is such that this effect will occur relatively infrequently. The shorter pulses can interfere with the longer ones only when they are simultaneously received with the carrier frequencies in precise phase opposition, thus tending to cancel out part of the longer pulses. Again, however, such effects will rarely occur.

A more serious possibilty of error in indications resides in the production of the self-distance indicator of too many indications due to reply signals initiated by other planes in the vicinity. This difficulty is avoided by transmitting the pulses at relatively long intervals so that only a small proportion of the pulse cadence period is required for the indication.

Avoidance of interference between various signals

In the system of our invention outlined above the different services have been described independently without attempt to explain how interferences between the signals of these various services are avoided. The several types of services considered may be illustrated together with the various types of signals radiated for each service, as in the following table:

TABLE II

| Name of Service | Car. Freq. | Mod. Freq. if Sinusoidal Mod. | Length of Train of Mod. Freq. | Pulse Width in Microseconds | Repetition Rate of Complete Signal | Transmitted from Plane or Ground |
|---|---|---|---|---|---|---|
| Anti-collision | F2 Mc. | | | 1 | 5000/sec. | Plane. |
| Self-location [1] (azimuth sig.) | F1 Mc. | | | 5 | 4000/sec. | Ground. |
| | | | | 3 | | |
| | | | | 12 | 6/sec. | Do. |
| Self-location (ref. pulse) | do | | | 1/2 | Approx. 30/sec. | Plane. |
| Self-location (self-distance pulse) | F2 Mc. | | | 1/2 | When triggered | Ground. |
| Self-location (self-distance reply) | F1 Mc. | | | | 6/sec. | Do. |
| Landing beam and range service | do | 650-1222 kc. | 200/μ sec. Plus Rounding | | | |
| Terrain clearance | No special pulses transmitted; uses self-distance pulses. | | | | | |
| Quasi-radar (initial trans.) | No special pulse transmitted from ground; uses azimuth signals. | | | | | |
| Quasi-radar (radar reply) | F2 Mc. | | | 3 | When triggered, e. g. 12 groups/sec. | |

[1] Remarks: Rotating 12 times/sec.; silenced 6 times/sec.

As will be seen from this table, there are only three types of signals radiated at $F_1$ and only four types of signals radiated at $F_2$. It is obvious that no interference can occur between the signals of widely different frequencies.

A further and more serious possibility is the production of false or ambiguous indications of position on the indicators. While such ambiguity would obviously be quite rare, it would be substantially more serious than the mere appearance of troublesome pulses which distract the eye but could not possibly deceive the pilot or the posting operator as to his actual position. It may be assumed that real ambiguity would exist whenever an interfering pulse appeared on the screen and moved sufficiently slowly so that its motion might be believed to represent the motion of the airplane in which the observations were being made. On this we may assume that an interfering pulse would produce real ambiguity of its motion corresponded to an airplane speed of 760 miles per hour or less. Using this as a definition of real ambiguity, calculations show that a truly ambiguous indication would be produced about 1/200 of 1% of the time if 50 airplanes are observed at once.

In order to prevent such ambiguity from continuing for a period of more than 1 or 2 seconds at a time, it is preferred that the pulse generators 100 which originate the self-distance pulses on the planes should be wobbled at a slow rate, e. g. once every second or two. A very simple way to accomplish this is to use for each pulse generator a non-temperature compensated tuning fork whose temperature is controlled by a thermostat having a cycle of about 2 seconds. Thus, the cadence rate of each generator 100 will be slightly drifted up and down every 2 seconds. It should be noted that this will not reduce the percentage of the time during which theoretical ambiguity exists. This percentage will still be 1/200 of 1% as before, but the ambiguity will now occur more frequently and with a shorter duration, so that instead of observing very infrequent ambiguities lasting 10 or 15 seconds or more, the pilots of the various airplanes will observe more frequent cases of ambiguity, each lasting for a much shorter time. On the average, each pilot should observe an ambiguous second spot on his indicator about once every 20,000 seconds of flying time, such ambiguity lasting for about 1 second and disappearing.

Automatic piloting

Although the proposed system has been described purely as a system for giving to a pilot convenient indications of his position and the direction of his flight, as well as for giving to the ground personnel a somewhat similar set of convenient indications of plane position, altitude and identity, it should be understood that the same system may be used for actually controlling the flight of the planes. In order to control the flight of the planes along the ranges, it would merely be necessary to apply to a suitable automatic piloting mechanism the signals which have been described as applied to deflect the corresponding indicator to the left or to the right. Similarly, for automatically flying the landing beam, the several signals described as being applied to the display unit for giving indications of the "fly up," "fly down," "fly left" and "fly right" signals could be applied to a suitable automatic pilot mechanism which would then control the planes to fly down any preselected landing beam.

For flying other more complex patterns also it would be possible to provide automatic control by the use of the signals which have been described for giving the requisite indications to the pilot. Such automatic control for the more complex patterns might, however, require unjustifiably complex mechanisms in order to provide the degree of flexibility required for flying all airport patterns.

The various combinations and subcombinations of apparatus and circuits, as particularly described, may be varied in many respects within the scope of our invention as will be clear to those skilled in the art to which it appertains.

The particular embodiment of our invention described herein shows a complete system and sub-features thereof, but should be considered only as an illustrative example and not as any limitation on our invention as defined in the objects thereof and in the accompanying claims.

We claim:

1. An anti-collision and terrain clearance indicator system for aircraft comprising means on a given craft for transmitting two different types of pulse signals, means to modulate a characteristic of one of the type of signals according to the altitude position of said given craft, means to receive the altitude pulse signals of other craft, and also the reflections of the other type of pulse signals transmitted from said given craft, first selector means for separating out altitude pulse signals, indicator means responsive to said separated altitude pulse signals for indicating the presence and relative location of other craft, second selector means for separating out said reflection signals, and terrain clearance indicator means responsive to said separated reflection signals for indicating the height of said craft above the earth.

2. A system according to claim 1, further comprising a rotatable antenna means responsive in a generally horizontal direction, means for rotating said antenna means, means in one sector of rotation of said antenna means for directing reception action of said antenna generally downward, and means for rendering said second selector means operative only during the period representing said one sector of rotation.

3. A system for indicating on a given craft the presence of other craft in the vicinity thereof at substantially the same altitude comprising means on each craft for transmitting a train of pulses, a source of modulation signals, means for varying the frequency of said modulation signals in accordance with its altitude, means for modulating said pulses with said modulation signals, means on a given craft for receiving the altitude indicating pulses of other craft, indicator means for said given craft, means for demodulating said received pulses to obtain the modulation signals thereof, means for mixing said obtained signals with the modulation signal of said given craft and means responsive to said mixed signals for indicating only the presence of other craft at substantally the same altitude as said given craft, said receiving means comprising a directive rotatable antenna system for determining the relative azimuth location of detected craft with respect to the position of said given craft.

4. In a radio traffic system, a system for indicating the position of a craft relative to a particular location comprising directive means at said location for directively transmitting pulse signals in different directions about said location, means on said craft for transmitting reply signals in response to those directive signals transmitted in its direction from said location, means at said location for receiving said reply signals, indicator means for determining the lapse of time between said directive signals and corresponding reply signals representative of the distance of said craft from said location, modulating means on said craft for modulating said reply signals to transmit other intelligence to said location, and means for indicating the altitude of said craft, said modulating means including means for displacing certain of said pulses in time in accordance with the indicated altitude of said craft.

5. A system according to claim 4 wherein said directive means comprises means for transmitting two overlapping signal patterns, and means for characterizing said overlapping patterns in accordance with different distinctive signals.

6. A system according to claim 4 wherein said directive means comprises means for providing a first radiation pattern characterized by a first distinctive signal and having two nulls, means for providing a second radiation pattern characterized by a second distinctive signal and having a single null aligned with one of said two nulls, and the means for transmitting reply signals includes means for receiving said distinctive signals, and means for transmitting said reply signals in response to said second distinctive signal in the absence of reception of said first distinctive signal.

7. A system according to claim 4 wherein said directive means comprises means for directionally transmitting a series of pulses at a given repetition rate, and means for effectively rotating said last named means at a slow rate with respect to said pulse repetition rates.

8. A system according to claim 4 wherein said directive means comprises means for directionally transmitting a series of pulses at a given repetition rate, means for effectively rotating said last named means at a slow rate with respect to said pulse repetition rates, the means for transmitting reply signals comprising means responsive to said directionally transmitted pulses for repeating reply pulses, said indicator means comprising means responsive to each pulse of said transmitted series for initiating a distance indicating sweep line, means responsive to said reply pulses for providing an indication along said sweep line to indicate the distance of said craft from said location, means responsive to rotation of said directive means for providing an angular rotation of said sweep line to indicate the location of said craft from said location in both azimuth and distance.

9. In a signalling system, means for transmitting control signals to each of a plurality of craft disposed in different directions about a given location and to other craft disposed at different distances along a given path leading to said location, comprising transmitter means for transmitting said control signals successively in different directions around said location, relay means along said path for relaying said control signals along said path, means for radiating said relayed control signals from points along said given path, and common timing means timing the operation of said transmitter means and said relay means.

10. A signalling system for transmitting control signals to each of a plurality of craft, comprising a rotary transmitter unit including means for transmitting a first directive pattern having a null, means for transmitting a second pattern having a lobe of energy overlapping said null, means for modulating the energy of said first pattern with given signals, means for modulating said second pattern with said control signals, means for simultaneously rotating both said patterns, a second transmitter unit for transmitting energy along a path, means for modulating said energy last named with said control signals, receiver means for each of said craft comprising means for receiving energy of said given and control signal, transmitter means responsive to the received control signals for transmitting a reply signal, and means responsive to said given signals for blocking said transmitter means during reception of said given signals, whereby said reply signals will be transmitted only during periods when said control signals are received without said given signals.

11. In a radio range system controlled from a given station, a plurality of radio range transmitters arranged to provide successively extending guiding patterns of radio range signals to define a substantially continuous course, means for transmitting radio guiding signals from each of said transmitters, timing means at said given station for transmitting range control signals to said radio range transmitters, and means at successive ones of said transmitters responsive to said range control signals for transmitting from adjacent radio range transmitters differently timed radio range signals.

12. A radio range system according to claim 11, said given station further comprising means for transmitting landing signals for guiding craft to a landing, said timing means further comprising means for transmitting timing signals to successively control transmission of said landing signals and said radio range control signals.

13. A radio range system according to claim 11 wherein each said radio range transmitter comprises means for transmitting two similar sets of different tone signals, directive means for directively radiating each said set of tone signals in differently aligned directions in the form of overlapping radiation diagrams to provide substantially oppositely directed guiding patterns, and means for successively energizing said directive means under control of said range control signals.

14. A radio range system according to claim 11 wherein said radio range transmitters each comprises directive radiation means including a vertical array of antenna units, and reflector means for said antenna units, whereby concentration of energy in the vertical direction is provided.

15. A system for indicating at a terminal the position of an aircraft in flight along a given course comprising radio means for periodically producing a signal, means including repeater stations for transmitting said signal along course, means for radiating the signal at said stations, means on the aircraft responsive to said signal when the craft is within range of any of said repeater stations to transmit a reply signal to said terminal by way of said repeater stations, means for receiving said reply signal at said terminal, an oscilloscope having grid means, deflection field means for said oscilloscope, means for applying a saw-tooth type sweep voltage to said field means, means to synchronize the cycle of said sweep voltage with the radiation of said periodical signal, means to operatively apply said means for receiving to said grid means, whereby an indication on the oscilloscope is obtained of the aircraft with respect to its linear position along said course.

16. A method for indicating at a station the location of an aircraft in flight along a given course, comprising transmitting directional signals over said course, transmitting from said aircraft in response to each of said directional signals a first reply signal and a second reply signal delayed with respect to the first signal in accordance with the altitude position of the aircraft, altering at least one of the reply signals according to an identifying signal of said aircraft, receiving the reply signals at said station, and producing from said reply signals indications of the position, altitude and identity of the aircraft.

17. In an aircraft traffic control system having a terminal and a chain of relay stations disposed along a given course associated with said terminal, means at said terminal to transmit a signal, directive radiator means at each of said stations for directively relaying said signal forwardly along said chain of relay stations, receiver means on aircraft to receive said signal when the aircraft is on said course, and means to render said receiver means inoperative for a given interval following reception of said signal so that the craft will receive said signal from one only of said stations.

18. In an aircraft traffic control system having a terminal and a chain of relay stations disposed along a given course associated with said terminal, means at said terminal to transmit a signal, directive radiator means at each of said stations for directively relaying said signal forwardly along said chain of relay stations, receiver means on aircraft to receive said signal when the aircraft is on said course, means on the craft to transmit a reply signal to the signals received from said radiator means, and means at each of said stations to receive and relay said reply signal to said terminal.

19. A system according to claim 18 further including means to modulate said reply signal according to the altitude position of said aircraft.

20. A system according to claim 18 further including means for modulating the reply signal according to the identity signal of said aircraft.

21. A system according to claim 18 further including means for modulating the reply signal according to the altitude position of the craft, means to further modulate the reply signal according to the identity signal of said aircraft, and means at said terminal for indicating the altitude and distance location of the aircraft along said course and the aircraft identity of such indication.

22. An aircraft indicating system comprising means on each craft for transmitting pulses, a source of modulation signals, means for varying the frequency of said modulation signals in accordance with its altitude, means for modulating said transmitted pulses with said modulation signals, means comprising a directive rotatable antenna system on a given craft for receiving said modulated transmitted pulses, means for demodulating said received pulses to derive the modulation signals thereof, means for mixing said demodulated signals with the modulation signals from said given craft, a frequency band selective circuit for selecting given mixed signals, a cathode-ray tube having a screen, means for producing a spot on the screen displaceable in accordance with the rotation of the antenna system, means for applying said selected signals to said cathode-ray tube to produce indications on the trace thereof of craft at substantially the same altitude as said given craft and corresponding to their respective azimuths.

23. An arrangement according to claim 22, wherein said trace is circular and said selected signals are applied to said cathode-ray tube to produce a radial deflection of said trace in accordance with the signal strength of the respective received signals.

*24. A navigational system comprising unitary means for indicating the altitudes of each of a plurality of craft, and said unitary means comprising further means for indicating the lateral positions of said plurality of craft with respect to a predetermined course.*

*25. A navigational system comprising means for simultaneously indicating the altitudes of each of a plurality of craft, and means for simultaneously indicating the relation of each of said plurality of craft to a predetermined course line.*

EDMOND M. DELORAINE.
PAUL R. ADAMS.

References Cited in the file of this patent or the original patent

UNITED STATES PATENTS

| Number | Name | Date |
|---|---|---|
| 1,894,019 | Buckley | Jan. 10, 1933 |
| 2,042,490 | Zahl | June 2, 1936 |
| 2,048,081 | Riggs | July 21, 1936 |
| 2,090,359 | Robinson | Aug. 17, 1937 |
| 2,163,770 | Radinger | June 27, 1939 |
| 2,252,083 | Luck | Aug. 12, 1941 |
| 2,262,838 | Deloraine et al. | Nov. 18, 1941 |
| 2,344,760 | Wight et al. | Mar. 21, 1944 |
| 2,378,604 | Wallace | June 19, 1945 |
| 2,403,603 | Korn | July 9, 1946 |
| 2,407,199 | Wolff | Sept. 3, 1946 |
| 2,421,017 | Deloraine | May 27, 1947 |
| 2,433,381 | Marchand | Dec. 30, 1947 |
| 2,444,452 | Labin | July 6, 1948 |

FOREIGN PATENTS

| Number | Country | Date |
|---|---|---|
| 116,666 | Australia | Oct. 10, 1941 |
| 116,667 | Australia | Oct. 10, 1941 |